United States Patent
Rodriguez et al.

(10) Patent No.: US 7,120,922 B2
(45) Date of Patent: Oct. 10, 2006

(54) TIME-ADAPTIVE CONTROL OF TELEVISION VIEWING FUNCTIONALITY

(75) Inventors: Arturo A. Rodriguez, Norcross, GA (US); Geoffrey G. Hammett, Norcross, GA (US); Robert O. Banker, Cumming, GA (US); John Eric West, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/015,270

(22) Filed: Dec. 11, 2001

(65) Prior Publication Data

US 2003/0110491 A1 Jun. 12, 2003

(51) Int. Cl.
*G06F 3/00* (2006.01)
*H04N 7/173* (2006.01)

(52) U.S. Cl. .............. 725/39; 725/46; 725/47; 725/55; 725/87; 725/100; 725/115

(58) Field of Classification Search ............. 725/25, 725/38, 39, 46, 47, 55, 86, 87, 88, 141, 143, 725/40, 42, 100, 115; 348/553, 563, 584, 348/586

See application file for complete search history.

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,908,713 A | 3/1990 | Levine | 358/335 |
| 4,963,994 A | 10/1990 | Levine | 358/335 |
| 5,038,211 A | 8/1991 | Hallenbeck | 358/142 |
| 5,253,066 A | 10/1993 | Vogel | 358/188 |
| 5,293,357 A | 3/1994 | Hallenbeck | 348/734 |
| 5,479,268 A | 12/1995 | Young et al. | 358/335 |
| 5,508,815 A | 4/1996 | Levine | 358/335 |
| 5,532,754 A * | 7/1996 | Young et al. | 725/47 |
| 5,568,272 A | 10/1996 | Levine | 386/48 |
| 5,809,204 A | 9/1998 | Young et al. | 386/83 |
| 5,880,768 A * | 3/1999 | Lemmons et al. | 725/41 |
| 5,915,068 A | 6/1999 | Levine | 386/83 |
| 6,005,597 A * | 12/1999 | Barrett et al. | |
| 6,037,933 A | 3/2000 | Blonstein et al. | 345/327 |
| 6,078,348 A * | 6/2000 | Klosterman et al. | |
| 6,243,142 B1 | 6/2001 | Mugura et al. | 348/564 |
| 6,275,268 B1 * | 8/2001 | Ellis et al. | |
| 6,388,714 B1 * | 5/2002 | Schein et al. | 348/563 |
| 6,584,153 B1 * | 6/2003 | Gordon et al. | 375/240.13 |
| 6,614,843 B1 * | 9/2003 | Gordon et al. | 375/240.01 |
| 6,732,370 B1 * | 5/2004 | Gordon et al. | 725/39 |
| 2002/0042923 A1 * | 4/2002 | Asmussen et al. | |
| 2002/0059610 A1 * | 5/2002 | Ellis | |
| 2002/0129367 A1 * | 9/2002 | Devara | |
| 2002/0133821 A1 * | 9/2002 | Shteyn | |
| 2002/0157094 A1 * | 10/2002 | Saito et al. | |
| 2002/0188947 A1 * | 12/2002 | Wang et al. | |
| 2002/0199193 A1 * | 12/2002 | Gogoi et al. | |
| 2003/0018972 A1 * | 1/2003 | Arora | |

FOREIGN PATENT DOCUMENTS

| | | |
|---|---|---|
| WO | 00/38418 | 6/2000 |
| WO | 01/50741 | 7/2001 |

* cited by examiner

*Primary Examiner*—Kieu-Oanh Bui

(57) ABSTRACT

A method for providing television functionality includes defining a time period, associating a user preference with the time period, providing a first result in accordance with the user preference if a request for television functionality is received during the defined time period, and providing a second result if the request for the television functionality is received outside the defined time period.

41 Claims, 41 Drawing Sheets

| | TIME PERIOD 1 | TIME PERIOD 2 | TIME PERIOD 3 | TIME PERIOD 4 |
|---|---|---|---|---|
| VIEWING PARAMETER 1 | Score (1,1) | Score (1,2) | Score (1,3) | Score (1,4) |
| VIEWING PARAMETER 2 | Score (2,1) | Score (2,2) | Score (2,3) | Score (2,4) |
| VIEWING PARAMETER 3 | Score (3,1) | Score (3,2) | Score (3,3) | Score (3,4) |
| VIEWING PARAMETER 4 | Score (4,1) | Score (4,2) | Score (4,3) | Score (4,4) |
| VIEWING PARAMETER 5 | Score (5,1) | Score (5,2) | Score (5,3) | Score (5,4) |
| VIEWING PARAMETER 6 | Score (6,1) | Score (6,2) | Score (6,3) | Score (6,4) |
| VIEWING PARAMETER 7 | Score (7,1) | Score (7,2) | Score (7,3) | Score (7,4) |
| VIEWING PARAMETER 8 | Score (8,1) | Score (8,2) | Score (8,3) | Score (8,4) |
| VIEWING PARAMETER 9 | Score (9,1) | Score (9,2) | Score (9,3) | Score (9,4) |

FIG. 30A

|  | JANUARY | FEBRUARY | MARCH | APRIL |
|---|---|---|---|---|
| ABC NEWS | ... | ... | ... | ... |
| DATELINE | ... | ... | ... | ... |
| FRIENDS | ... | ... | ... | ... |
| FRASIER | ... | ... | ... | ... |
| CHEERS | ... | ... | ... | ... |
| HEADLINE NEWS | ... | ... | ... | ... |
| ER | ... | ... | ... | ... |
| DAYS OF OUR LIVES | ... | ... | ... | ... |
| GREEN BAY PACKERS | ... | | | |

FIG. 30D

TIME-ADAPTIVE CONTROL OF TELEVISION VIEWING FUNCTIONALITY

FIELD OF THE INVENTION

This invention relates in general to television systems, and more particularly, to functionality provided by set-top boxes.

BACKGROUND OF THE INVENTION

Subscriber television systems are now capable of providing many services in addition to analog broadcast video. In implementing enhanced programming, the home communication terminal ("HCT"), otherwise known as the settop box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a cable or satellite television network and includes hardware and software for providing various services and functionality. Preferably, some of the software executed by a DHCT is downloaded and/or updated via the cable television network. The ability to download software provides flexibility in adding or updating applications executed by the DHCT. Each DHCT also typically includes a processor, communication components and memory, and is connected to a television. While many conventional DHCTs are stand-alone devices that are externally connected to a television, a DHCT and/or its functionality may be integrated into a television or personal computer, as will be appreciated by those of ordinary skill in the art.

One problem with typical DHCTs is that they are not very responsive to an individual user's demands. For example, in television systems that provide hundreds of services, locating desired television programs can require many keystrokes by the viewer and can consume significant amounts of time. Furthermore, different users may have different preferences regarding the information that may be presented via an electronic program guide (EPG), and these preferences may vary from time to time. Therefore, it should be appreciated that there is a need for improved systems and methods that address these and/or other problems associated with providing desirable television functionality.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 30A is a block diagram depicting a non-limiting example of a preference tracking database.

FIG. 30D is a block diagram depicting a non-limiting example of a preference tracking database where the viewing parameters represent television instances and the time periods represent months.

DETAILED DESCRIPTION OF THE PREFERRED EMBODIMENTS

The preferred embodiments of the present invention now will be described more fully hereinafter with reference to the accompanying drawings. These embodiments are examples, among others, of systems and methods of the present invention. Therefore, the present invention, which may be embodied in many different forms, should not be construed as limited to the embodiments set forth herein.

Figure 1:
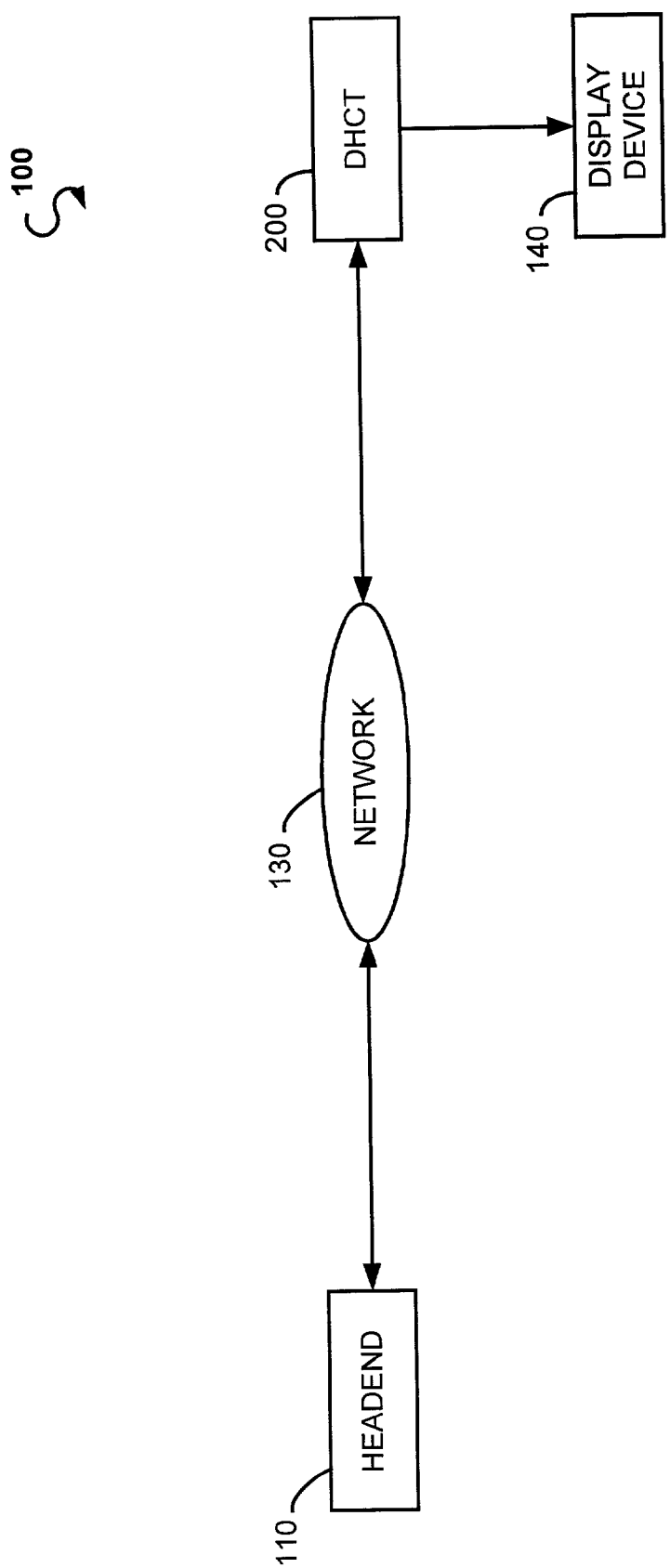
FIG. 1 is a high-level block diagram depicting a non-limiting example of a subscriber television system.

FIG. 1 is a block diagram depicting a non-limiting example of a subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, the display device 140 or a personal computer (not shown). The DHCT 200 receives signals (video, audio and/or other data) from the headend 110 through the network 130 and provides any reverse information to the headend 110 through the network 130. The network 130 may be any suitable means for communicating television services data including, for example, a cable television network or a satellite television network, among others. The headend 110 may include one or more server devices (not shown) for providing video, audio, and textual data to client devices such as DHCT 200. The headend 110 and the DHCT 200 cooperate to provide a user with television functionality including, for example, television programs, an interactive program guide (IPG), and/or video-on-demand (VOD) presentations. The television services are provided via the display device 140 which is typically a television set. However, the display device 140 may also be any other device capable of displaying video images including, for example, a computer monitor. A television service may also be provided, in part or in full, via audio speakers.

Figure 2:
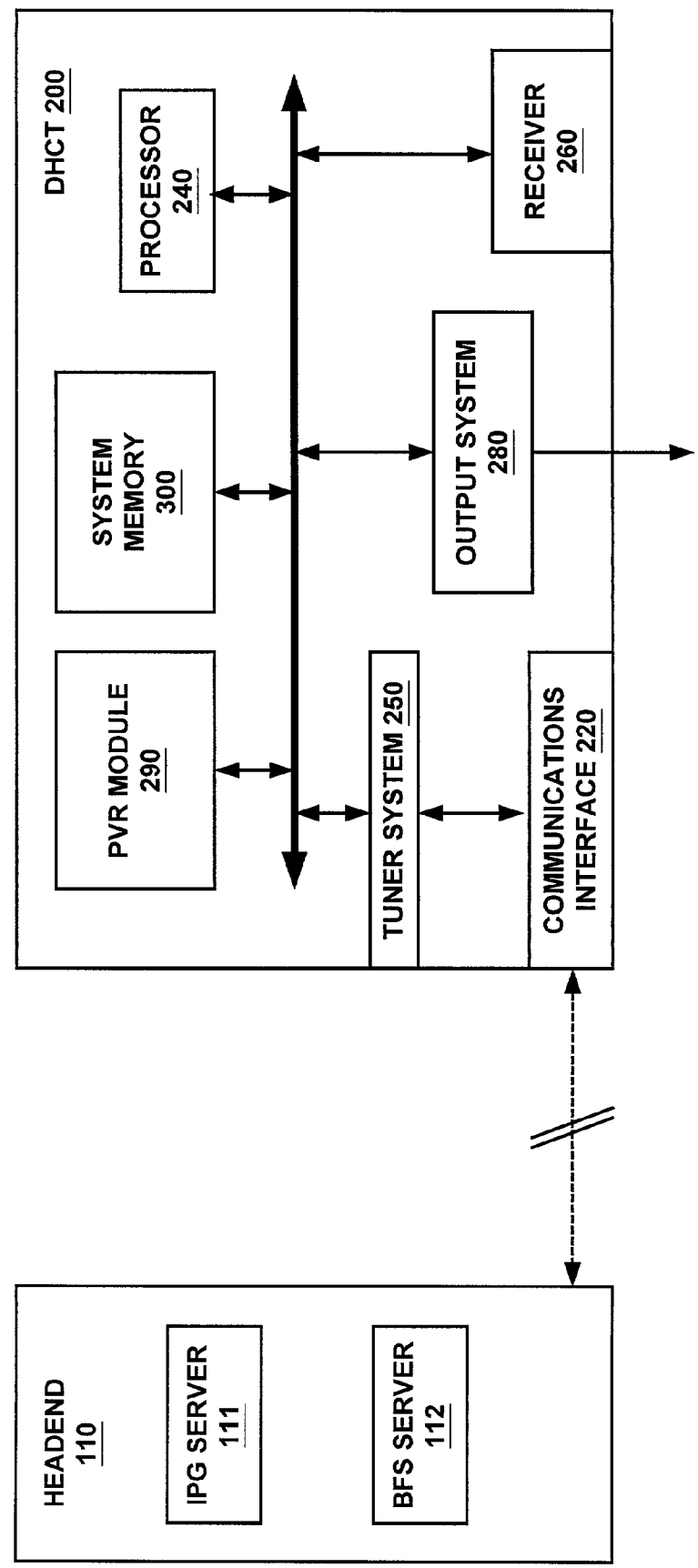
FIG. 2 is a high-level block diagram depicting selected components of the DHCT and headend depicted in FIG. 1.

FIG. 2 is a high-level block diagram depicting selected components of the DHCT 200 and headend 110 depicted in FIG. 1. The DHCT 200 and headend 110 described herein are merely illustrative and should not be construed as implying any limitations upon the scope of the present invention. For example, an embodiment of the invention may be implemented using a DHCT comprising additional, fewer, and/or different components. Furthermore, an embodiment of the invention may also be implemented using a satellite receiver or an analog set-top box.

The DHCT 200 preferably includes a communications interface 220 for receiving signals (video, audio and/or other data) from the headend 110. The DHCT 200 further includes at least one processor 240 for controlling operations of the DHCT 200, an output system 280 for driving the display device 140, and a tuner system 250 for tuning to a particular television service to be displayed and for sending and receiving various types of data or media to/from the headend 110. The tuner system 250 includes, in one implementation, an out-of-band tuner and transmitter for bidirectional data communication using, for example, quadrature phase shift keying (QPSK), and a quadrature amplitude modulation (QAM) tuner for receiving broadcast television signals and data. A receiver 260 receives externally-generated user inputs or commands from an input device such as, for example, a remote control device.

The DHCT 200 also includes a personal video recorder (PVR) module 290 for recording television instances. The PVR module 290 may incorporate electronic, magnetic, optical, and/or other types of storage media for storing the recorded television instances. The DHCT 200 may also include an analog video decoder to decode and digitize the video and audio associated with a broadcast analog channel. The PVR module 290 may include a compression engine to compress the data of a decoded and digitized analog channel prior to storage. Although shown as residing within the DHCT 200, the PVR module 290 may alternatively be located outside the DHCT 200.

The DHCT 200 may include one or more wireless or wired interfaces (not shown), also called ports, for receiving and/or transmitting data to other devices. For instance, the DHCT 200 may feature a USB (Universal Serial Bus), an Ethernet port (for connection to a computer), an IEEE-1394 connection (for connecting to consumer electronics equipment), a serial port, a parallel port, a radio frequency (RF) interface, and/or an infra-red (IR) interface. In this manner, user inputs may, for example, be provided via a computer, via buttons or keys located on the exterior of the DHCT 200, via a hand-held remote control device, and/or via a keyboard that includes user-actuated keys, etc.

Figure 3:
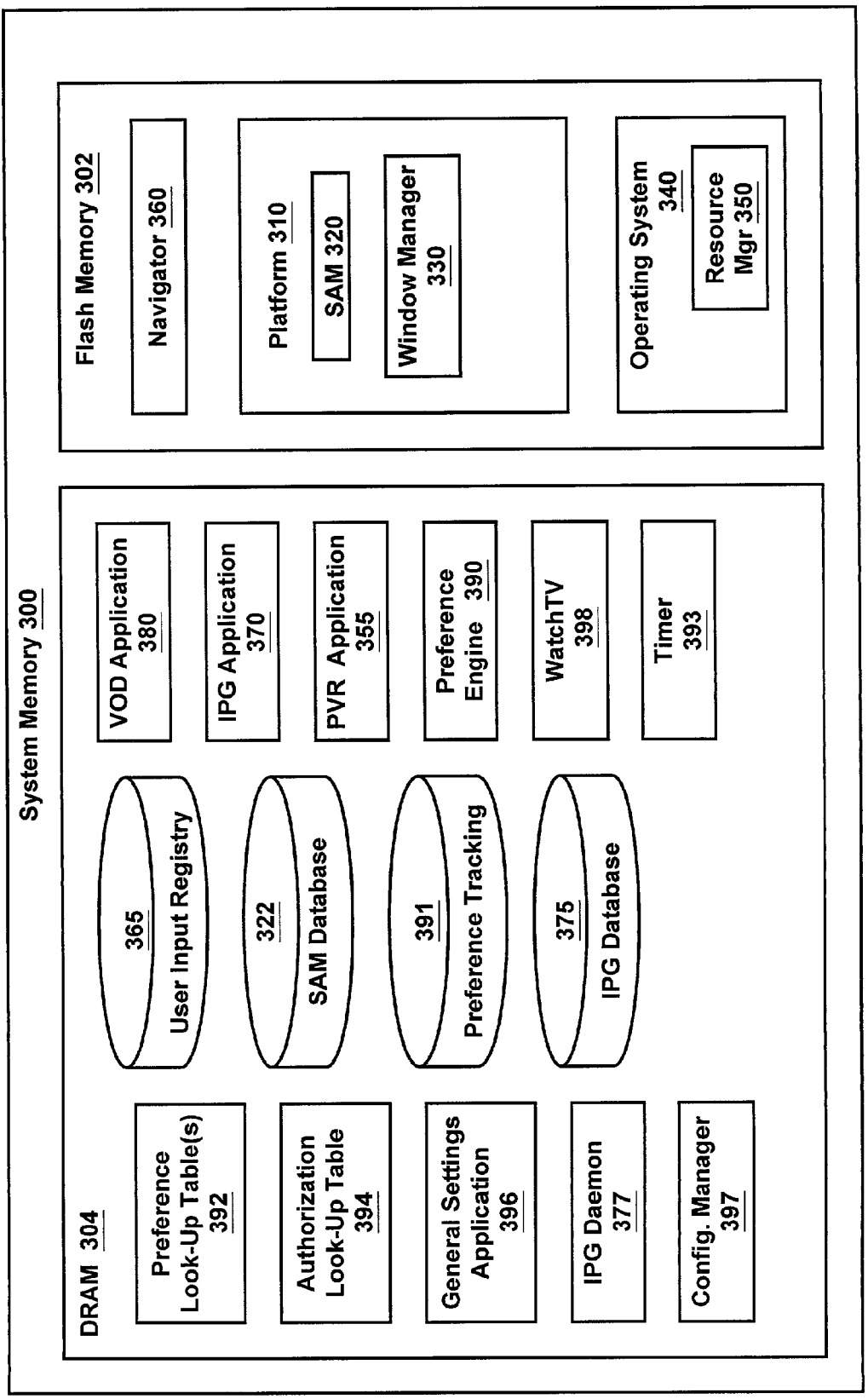
FIG. 3 is a block diagram illustrating a non-limiting example of selected components stored in system memory depicted in FIG. 2.

With additional reference to FIG. 2, FIG. 3 is a block diagram illustrating selected components stored in the system memory 300 of the DHCT 200. The system memory 300 described herein is merely illustrative and should not be construed as implying any limitations upon the scope of the present invention. In one implementation, system memory 300 includes flash memory 302 and dynamic random access memory (DRAM) 304 for storing various applications, modules and data for execution and use by the processor 240. Basic functionality of the DHCT 200 is provided by an operating system 340 that is primarily stored in flash memory 302. The operating system 340 includes at least one resource manager 350 that provides an interface to and coordination of resources of the DHCT 200 such as, for example, computing resources.

One or more programmed software applications, herein referred to as applications, are executed by utilizing the computing resources in the DHCT 200. Applications stored in flash memory 302 or DRAM 304 are executed by processor 240 under the auspices of the operating system 340. Data required as input by an application is stored in DRAM 304 or flash memory 302 and read by processor 240 as needed during the course of the application's execution. Input data may be data stored in DRAM 304 by a secondary application or other source, either internal or external to the DHCT 200, or possibly anticipated by the application and thus created with the application at the time it was generated as a software application, in which case it is stored in flash memory 302. Data generated by an application is stored in DRAM 304 by processor 240 during the course of the application's execution.

An application referred to as navigator 360 is also resident in flash memory 302 for providing a navigation framework for services provided by the DHCT 200. The navigator 360 registers for and in some cases reserves certain user inputs related to navigational keys such as channel up/down, last channel, favorite channel, etc. The client applications may be resident in flash memory 302 or downloaded into DRAM 304.

The flash memory 302 also contains a platform library 310. The platform library 310 is a collection of utilities useful to applications, such as a timer manager, a compression manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 310 that are shown in FIG. 3 are a window manager 330 and a service application manager (SAM) client 320.

The window manager 330 provides a mechanism for implementing the sharing of the screen regions and user input. The window manager 330 is also responsible for, as directed by one or more applications, implementing the creation, display, and allocation of the limited DHCT 200 screen resources. Window manager 330 allows multiple applications to share the screen by assigning ownership of screen regions, or windows. Window manager 330 communicates with resource manager 350 to coordinate available resources (such as display memory) among different resource-consuming processes. Such processes may be directly or indirectly invoked by one or more applications. The window manager 330 also maintains, among other things, a user input registry 365 in DRAM 304 so that when a user enters a key or a command via a remote control device or another input device such as a keyboard or mouse, the user input registry 365 may be accessed to determine which of various applications running on the DHCT 200 should receive data corresponding to the input key and in which order. As an application is executed, it registers a request to receive certain user input keys or commands. When the user presses a key corresponding to one of the commands on the remote control device, the command is received by the receiver 260 and relayed to the processor 240. The processor 240 dispatches the event to the operating system 340 where it is forwarded to the window manager 330. The window manager 330 then accesses the user input registry 365 and routes data corresponding to the incoming command to the appropriate application.

The SAM client 320 is a client component of a client-server pair of components, with the server component being located on the headend 110 (FIG. 1). A SAM database 322 in DRAM 304 includes a data structure of services that are created and updated by the headend 110. Many television services can be defined using the same application component, with different parameters. Television services include, without limitation and in accordance with one implementation, the presentation of television broadcast programs, video-on-demand (VOD), music or other audio data, and interactive program guides (IPG).

In general, the identification of a service includes the identification of an executable application that provides the service along with a set of application-dependent parameters that indicate to the application the service to be provided. As a non-limiting example, a service of presenting a television instance could be executed with a set of parameters to view HBO or with a separate set of parameters to view CNN. Each association of the application component (tune video) and one parameter component (HBO or CNN) represents a particular service that has a unique service I.D.

Application clients can be downloaded into DRAM 304 at the request of the SAM client 320, typically in response to a request by the user or in response to a message from the headend. In this non-limiting example, DRAM 304 contains a PVR application 355, an interactive program guide (IPG) application 370, a video-on-demand (VOD) application 380, and a preference engine application 390. It should be clear to one with ordinary skill in the art that these applications are not limiting and merely serve as examples for this present embodiment of the invention. Furthermore, one or more DRAM based applications may, as an alternative embodiment, be resident in flash memory 302. These applications, and others provided by a subscriber television system operator, are software entities for providing services to the user.

The preference engine 390 monitors a user's or household's television viewing preferences by keeping track of viewing parameters corresponding to services that the DHCT 200 presents. A viewing parameter may be a television service, a type of television service, a television instance, or a type of television instance, among others. A viewing parameter may also be a service instance's assigned rating such as the rating signifying the intended audience. As used herein, a service instance is a service presentation such as, for example, a television program (or episode) or a VOD movie. In one embodiment, by retrieving information from DRAM 304 and from an internal timer 393, a preference engine 390 keeps track of viewing parameters in relation to the time of day, i.e. the "clock time." The preference engine 390 stores information in DRAM 304 according to the tracking procedures it performs. In another embodiment, the preference engine 390 also keeps track of viewing parameters in relation to the time of week, e.g., Monday, Tuesday, Wednesday, Thursday, Friday, Saturday, Sunday, Weekday (Monday-Friday), or Weekend (Saturday and Sunday). In yet another embodiment, the preference engine 390 also keeps track of viewing parameters in relation to the time of year (e.g., calendar date). By keeping track of the extent to which various television services, types of television services, service instances, and types of service instances are presented in relation to time of day, time of week, and/or time of the year, the preference engine 390 facilitates the provision of improved television services to the user. Such improved services may include, for example, the provision of customized IPGs, service navigation, and service instance recording.

In one embodiment, the preference engine 390 keeps track of viewing parameters through the use of one or more preference tracking databases 391. Although referred to as a "database", a preference tracking database 391 may comprise data structures that are not stored in a database format. A preference tracking database 391 contains data that reflect the extent to which a DHCT 200 presents various television services during one or more time periods. In one embodiment, a preference tracking database 391 keeps track of the duration and/or frequency that a DHCT 200 presents services having certain viewing parameters. For example, a preference tracking database 391 may contain scores that are correlated to the duration and/or frequency that a DHCT 200 presents services having certain viewing parameters. One or more preference look-up tables 392 may be created in memory based on data collected in connection with a user or household's viewing preferences. Such data may be based on, for example, a preference tracking database 391 or user input that expressly indicates user preferences. In one embodiment, the preference look-up tables 392 are created by the preference engine 390 and contain viewing parameters that are associated with respective time periods. The viewing parameters may be television services, types of television services, service instances, types of service instances, service instance ratings, and/or respective content parameters, among others. A content parameter may be used to explicitly specify the presence of violence, offensive language, and sexual content in a service instance, for example. These parameters may be retrieved from IPG database 375 stored in DRAM 304, and may be part of a service instance's information. Each time period may represent a time of day, a time of week, a time of year, or a combination thereof (e.g., 1:00 p.m. to 2:00 p.m. on Sunday in January). In one embodiment, a preference look-up table 392 contains a plurality of rows where each row corresponds to a respective daily time period. In one possible implementation, each row corresponds to a half-hour time period. In another possible implementation, a plurality of preference look-up tables 392 corresponding to a plurality of respective weekdays are used. For example, one preference look-up table 392 may be used for each of the seven days of the week. Alternatively, one preference look-up table 392 may be used for a group of days such as Monday through Friday, another for weekend days, such as Saturday and Sunday, and yet another for holidays.

In an alternative embodiment, look-up tables may be created by a user during a configuration or customization procedure without the assistance of preference engine 390. The preference engine may function autonomously thereafter or until the subscriber conducts another configuration or customization procedure. In yet another embodiment, a preference engine 390 is not included in the DHCT 200.

A person with ordinary skill in the art will understand that there are many different methods of arranging and storing data. A preference look-up table 392 is not necessarily stored in a table format; it is, however, presented here in a table format for illustrative purposes. The following table represents a non-limiting example of some of the information that may be contained in a preference look-up table 392 in accordance with one embodiment of the invention.

TABLE 1

Example of preference look-up table for types of service instances

| Time | Type |
|---|---|
| 1:00 a.m. to 2:00 a.m. | MOVIES |
| 2:00 a.m. to 3:00 a.m. | MOVIES |
| 3:00 a.m. to 4:00 a.m. | MOVIES |
| 4:00 a.m. to 5:00 a.m. | MOVIES |
| 5:00 a.m. to 6:00 a.m. | MOVIES |
| 6:00 a.m. to 7:00 a.m. | NEWS |
| 7:00 a.m. to 8:00 a.m. | NEWS |
| 8:00 a.m. to 9:00 a.m. | CARTOONS |
| 9:00 a.m. to 10:00 a.m. | CARTOONS |
| 10:00 a.m. to 11:00 a.m. | CARTOONS |
| 11:00 a.m. to 12:00 p.m. | CARTOONS |
| 12:00 p.m. to 1:00 p.m. | SOAP-OPERAS |
| 1:00 p.m. to 2:00 p.m. | SOAP-OPERAS |
| 2:00 p.m. to 3:00 p.m. | SOAP-OPERAS |
| 3:00 p.m. to 4:00 p.m. | TALK-SHOWS |
| 4:00 p.m. to 5:00 p.m. | TALK-SHOWS |
| 5:00 p.m. to 6:00 p.m. | TALK-SHOWS |
| 6:00 p.m. to 7:00 p.m. | NEWS |
| 7:00 p.m. to 8:00 p.m. | SIT-COMS |
| 8:00 p.m. to 9:00 p.m. | SIT-COMS |
| 9:00 p.m. to 10:00 p.m. | SPORTS |
| 10:00 p.m. to 11:00 p.m. | SPORTS |
| 11:00 p.m. to 12:00 a.m. | MOVIES |
| 12:00 a.m. to 1:00 a.m. | MOVIES |

In the example shown in table 1, each time period is associated with a type of service instance. In an alternative embodiment, each time period in a preference look-up table 392 may be associated with multiple viewing parameters that are ranked based on a score corresponding to a user's or household's viewing time and/or viewing frequency of services having such viewing parameters. In an alternative embodiment in which the subscriber customizes viewing preferences for specific time periods, each preference look-up table 392 may be associated with one or more TV services, but where each service is only associated with one look-up table.

Each entry in a look-up table associated with a period of time may comprise multiple preferences or specifications for that entry. The number of viewing parameters may differ from a first entry to a second entry. Each entry can have an independent number of viewing parameters associated with it. As a non-limiting example, the flexibility to associate any number of viewing parameters in each entry is provisioned by implementing a link-list structure for its set of viewing parameters.

Multiple preference look-up tables 392 may be used for looking up different combinations of viewing parameters and time periods. For example another preference look-up table 392 may be used to look up television service preferences based on the day of the week. Alternatively, a separate look-up table contains information for locating a look-up table corresponding to a respective day of the week. In an alternative embodiment a multidimensional preference look-up table 392, possibly implemented with link lists as described above, may be used to look up multiple types of viewing parameters associated with multiple types of time periods.

In one implementation, applications executing on the DHCT 200 work with the navigator 360 by abiding by several guidelines. First, an application utilizes the SAM client 320 for the provision, activation, and suspension of services. Second, an application shares DHCT 200 resources with other applications and abides by the resource management policies of the SAM client 320, the operating system 340, and the DHCT 200. Third, an application conforms to situations where shared resources are only accessible via the navigator 360. Fourth, when an application loses service authorization while providing a service, the application suspends the service via the SAM client 320 (the navigator 360 will reactivate an individual service application when it later becomes authorized). Finally, an application client is designed to not have access to certain user input keys reserved by the navigator 360 (e.g., power, channel +/−, volume +/−, etc.).

Data and software used in providing a DHCT service to a user may be stored in one or more of the following memory resources: a data storage device located at a headend, a data storage device located at a customer premises, a non-volatile memory internal to the DHCT 200, and/or a hard drive internal to the DHCT 200. For example, an executable program or algorithm corresponding to an operating system (OS) component, or to a client platform component, or to a client application (e.g., IPG application 370), or to respective parts thereof, may reside in and/or execute out of DRAM 304 and/or flash memory 302, or may reside in a local storage device connected to DHCT 200 and may be transferred into DRAM 304 for execution. Likewise, data input for an executable program or algorithm may reside in DRAM 304 or in flash memory 302, or may reside in a local storage device connected to the DHCT 200 and may be transferred into DRAM 304 for use by an executable program or algorithm. In addition, data output by an executable program or algorithm may be written into DRAM 304 by the executable program or algorithm and may be transferred to flash memory 302 or to a local storage device for storage purposes. It should be noted, however, that the present invention is not limited by where or how any data and/or applications are stored or retrieved.

The IPG application 370 has a data gathering mechanism, or daemon 377, running continuously as a background task to receive IPG data intended to reside in the DRAM 304. IPG daemon 377 receives IPG data corresponding to a time-window and stores such IPG data for a pre-specified period of time in the DRAM 304. This mechanism can be employed at power-up and/or during periodic updates that, for instance, occur at pre-determined times (such as midnight). The IPG data updates can also occur upon change to the data on an IPG server 111 and subsequent notification to the client that new data is available.

Transmission of data packets containing a time specification from the headend 110 helps the DHCT 200 to synchronize its clock and keep track of time and intervals. In one implementation, a timer in the DHCT 200 can count down to a time that initiates processor 240 to signal the IPG daemon 377 background task to retrieve transmitted IPG data. DHCT 200 can receive IPG data, for instance, as a BFS file transmitted via a BFS server 112 either as an in-band or out-of-band transmission, or both. Hence, an IPG server 111 in communication with the BFS server 112 can package an IPG database into files and transfer them to the BFS server 112 for downstream transmission.

IPG data typically spans service instance information for a complete service line-up, be it hundreds or possibly thousands of services, for a pre-specified time-window (e.g, 14 or 30 days). An individual service (e.g., NBC, Video-On-Demand, Email) is typically associated with each service. Since the duration of service instances vary, for example, typically from 30 minutes to 210 minutes, a service could possibly offer 48 service instances per day, as an example.

As a non-limiting example, IPG data comprises data organized into database records or other data structures. The IPG data records comprise fields containing information such as service instance titles, service instance descriptions, service instance content descriptions, service instance genre, service instance release years, casts or performers lists, ratings information, play duration, and/or links to additional respective service instance related information such as service instance previews and critic's reviews and comments. In another embodiment, service instance information may include a price for a service rendering a service instance as well as an effective window of time and/or calendar days in which the service is purchasable.

The IPG database 375 contains information for the presentation of available service instances at the current time and for subsequent periods throughout a time-window into the future designated to be supported by IPG application 370. Part of the IPG data may be retained at the IPG server 111 for on-demand requests by a DHCT. Such is the case for Service Instance Long Descriptions that would require excessive DHCT 200 memory for storage, especially in light of the large number of service instances provided by a large service line-up over multiple days. The remainder of the IPG data is intended to reside in the DHCT 200 and is broadcast via one or more downstream data services, possibly one or more in-band transmission channels or out-of-band (OOB) transmission channels.

A user's request for a service instance information (e.g., a program's Long Description) stored in an IPG server 111 at the headend 110 generates a signal that is transmitted from the DHCT 200 to the IPG Server 111. The IPG server 111 transmits the requested service instance information via one or more downstream data services and the DHCT 200 conveniently downloads the information through its communications interface 220.

As time progresses, the IPG database 375 is updated due to one of various possible reasons such as: service instance data becomes obsolete as an IPG time-window "shifts" in pre-specified time-increments into the future; TV stations or other services (e.g., digital music services) may alter their service instance offering due to one of many possible reasons (e.g., NBC overrides a scheduled program to transmit a President's State of the Union address); or a change in the service line-up.

IPG application 370 functionality includes database management capabilities in which database records can be stored in DRAM 304 or some other storage device. The IPG server 111 in communication with IPG application 370 effects updates to the IPG database 375 stored in DRAM 304 on a regular or periodic basis. IPG application 370 receives information on the IPG database 375 transmitted by IPG server 111 through the communications interface 220 and invokes its database management functionality to store received IPG database 375 in a section of DRAM 304. The IPG application 370 is preferably a programmed software application executed by utilizing the computer resources in the DHCT 200. An executable program is stored in DRAM 304 and executed by processor 240 under the auspices of the real-time operating system. Thus, data required as input by the IPG application 370 is stored in DRAM 304 and read by processor 240 from DRAM 304 as need be during the course of the application's execution. IPG application 370 reads IPG database records and processes them into displayable representations as part of a graphical user interface (GUI) presentation displayed on the display device 140.

In one embodiment, configuration manager 397 working in communication with general settings application 396 allows a user to select and customize the user's control of TV functionality, including displayable information retrieved from IPG database 375, for one or more time periods. In this way the user can customize the extent of TV functionality and/or of IPG information displayed to the user's liking. A user can customize TV functionality and/or displayable IPG information to adaptively change over time. The customization of time-adaptive functionality can be indefinite until a user overrides an existing selection in the future or until a period of time expires according to the user's customization. In one embodiment in which preference engine 390 exists and is allowed to function, the user's customization may be altered in the future by preference engine 390.

Customizable information further includes the configuration and layout of an IPG screen for different time periods in addition to the IPG information. Displayable IPG information for each of a plurality of time periods can be customized by service identity, service instance type, service type, service instance rating, and/or service instance content, among others. Other configurable aspects of IPG information pertain to which applications are permitted to present IPG information during each respective time period. For instance, since IPG information is accessible by WatchTV 398 to populate fields in a service banner during service changes, and within the fields of a displayed service guide's presentation, the user may customize or limit the IPG information that applications can retrieve from IPG database 375 and display during certain time periods or intervals.

Each of the above mentioned applications and functions mentioned throughout preferably comprise executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport an application for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which an application is printed, as the application can be electronically captured, via for instance optical scanning of the paper or other medium, then compiled, interpreted or otherwise processed in a suitable manner, and then stored in a computer memory.

Figure 4:
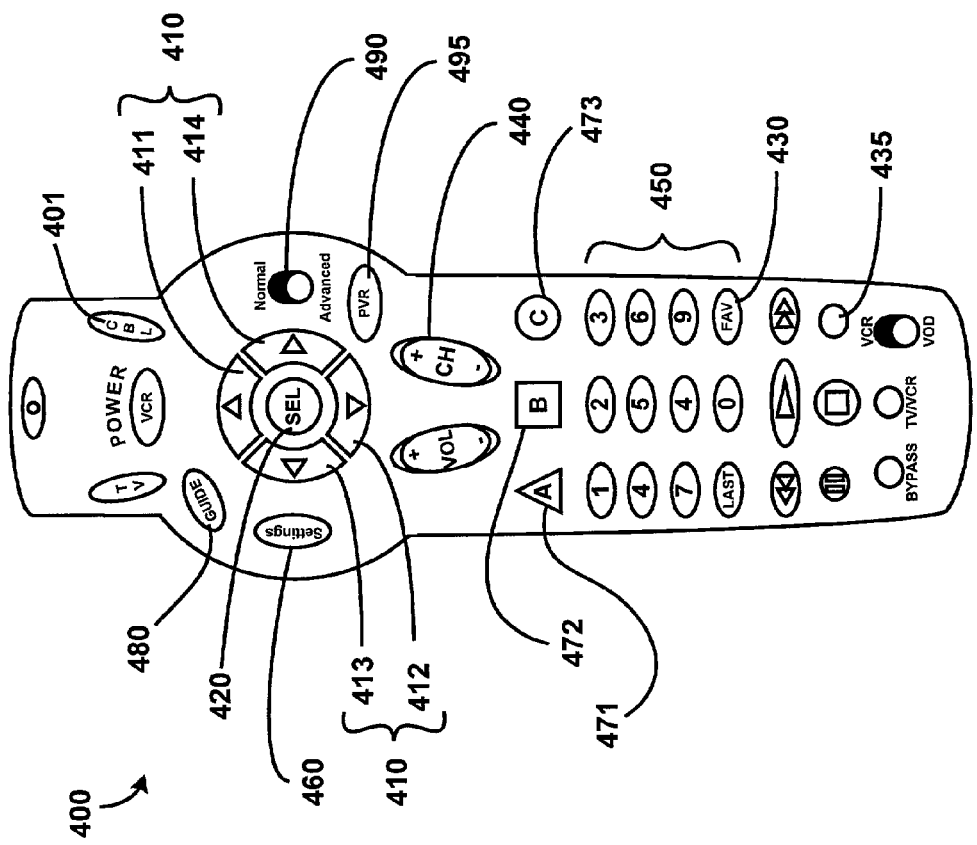
FIG. 4 depicts a non-limiting example of a remote control device that is used to provide user input to the DHCT.
Figure 5:
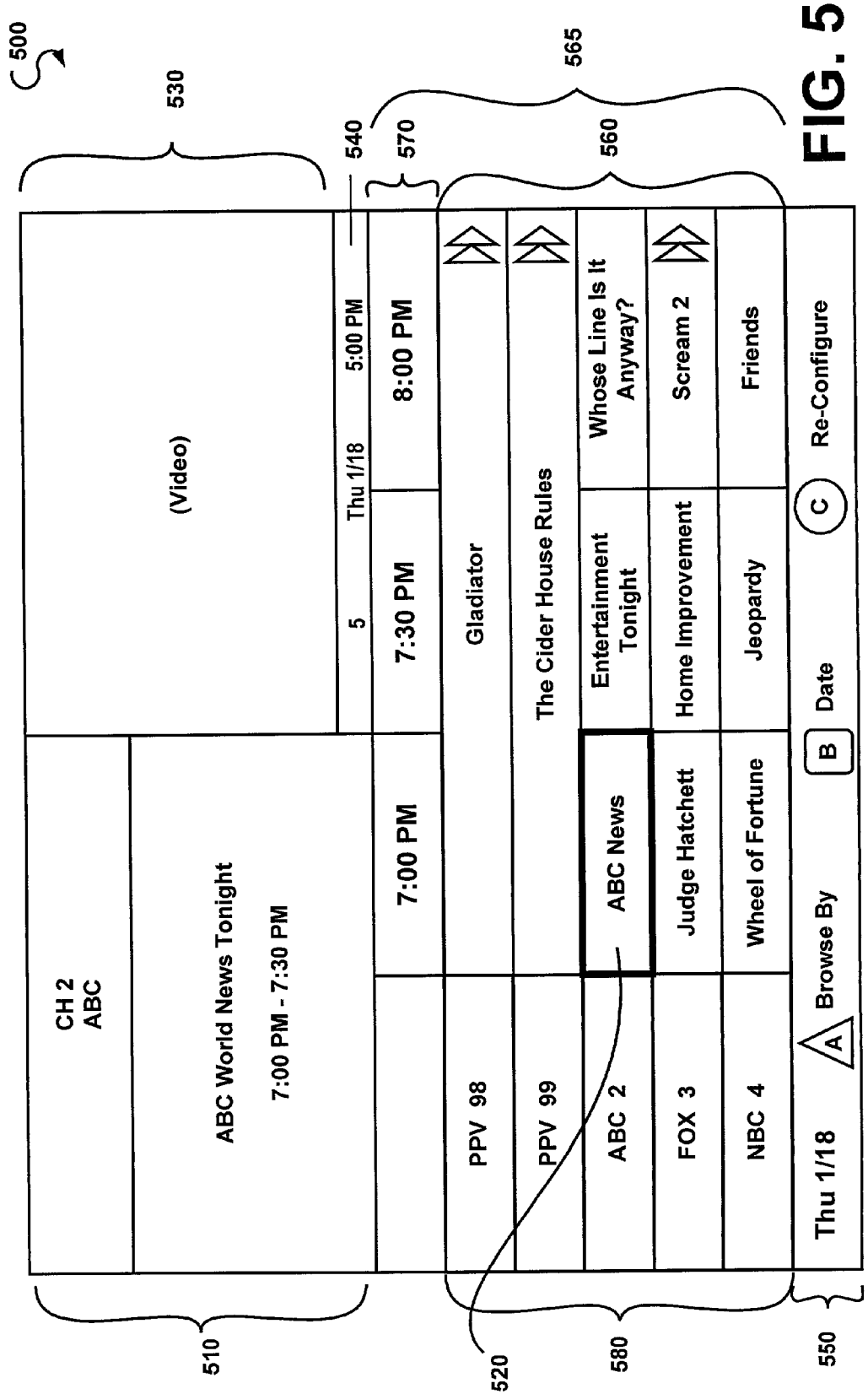
FIG. 5 depicts a non-limiting example of an IPG screen that illustrates a program guide arrangement in a time format.

FIG. 4 depicts a non-limiting example of a remote control device 400 that may be used to provide user input to the DHCT 200. The remote control device 400 described herein is merely illustrative and should not be construed as implying any limitations upon the scope of the present invention. Four arrow keys 410 are provided including an up arrow key 411, a down arrow key 412, a left arrow key 413, and a right arrow key 414. The arrow keys 410 can be used to scroll through on-screen options and/or to highlight an on-screen option, whereas the select key 420 may be used to select a currently highlighted option. The guide key 480 may be used to access a television program guide such as, for example, IPG 500 (FIG. 5). The function of the "A" key 471, the "B" key 472, and the "C" key 473 varies depending on the screen being presented to a user at the time of the key's activation. For example, in one embodiment of the present invention, the "A" key 471 can be used to confirm a selection, the "B" key 472 can be used to return to a previously displayed screen, and the "C" key 473 can be used to cancel a request. Other remote control elements function as follows: a PVR key 495 may be used to request a list of video recordings that are stored in the PVR module 290 (FIG. 2); a remote control status switch 490 may be used to determine whether the DHCT 200 will operate in a preference adaptive mode whereby DHCT functionality is responsive to predetermined user preferences, as will be described in greater detail below; the favorites key may be used to request a list of favorite television services; the settings key 460 may be used to request a general settings screen such as, for example, general settings screen 600 (FIG. 6); and the cable power key 401 may be used to activate the DHCT 200.

In an alternative embodiment, different and/or additional methods of providing user input may be used including, for example, a remote control device having different keys and/or key layouts, a keyboard device, a voice activated input system, a touch-screen display, etc. The invention described herein is not limited by the type of device used to provide user input. As a non-limiting example, the functionality of the arrow keys 410 may be provided via a disc-shaped key (not-shown) whereby locations on the disc-shaped key correspond to respective directions on a display screen.

With additional reference to FIGS. 1–4 throughout the remaining figure descriptions, FIG. 5 depicts a non-limiting example of an IPG screen 500 that illustrates an initial program guide arrangement in a time format. IPG screen 500 may be presented by the DHCT 200 (FIG. 2) in response to user input that is provided via, for example, the activation of the guide key 480 (FIG. 4). The top left portion of IPG screen 500 is a detailed focus area 510 that includes detailed television service information (e.g., television channel number, television channel name (ABC), program name, program description, duration, any episode information or rating, etc.) for a service instance displayed in the highlighted service instance area 520 in a main service instance display area 560. The fields in the detailed focus area 510 are populated with information read from IPG database 375 in DRAM 304 by IPG client application 370.

A television service which the DHCT 200 is currently providing (which is typically the service instance occupying the full screen before the user is presented with IPG screen 500) is displayed in a video area 530. Immediately below the video area 530 is an information banner 540 depicting the television service which the DHCT 200 is currently providing (e.g., channel 5), the current day and date (e.g., Thursday, January 18), and the current time (e.g., 5:00 p.m.). The date and timing information are retrieved from internal clock information stored in system memory 300. The displayed TV service information is retrieved from IPG database 375 stored in DRAM 304.

The main service instance display area 560 contains a listing of television instance titles corresponding to television instances that are or will be available for viewing during the time periods listed under the time area 570 and that correspond to respective television services identified in television service area 580. Service instance information displayed via IPG screen 500 is read from IPG database 375 in DRAM 304 by IPG client 370 to populate respective fields in the displayed presentation. The television service area 580 includes a vertical list of television services organized sequentially from top to bottom by increasing television service number (except for the lowest numbered television service which is typically listed immediately below the highest numbered television service). In one embodiment, the arrow buttons 410 can be used to scroll through the main service instance display area 560 and to highlight a desired service . As a user scrolls in time across a calendar day boundary, the day and date indications displayed in various areas are automatically updated. The corresponding displayed IPG fields are also updated by retrieving their respective information from IPG database 375.

Though other implementations are contemplated within the scope of the present invention, when the IPG application is first activated by the user, the lowest numbered television service listing in the television service lineup is typically centered in the television service area 580. In this non-limiting example, the lowest numbered television service in this television service list displayed in the television service area 580 is ABC®, which is shown as television channel 2. Continuing with this non-limiting example, the left-most time column in the main service instance display area 560 is set to include titles of service instances scheduled to be broadcast about two hours into the future with the middle title in the column being highlighted and corresponding to a service instance on the lowest numbered television service. Therefore, in this example, the service instance ABC News® 520, which will be on ABC® (television channel 2), is centered in the highlighted service instance area 520. It should be noted that the current service instance shown in video area 530 and referenced in information banner 540, corresponds to a currently tuned television service, which in this example is television channel 5, and not to the highlighted service instance on television channel 2.

The bottom area 550 of IPG screen 500 indicates the selected day for which service instance data is being displayed as well as information about the current functions of the "A", "B", and "C" keys on the remote control 400. In this example, the "A", "B", and "C" keys function as follows: the A key 471 can be used to access a browse-by list for requesting an IPG screen that contains a subset of television instances falling under a user selected browse-by category such as, for example, comedy, drama, action/adventure, sports, etc., as typically provisioned by service instance information stored in IPG database 375; the B key 472 can be used to request an IPG screen containing service instance listings for a user selected date; and the C key 473 can be used to initiate a process for re-configuring the content of an initial IPG screen.

In an alternative embodiment of the present invention, an IPG may have fewer, greater, or different components. For example, in one embodiment an IPG may not include the detailed focus area 510, the video area 530, the information banner 540, and/or the bottom area 550. In yet another embodiment, an IPG may have time listings that are arranged vertically and television service listings that are arranged horizontally.

One of ordinary skill in the art will understand that various IPG configurations are possible within the scope of the present invention, either indefinitely or by time periods as customized by a subscriber during a configuration procedure.

Figure 6:
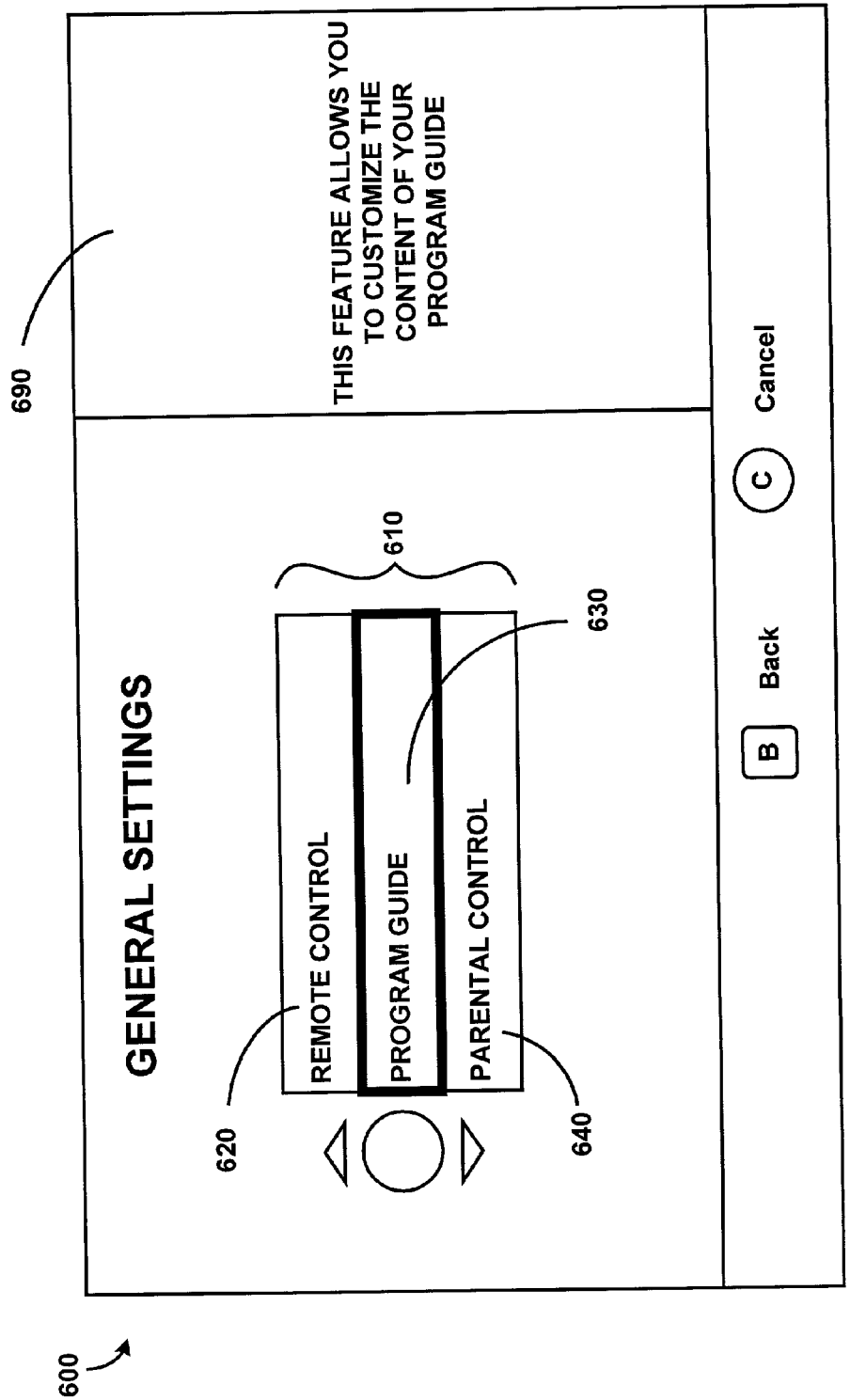
FIG. 6 depicts a non-limiting example of a general settings screen that may be presented to a viewer in response to the activation of the settings key depicted in FIG. 4.

FIG. 6 depicts a non-limiting example of a general settings screen 600 that may be presented to a user in response to the activation of the settings key 460 (FIG. 4). General settings menu 610 includes a remote control option 620, a program guide option 630, and a parental control option 640. The general settings options 620, 630, and 640 may be used to configure a remote control, a program guide and a parental control feature, respectively. Information section 690 provides information about the currently highlighted option which in this example is the program guide option 630. As in other examples below, a user may use the arrow keys 410 to highlight a desired option and the select key 420 in order to select a currently highlighted option. In an alternative embodiment, a general settings screen may contain different and/or additional options such as, for example, an option to select a second audio program (SAP).

Figure 7:
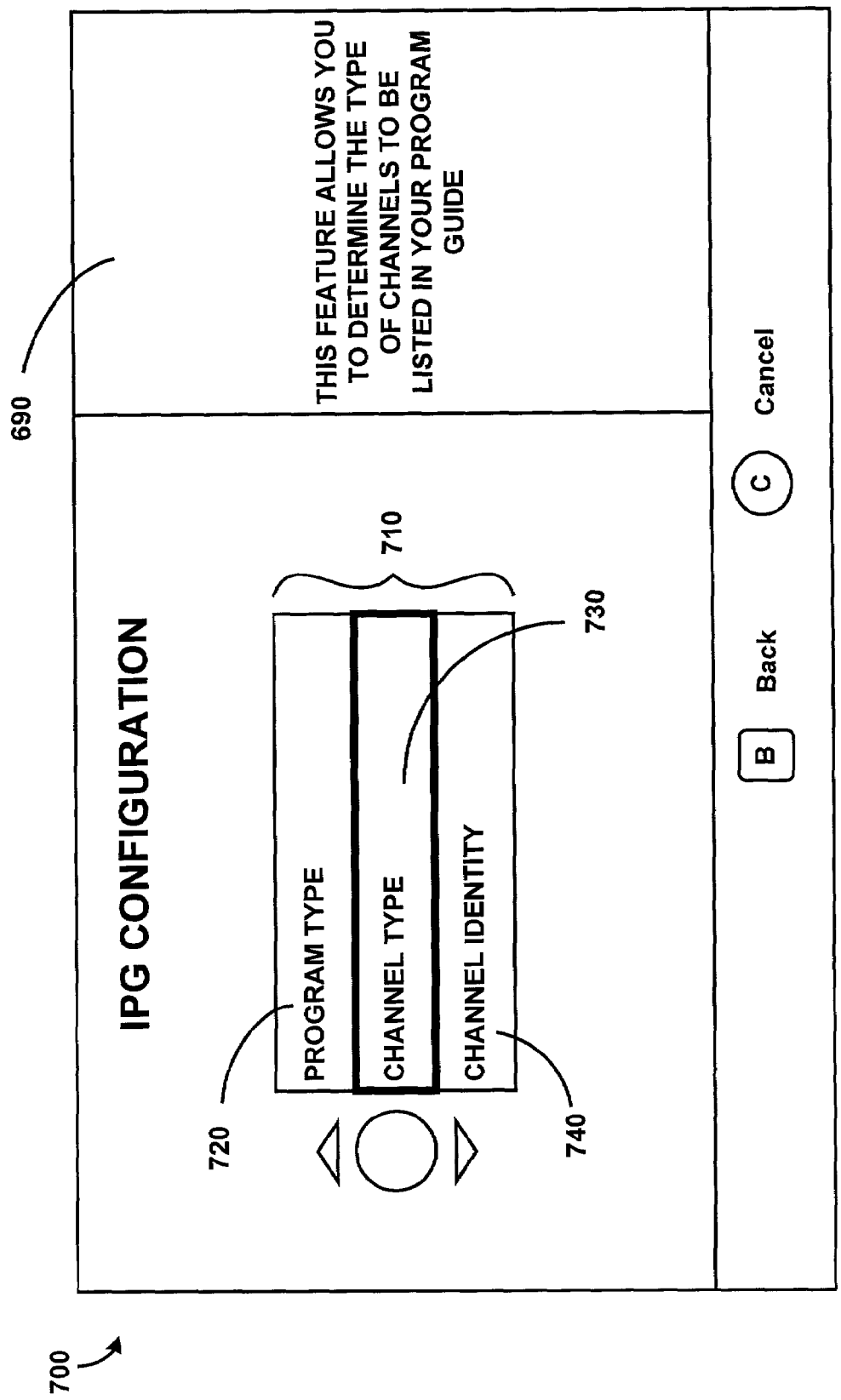
FIG. 7 depicts a non-limiting example of an IPG configuration screen that may be presented to a viewer in response to the selection of the program guide option via the general settings screen depicted in FIG. 6.

FIG. 7 depicts a non-limiting example of an IPG configuration screen 700 that may be presented to a user in response to the selection of the program guide option 630 (FIG. 6). IPG configuration menu 710 includes a program type option 720, a channel type option 730, and a channel identity option 740. The IPG configuration options 720, 730, and 740 may be used to configure the television service listings in an IPG based on selected service instance types, television service types, and television service identities, respectively. In another embodiment, an IPG configuration screen 700 may contain different and/or additional options such as, for example, an option to configure the time listings that are to be presented in an initial IPG screen. An initial IPG screen is an IPG screen that is presented to a user in response to user input that is received by the DHCT 200 while the user is not being presented with an IPG. User input requesting an IPG may be provided by activating for example, the guide key 480. In one embodiment, time periods in an initial IPG screen include one corresponding to the current time as well as subsequent consecutive periods in the future. The user can configure the IPG not to show any information for certain time periods in an initial IPG screen and/or other IPG screens.

Figure 8:
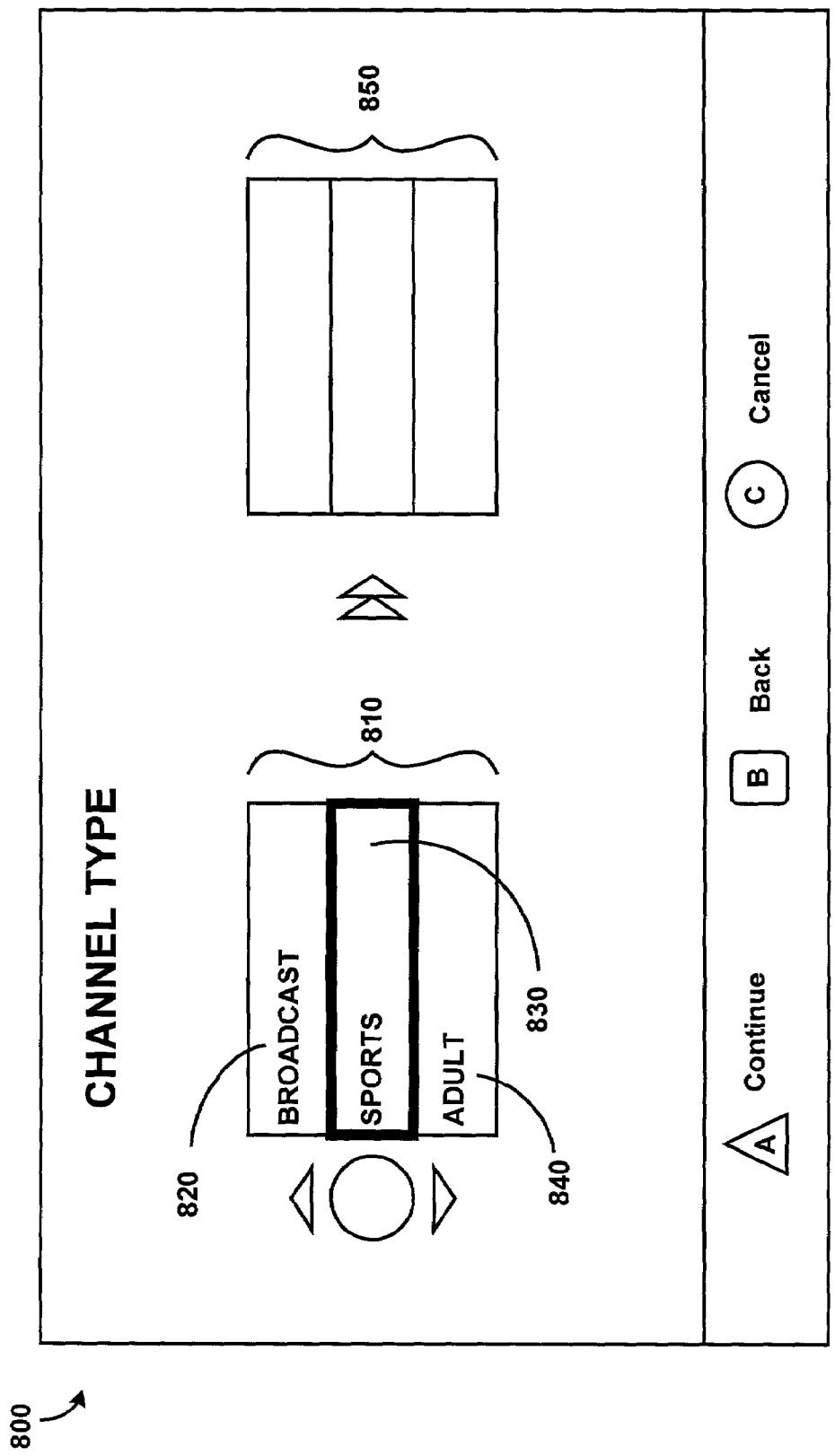
FIG. 8 depicts a non-limiting example of a service type selection screen that may be presented to a viewer after the selection of the service type option depicted in FIG. 7.

FIG. 8 depicts a non-limiting example of a television channel type selection screen 800 that may be presented to a user in response to the selection of the channel type option 730 (FIG. 7). In one embodiment, a channel type refers to a service that typically features only a certain type of service instance (e.g., sports channel ) and/or that has a certain characteristic (e.g., broadcast channel). In an alternative embodiment, a channel type corresponds to a type of service instance active at a particular time period in a service, as identified by a "program type" field in a program's information in IPG database 375.

Television channel type menu 810 includes a broadcast option 820, a sports option 830, and an adult option 840. The channel type options 820, 830, and 840 may be used to determine the television service listings in an initial IPG screen. A user may use the arrow keys 410 (FIG. 4) in order to access additional options by scrolling up or down the television channel type menu. In another embodiment of the invention, a television channel type selection screen 800 may contain different and/or additional channel type options such as, for example, music, news, shopping, foreign, etc. A channel type option that is selected from the television channel type menu is added to an active selection list 850. After the user completes the selection process, the user can provide additional input via the remote control 400 confirming his selections. Such input may be provided via, for example, the "A" key 471 (FIG. 4).

Figure 9:
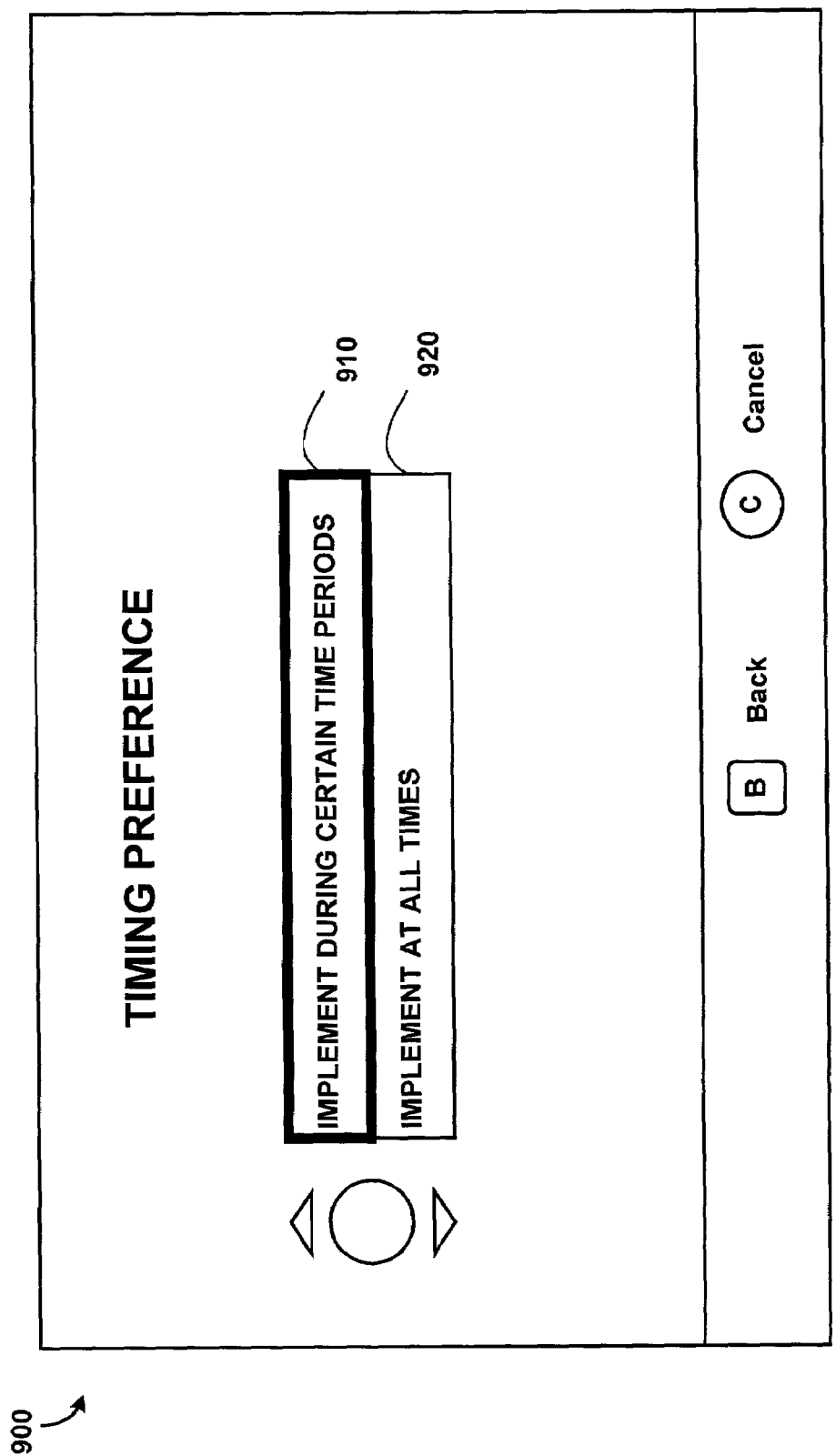
FIG. 9 depicts a non-limiting example of a timing preference screen that may be presented to a viewer in response to viewer selection of one or more new television setting(s) such as for example, an IPG or a service instance type setting.

FIG. 9 depicts a non-limiting example of a timing preference screen 900 that may be presented to a user in response to the selection of one or more new television setting(s) such as, for example, a channel type option from the channel type menu 810 (FIG. 8). The timing preference screen 900 includes timing preference options 910 and 920; the first option 910 may be selected by the user if the user wants the newly selected television setting(s) to be implemented only during certain time periods; the second option 920 may be selected by the user if the user wants the newly selected television setting(s) to be implemented for an indefinite period of time.

Figure 10:
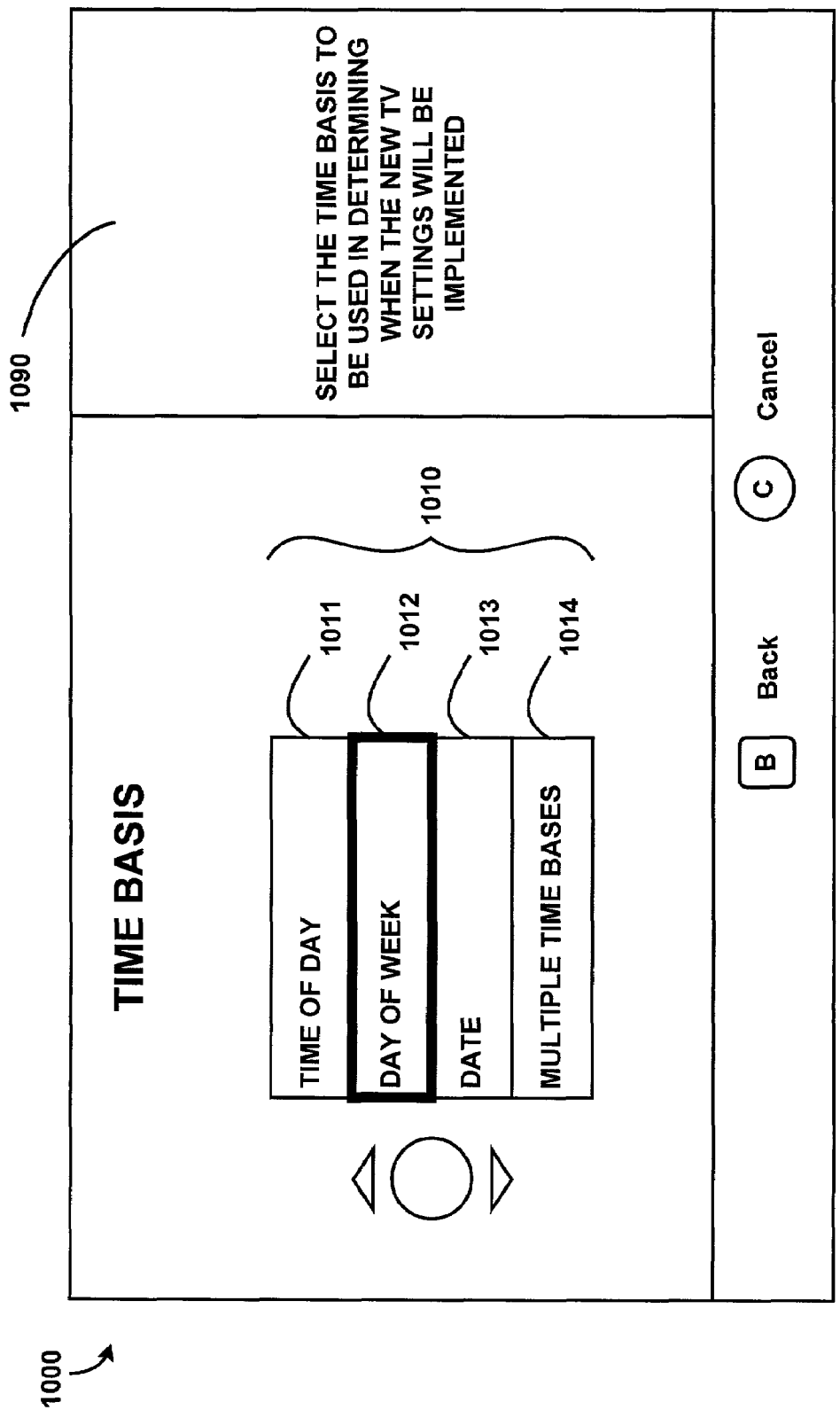
FIG. 10 depicts a non-limiting example of a time factor screen that may be presented to a viewer in response to the selection of an option via the timing preference screen depicted in FIG. 9.

FIG. 10 depicts a non-limiting example of a time basis screen 1000 that may be presented to a user in response to the selection of the first option 910 from the timing preference screen 900 (FIG. 9). A time basis menu 1010 includes time basis options 1011–1014 for determining a time basis for implementing the newly selected television setting(s). In this example, time bases options include time of day 1011, day of the week 1012, date 1013, and multiple time bases 1014. An instruction section 1090 provides instructions to the user in connection with the current screen. In this example, the instruction section 1090 states "SELECT THE TIME BASIS TO BE USED IN DETERMINING WHEN THE NEW TV SETTINGS WILL BE IMPLEMENTED."

Figure 11:
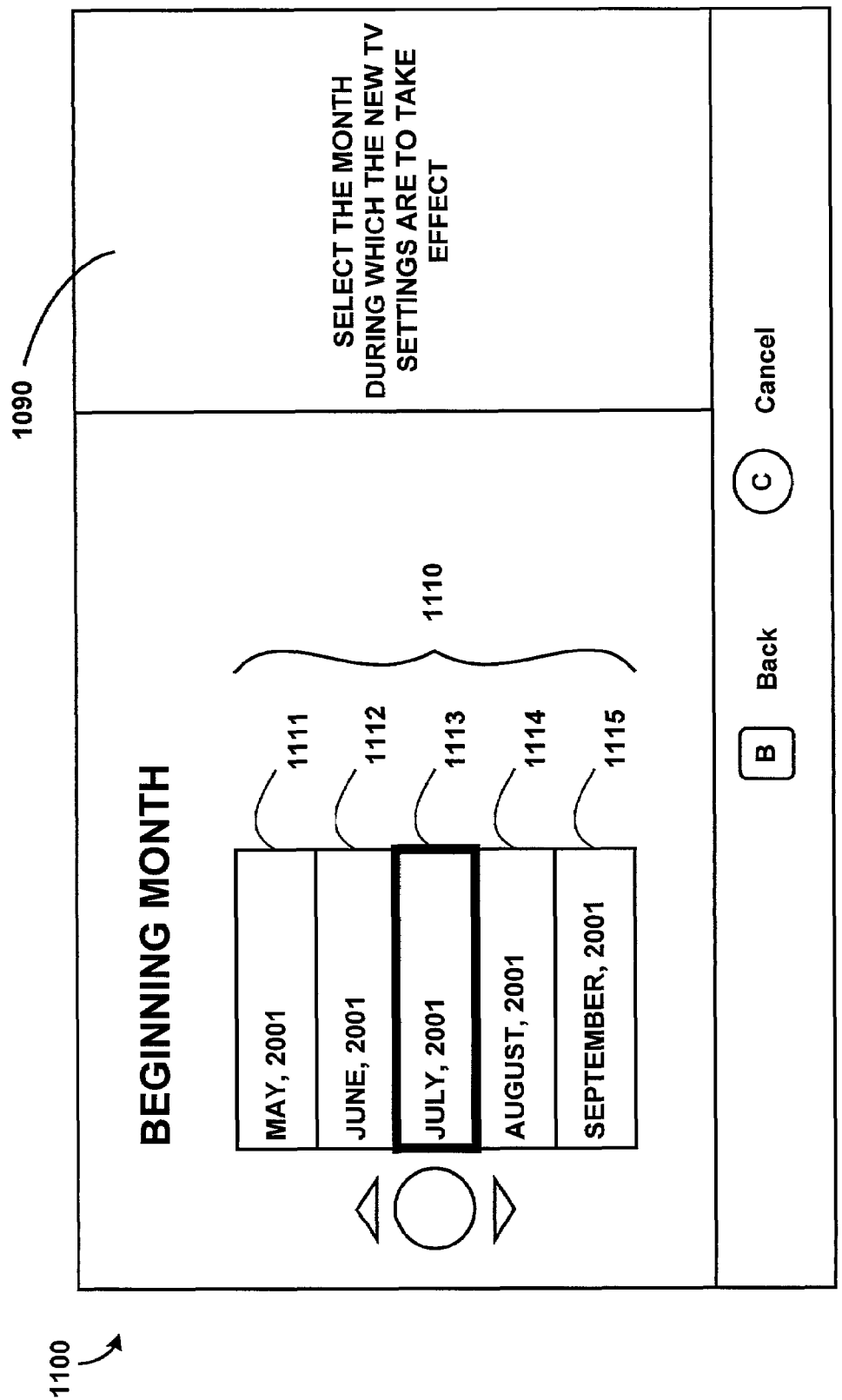
FIG. 11 depicts a non-limiting example of a beginning month selection screen that may be presented to a viewer in response to the selection of the multiple time factors option or the date option depicted in FIG. 10.

FIG. 11 depicts a non-limiting example of a beginning month selection screen 1100 that may be presented to a user in response to the selection of the multiple time bases option 1014 or the date option 1013 from the time basis screen 1000 (FIG. 10). A beginning month menu 1110 includes month selections 1111–1115 that may be used to select a month during which the newly selected television setting(s) are to take effect. A user can scroll up or down the beginning month menu in order to view or select additional month options (not shown). In another embodiment, the beginning month menu 1110 may initially display additional and/or different month options such as, for example, options corresponding to the months of January through April, October through December, or January through December.

Figure 12:
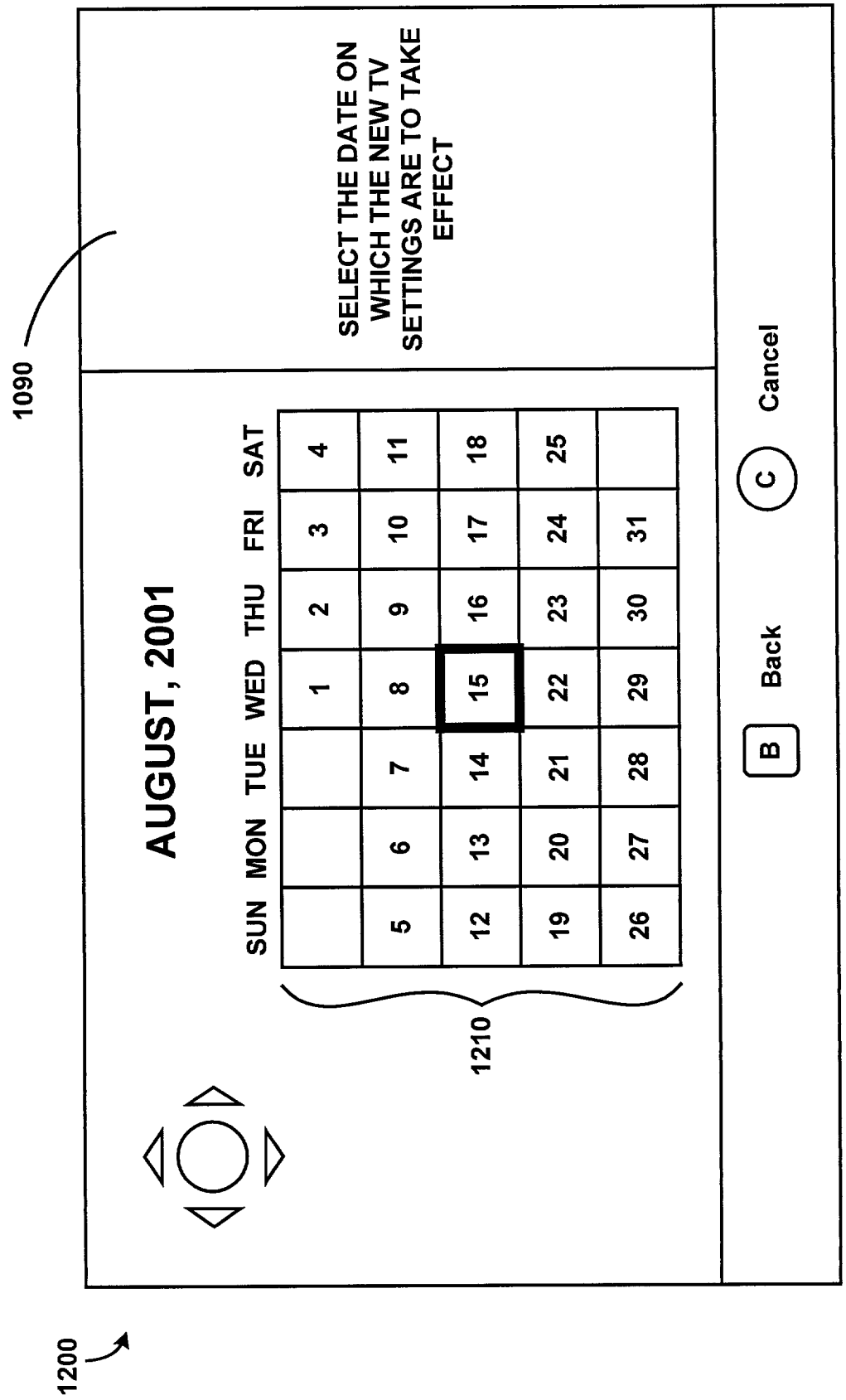
FIG. 12 depicts a non-limiting example of a beginning date selection screen that may be presented to a viewer in response to the selection of a beginning month option via the beginning month selection screen depicted in FIG. 11.

FIG. 12 depicts a non-limiting example of a beginning date selection screen 1200 that may be presented to a user in response to the selection of a beginning month option via the beginning month selection screen 1100 (FIG. 11). A beginning date selection grid 1210 includes date selections that may be used to select a date during which the newly selected television setting(s) are to take effect. A user can activate the arrow keys 410 in order to highlight a desired date, and can then select the highlighted date by activating the select key 420. In an alternative embodiment, the user may specify a date by entering a corresponding number via, for example, the number pad 450 on the remote control device 400 (FIG. 4).

Figure 13:
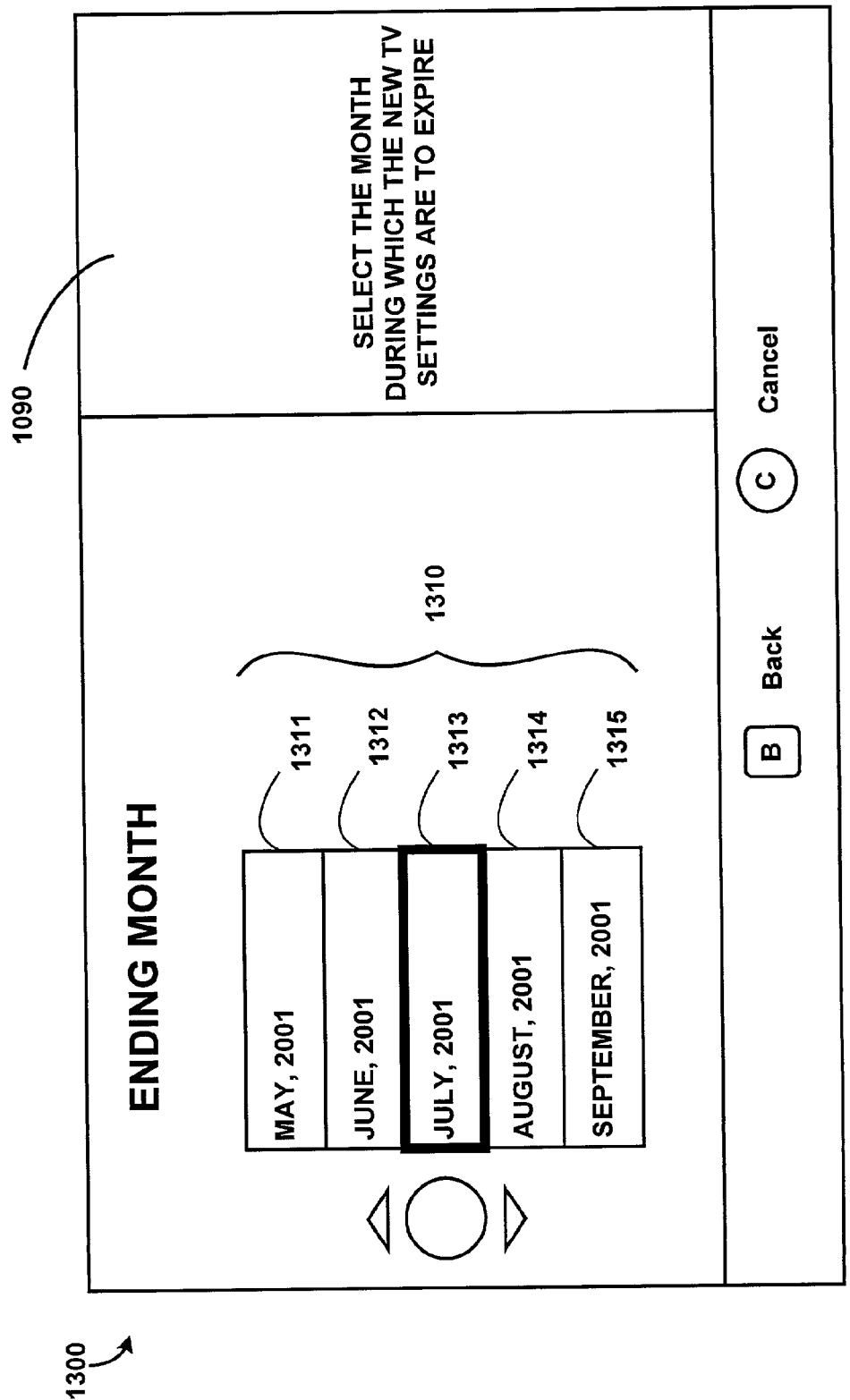
FIG. 13 depicts a non-limiting example of an ending month selection screen that may be presented to a viewer in response to the selection of a beginning date option via the beginning date selection screen depicted in FIG. 12.

FIG. 13 depicts a non-limiting example of an ending month selection screen 1300 that may be presented to a user in response to the selection of a beginning date option via the beginning date selection screen 1200 (FIG. 12). An ending month menu 1310 includes month selections 1311–1315 that may be used to select a month during which the newly selected television setting(s) are to expire. A user can scroll up or down the ending month menu in order to view or select additional month options (not shown). In another embodiment, the ending month menu 1310 may initially display additional and/or different month options such as, for example, options corresponding to the months of January through April, respectively.

Figure 14:
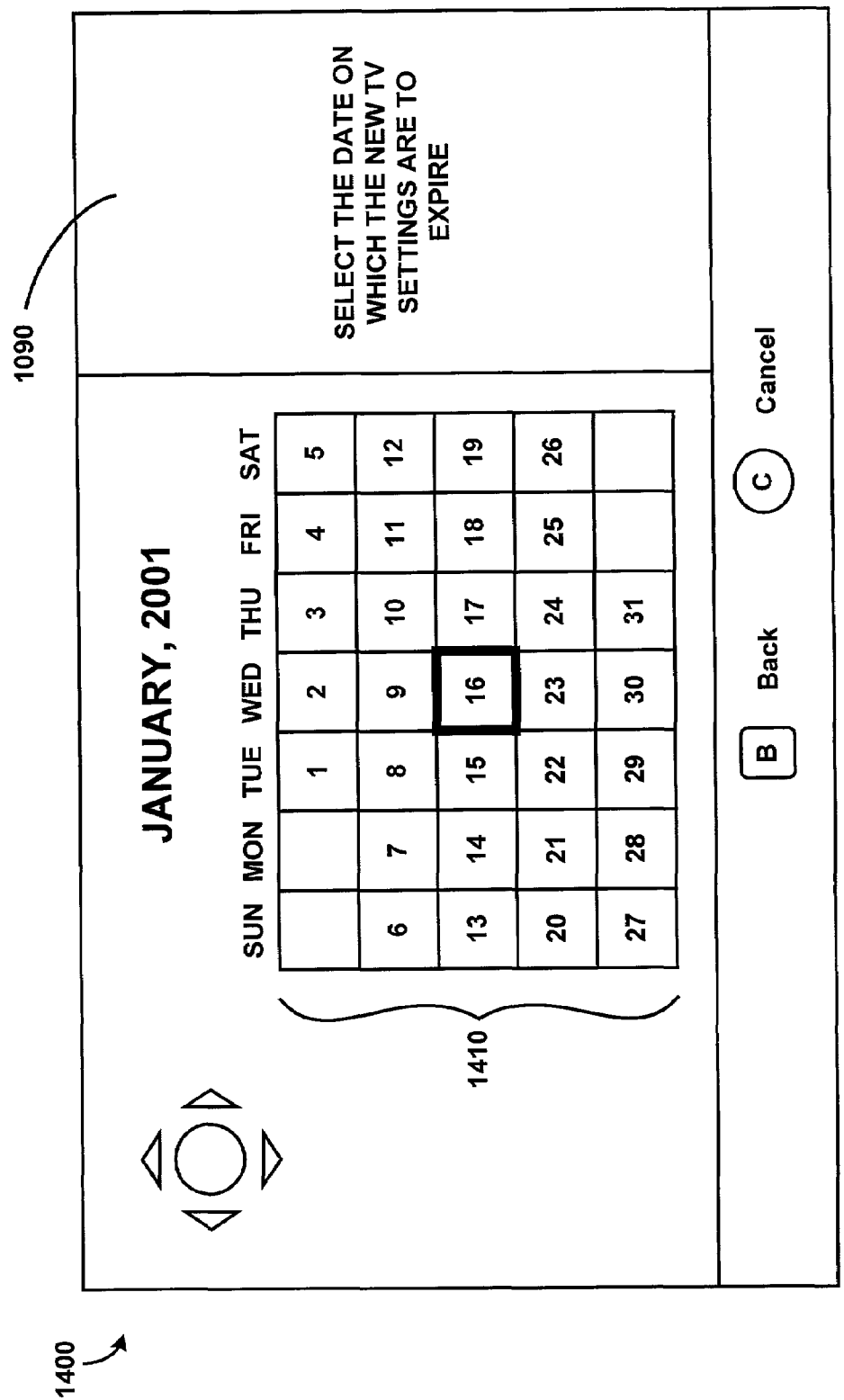
FIG. 14 depicts a non-limiting example of an ending date selection screen that may be presented to a viewer in response to the selection of an ending month option via the ending month selection screen depicted in FIG. 11.

FIG. 14 depicts a non-limiting example of an ending date selection screen 1400 that may be presented to a user in response to the selection of an ending month option via the ending month selection screen 1100 (FIG. 11). An ending date selection grid 1410 includes date selections that may be used to select a date during which the newly selected television setting(s) are to take effect. A user can activate the arrow keys 410 in order to highlight a desired date, and can then select the highlighted date by activating the select key 420. In an alternative embodiment, the user may specify a date by entering a corresponding number via, for example, the number pad 450 on the remote control device 400 (FIG. 4).

Figure 15:
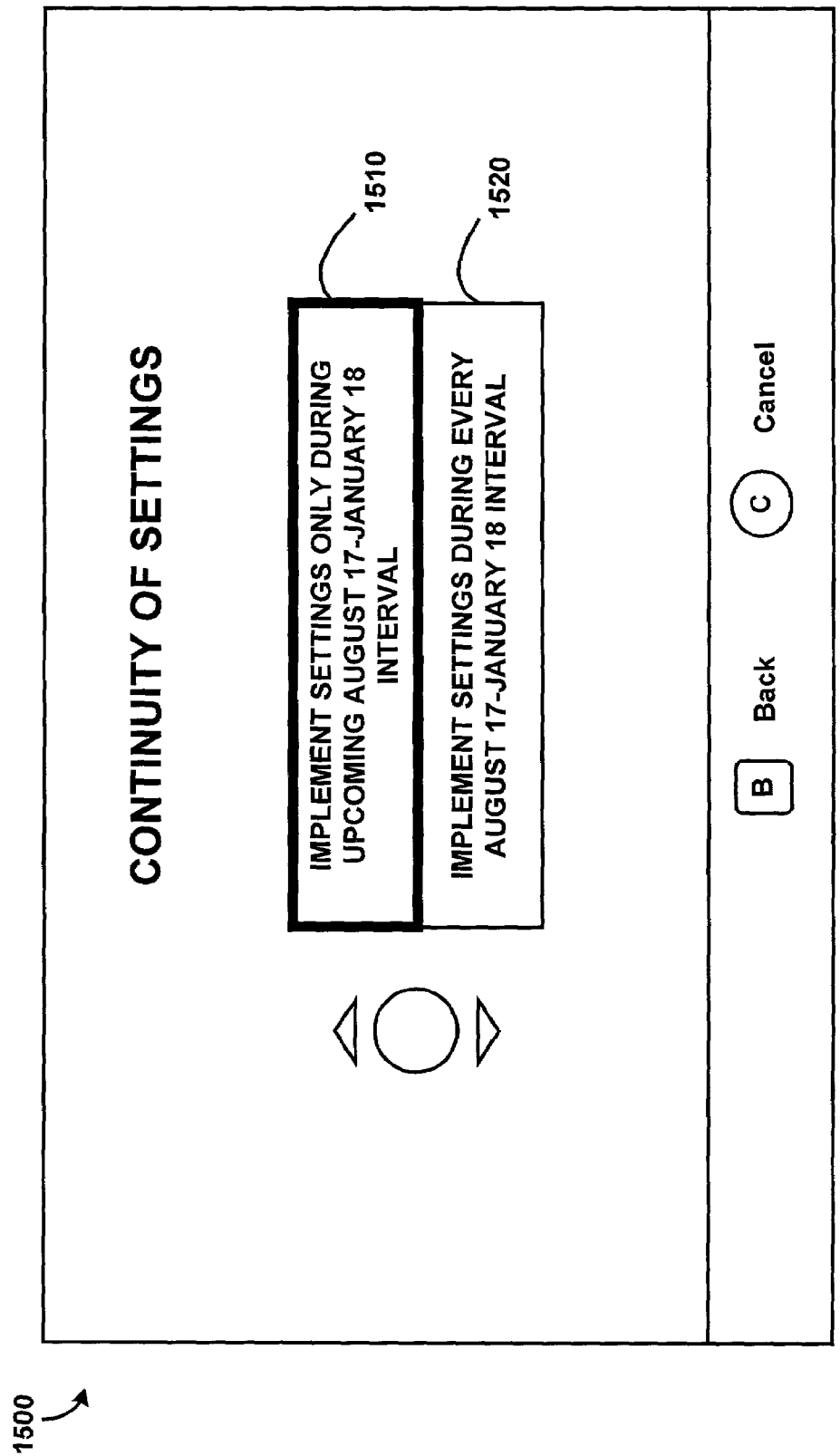
FIG. 15 depicts a non-limiting example of a continuity of settings screen that may be presented to a viewer in response to the selection of an ending date option via the ending date selection screen depicted in FIG. 14.

FIG. 15 depicts a non-limiting example of a continuity of settings screen 1500 that may be presented to a user in response to the selection of an ending date option via the ending date selection screen 1400 (FIG. 14). The continuity of settings screen provides a user with an option of implementing the newly selected television settings on a yearly basis during an interval that covers a period that corresponds to the period selected via the month and date selection screens 1100–1400 depicted in FIGS. 11–14, respectively. For example, if the user selects the time period August 17-January 18 via the selections screens 1100–1400, then the user can select the second option 1520 in order to request that the newly selected television settings be implemented during current and subsequent August 17-January 18 time periods.

Figure 16:
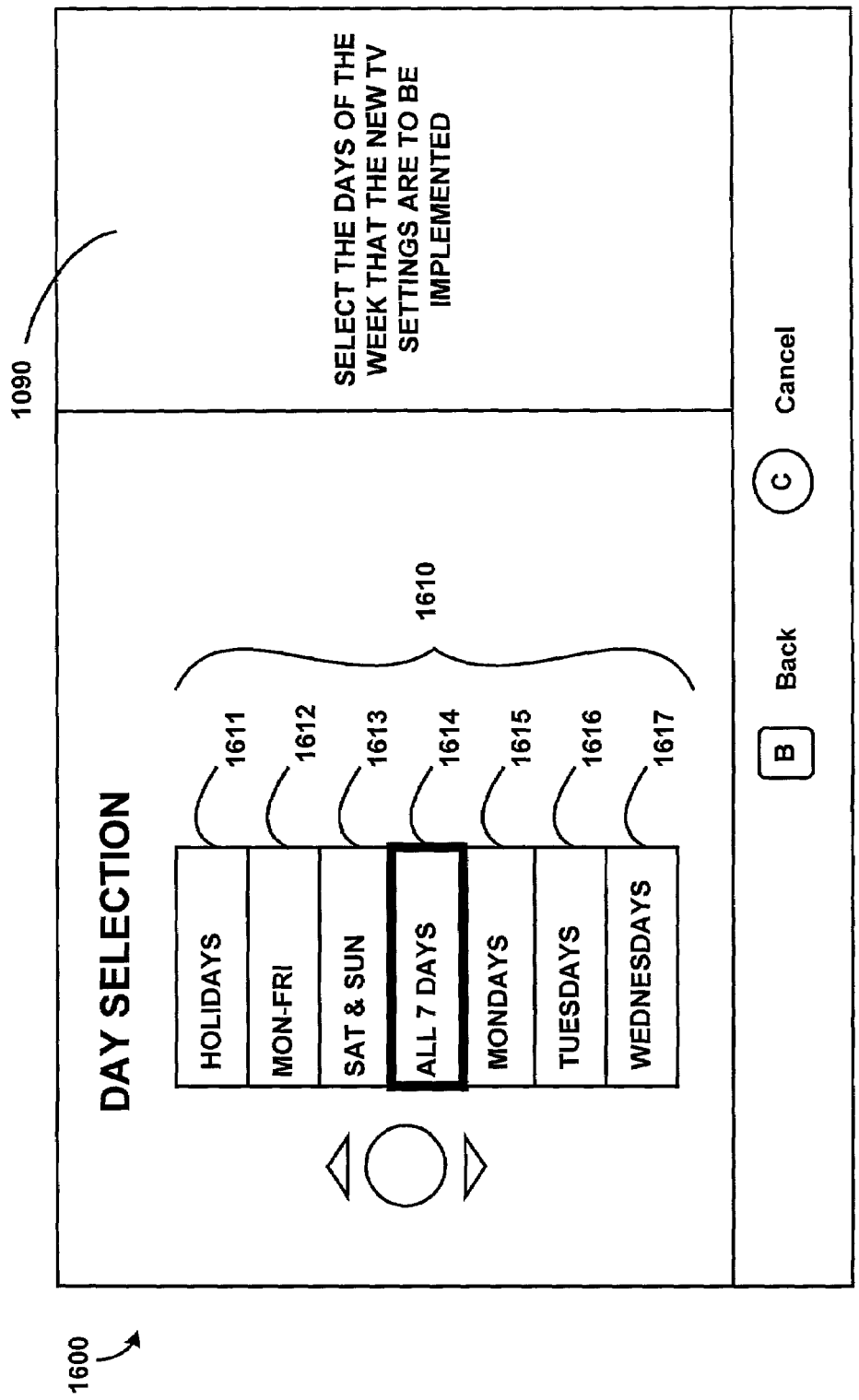
FIG. 16 depicts a non-limiting example of a day selection screen that may be presented to a viewer in response to the selection of the day-of-week option depicted in FIG. 10 or of a continuity of settings option via the continuity of settings screen depicted in FIG. 15.

FIG. 16 depicts a non-limiting example of a day selection screen 1600 that may be presented to a user in response to the selection of the day-of-week option 1012 (FIG. 10) or of a continuity of settings option via the continuity of settings screen 1500 (FIG. 15). A day selection menu 1610 includes day options 1611–1617 that may be used to select the day or days during which the newly selected television setting(s) are to be implemented. In this example, the user may request that the newly selected television settings be implemented on holidays, on weekdays (Monday through Friday), on weekends (Saturday and Sunday), or on all 7 days of the week by selecting option 1611, 1612, 1613, or 1614 respectively. Alternatively, the user may request that the newly selected television settings be implemented on a selected day by selecting a corresponding day option (e.g., option 1615 for Monday). A user can scroll up or down the day selection menu in order to view or select additional day options (not shown). In another embodiment, the day selection menu 1610 may display fewer, additional and/or different options such as, for example, an option corresponding to holidays and weekends.

Figure 17:
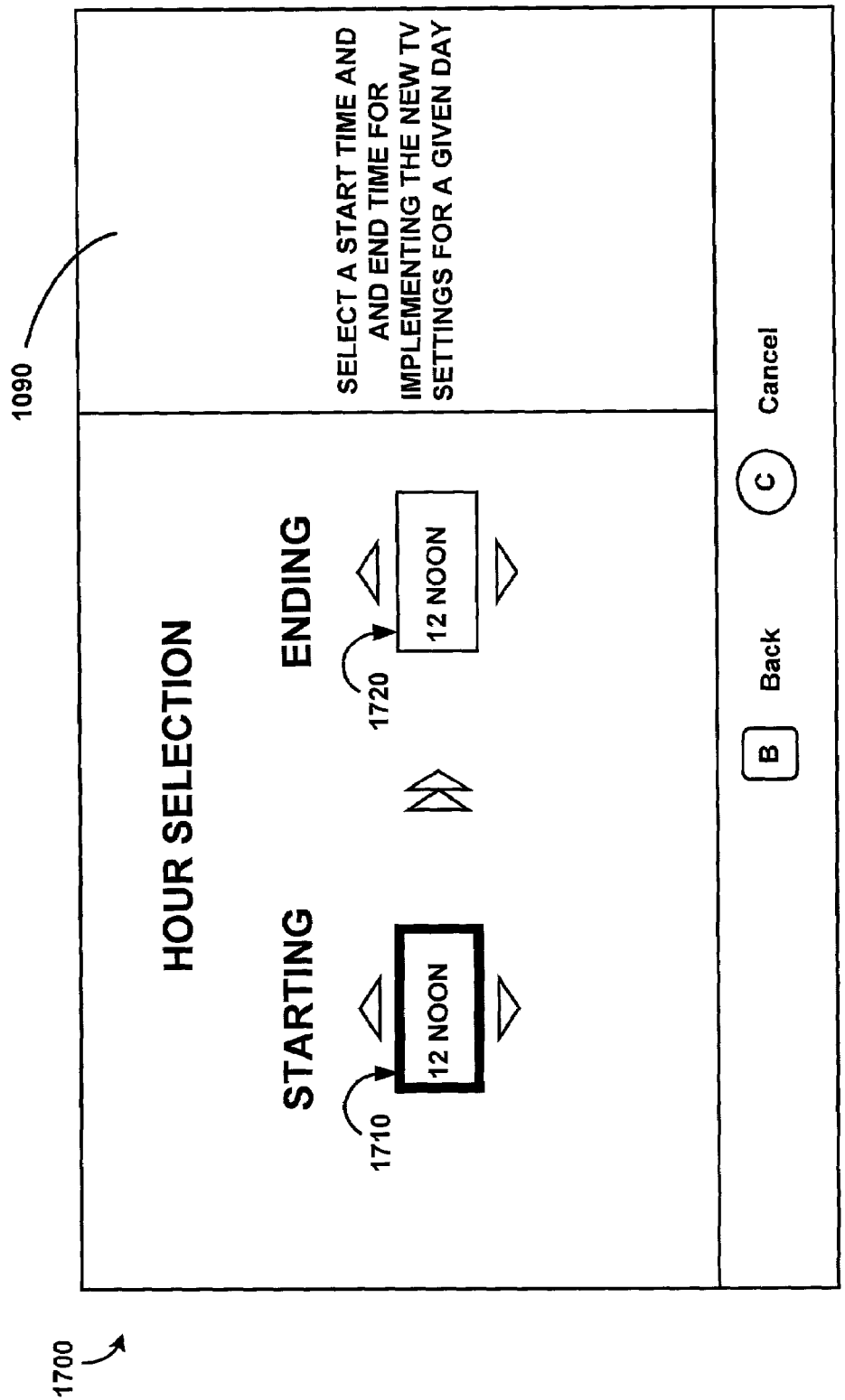
FIG. 17 depicts a non-limiting example of an hour selection screen that may be presented to a viewer in response to the selection of the time-of-day option depicted in FIG. 10 or a day option via the day selection screen depicted in FIG. 16.

FIG. 17 depicts a non-limiting example of an hour selection screen 1700 that may be presented to a user in response to the selection of the time-of-day option 1011 (FIG. 10) or a day option via the day selection screen 1600 (FIG. 16). A starting time selection field 1710 and an ending time selection field 1720 may be used to specify a starting time and an ending time, respectively, for a time period during which the newly selected television setting(s) are to be implemented. In one embodiment, a user can use the right and left arrow keys 413 & 414 in order to highlight a selection field, the up and down arrow keys 411 & 412 in order to designate a desired time, and the select key 420 in order to select the desired time as shown in the highlighted selection field. In an alternative embodiment, a user can use the number pad 450 (FIG. 4) in order to designate starting and ending times.

Figure 18:
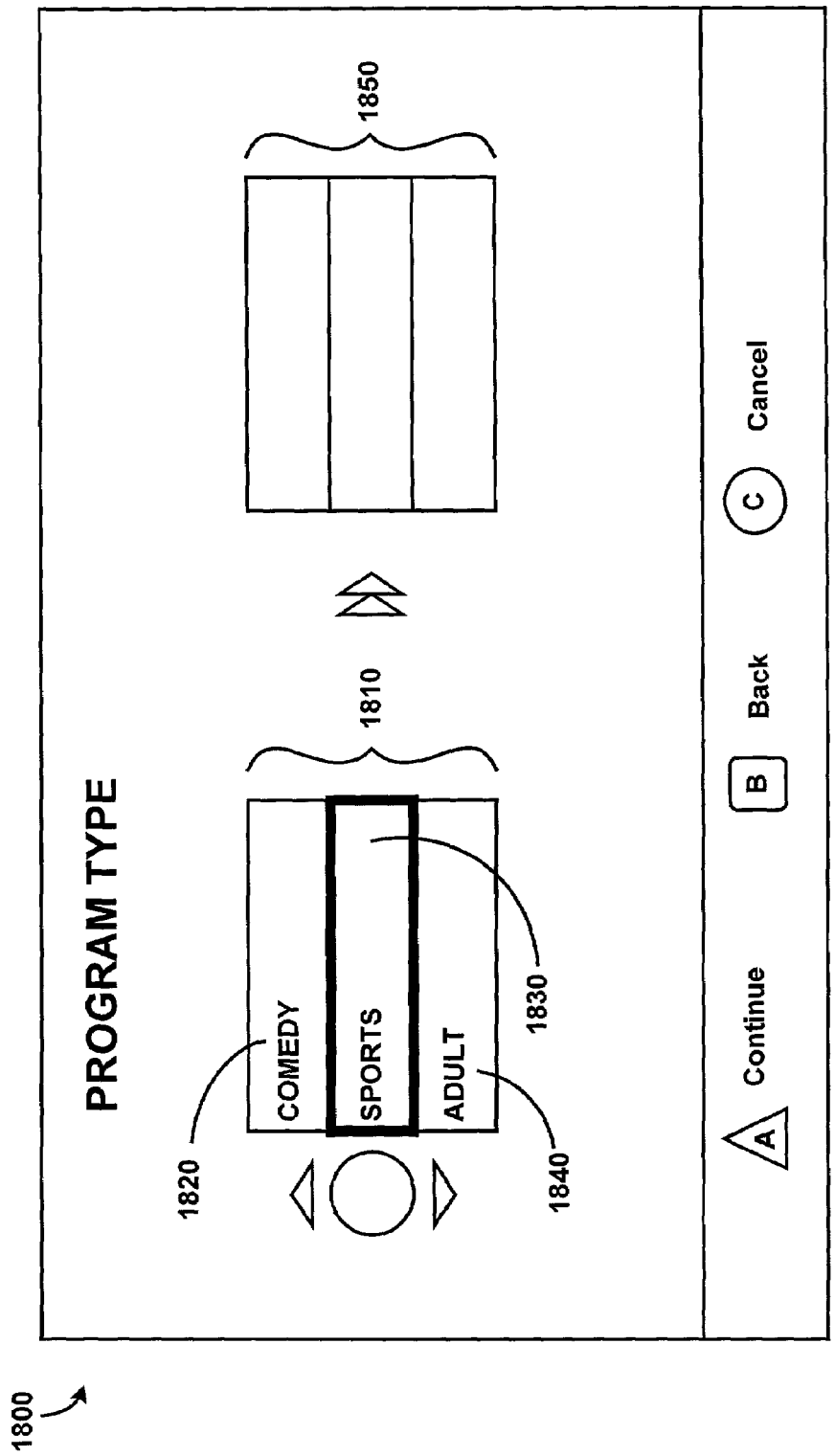
FIG. 18 depicts a non-limiting example of a service instance type selection screen that may be presented to a viewer in response to the selection of the service instance type option depicted in FIG. 7.

FIG. 18 depicts a non-limiting example of a program type selection screen 1800 that may be presented to a user in response to the selection of the program type option 720 (FIG. 7). Program type menu 1810 includes a comedy option 1820, a sports option 1830, and an adult option 1840. The program type options 1820, 1830, and 1840 may be used to determine the type of service instances listed in an initial IPG screen. A user may use the arrow keys 410 (FIG. 4) in order to access additional options by scrolling up or down the program type menu. In another embodiment, a program type selection screen 1800 may contain different and/or additional program type options such as, for example, news, drama, soap opera etc. A program type option that is selected from the program type menu is added to an active selection list 1850. After the user completes the selection process, the user can provide additional input via the remote control 400 confirming his selections. In this example, such input may be provided via the "A" key 471 (FIG. 4).

Figure 19:
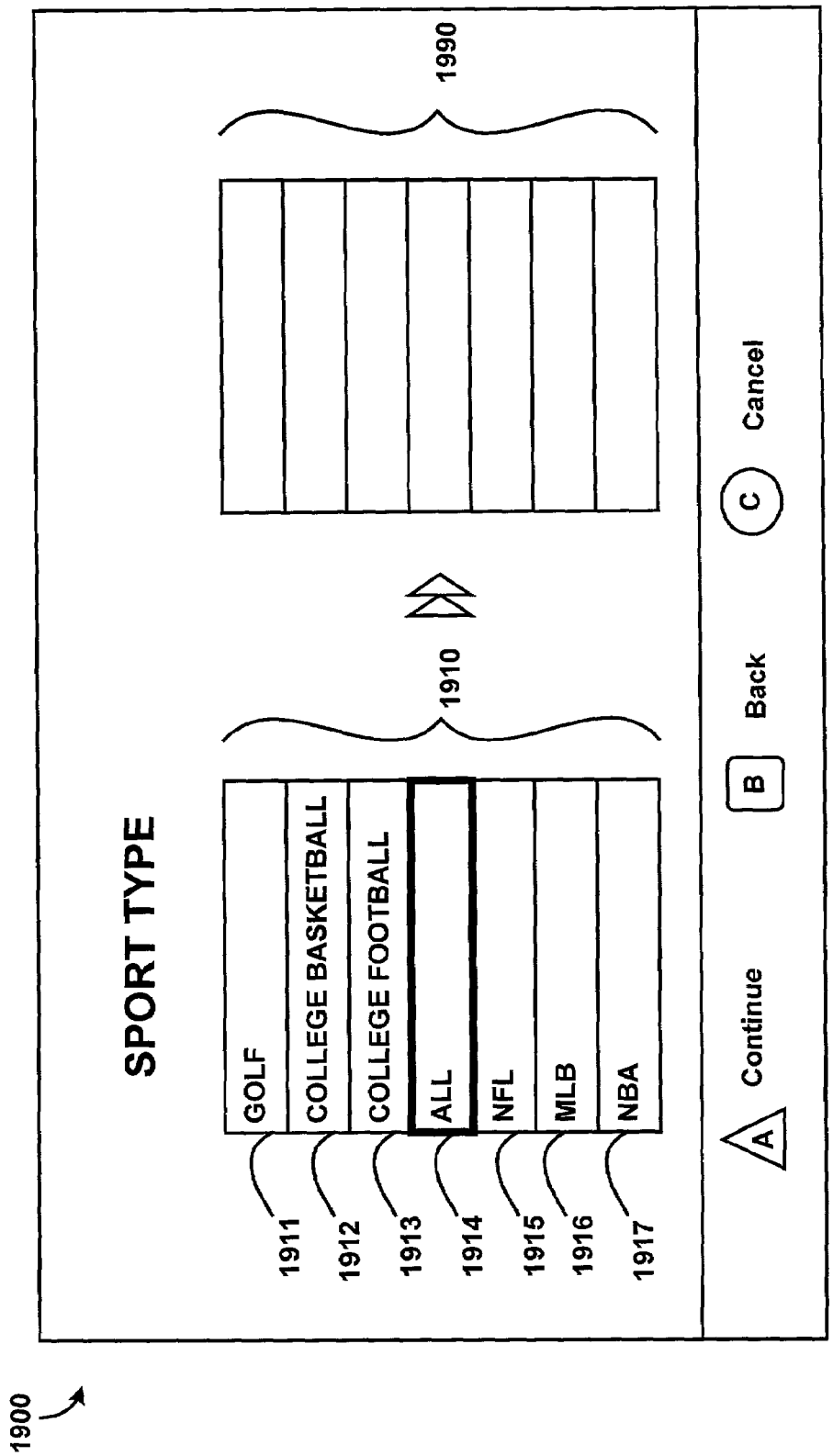
FIG. 19 depicts a non-limiting example of a sport type selection screen that may be presented to a viewer in response to the selection of a sports option shown in FIG. 18.

FIG. 19 depicts a non-limiting example of a sport type selection screen 1900 that may be presented to a user in response to the selection of the sports option 1830 (FIG. 18). A sport type selection menu 1910 includes sport type options 1911–1913 that may be used to determine the service instance listings in an initial IPG screen. In one embodiment, only television instances corresponding to one or more sport type options selected by the user are subsequently presented in an initial IPG screen. A user may use the arrow keys 410 (FIG. 4) in order to access additional options by scrolling up or down the sport type selection menu 1910. In this example, the sport type selection menu 1910 includes golf 1911, college basketball 1912, college football 1913, all sports 1914, NFL (National Football League) 1915, MLB (Major Baseball League) 1916, and NBA (National Basketball Association) 1917. In another embodiment, a sport type selection menu 1910 may contain different and/or additional sport type options such as, for example, college baseball, tennis, NHL (National Hockey League), etc. A sport type option that is selected from the sport type menu is added to an active selection list 1990.

Figure 20:
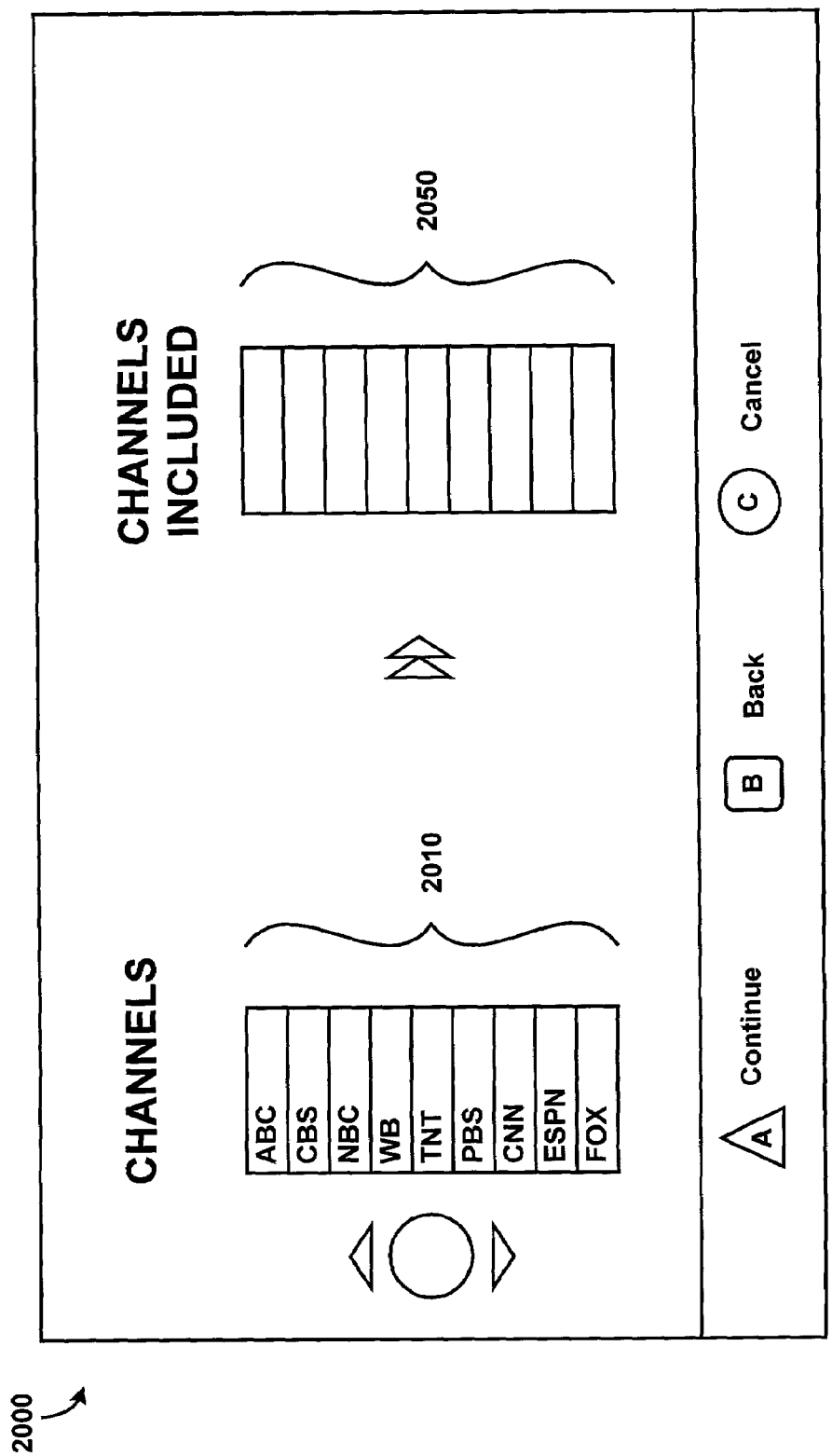
FIG. 20 depicts a non-limiting example of a service selection screen that may be presented to a viewer in response to the selection of the service identity option depicted in FIG. 7.

FIG. 20 depicts a non-limiting example of a channel selection screen 2000 that may be presented to a user in response to the selection of the channel identity option 740 (FIG. 7). Television channel menu 2010 includes channel options that may be used to determine the television service listings in an initial IPG screen. A user may use the arrow keys 410 (FIG. 4) in order to access additional options by scrolling up or down the television channel menu. In another embodiment, a channel selection menu 2010 may contain different and/or additional channel options such as, for example, VOD, PPV, MSNBC, BBC, ESPN2, etc. A channel option that is selected from the television channel menu 2010 is added to an active selection list 2050. After the user adds the desired channel options to the active selection list 2050, the user can confirm his selection by, for example, activating the "A" key 471 (FIG. 4). A channel option may allow a selected service and its IPG information to be included in the IPG presentation, to be enabled for selectable "TV control" functionality, and/or for its IPG information to be displayed by other applications, indefinitely or until modified again by the user. Furthermore, a channel option allows a service to be enabled for one or more selected time periods, regardless of service instance content and service instance attributes during the respective time periods selected by the subscriber.

Examples of selectable TV control functionality that can be enabled indefinitely or during selected time periods include tuning to a specific service, providing an IPG screen, recording a service, and purchasing products or services via a television service. Other TV control functionality may include functionality of remote control keys for selected time periods or enabling and disabling respective remote control keys.

As a non-limiting example of a selectable "TV control" functionality using a channel option, a subscriber may select an option for limiting the tuning to a television service (e.g., Nickelodeon) to only certain time periods (e.g., during 7:00 to 8:00 a.m., Monday through Fridays, and from 8:00 a.m. to 9:00 p.m. on Saturdays and Sundays). The subscriber may also opt via the channel option to allow the IPG information in IPG database 375 pertaining to the respective television service to always be accessible via IPG application 370. Furthermore, the subscriber may enable, as a selectable "TV control" functionality using the channel option, the initiation of a recording of a service instance of the respective television service via an IPG screen, regardless of whether the respective television service is enabled during the period that the service instance is transmitted. The recording of a television service may be initiated responsive to the activation of the record key 435 when the service or corresponding service instance is highlighted in an IPG screen.

Each TV control functionality and DHCT application may be responsive to activation information stored in a look-up table dedicated to the respective functionality or application. Programmed software executing in processor 240, such as operating system 340, SAM client 320 or navigator 360, that enact a TV control functionality or invoke an application to execute on processor 240, access activation information from the corresponding look-up table prior to the activation of the functionality or application. According to the accessed information corresponding to the TV control functionality or application, activation of a functionality or application is implemented if a current time entry in the respective look-up table authorizes such activation.

Each time entry in a look-up table may comprise multiple specification fields associated with each respective time period that describe the scope of a subscriber's customization for that time period. Thus, in addition to a field in the look-up table specifying an indication whether an application or TV control functionality is "enabled" or "disabled" for activation purposes, additional fields associated with a time period may specify other information that limits a sub-functionality or data presentation in association with the respective time period. The limits for the allowed sub-functionality or data presentation in a time period may be identified based on what is authorized and/or what is not authorized.

The additional fields associated with an "enabled" time period specify the limits on sub-functionality or data that can be displayed during that respective time period. However, regardless of whether a functionality or application is disabled for a first time period, a look-up table may comprise additional information that specifies limits for data to be retrieved and/or displayed during a second time interval for which an application is "enabled". As a non-limiting example, the IPG application 370 may be enabled for certain time periods for which it can retrieve information from IPG database 375. Therefore, during an enabled time period, IPG application 370 can be activated by the subscriber to display information for time periods in which the IPG application itself is disabled as an application.

In one embodiment, an authorization look-up table 394 contains an entry that specifies a "yes" or "no" flag for determining whether each respective executable application or TV control functionality is authorized to adapt to user preferences. The user preferences may be determined by the preference engine 390 and/or as a result of a user configuration performed during a customization procedure.

Figure 21:
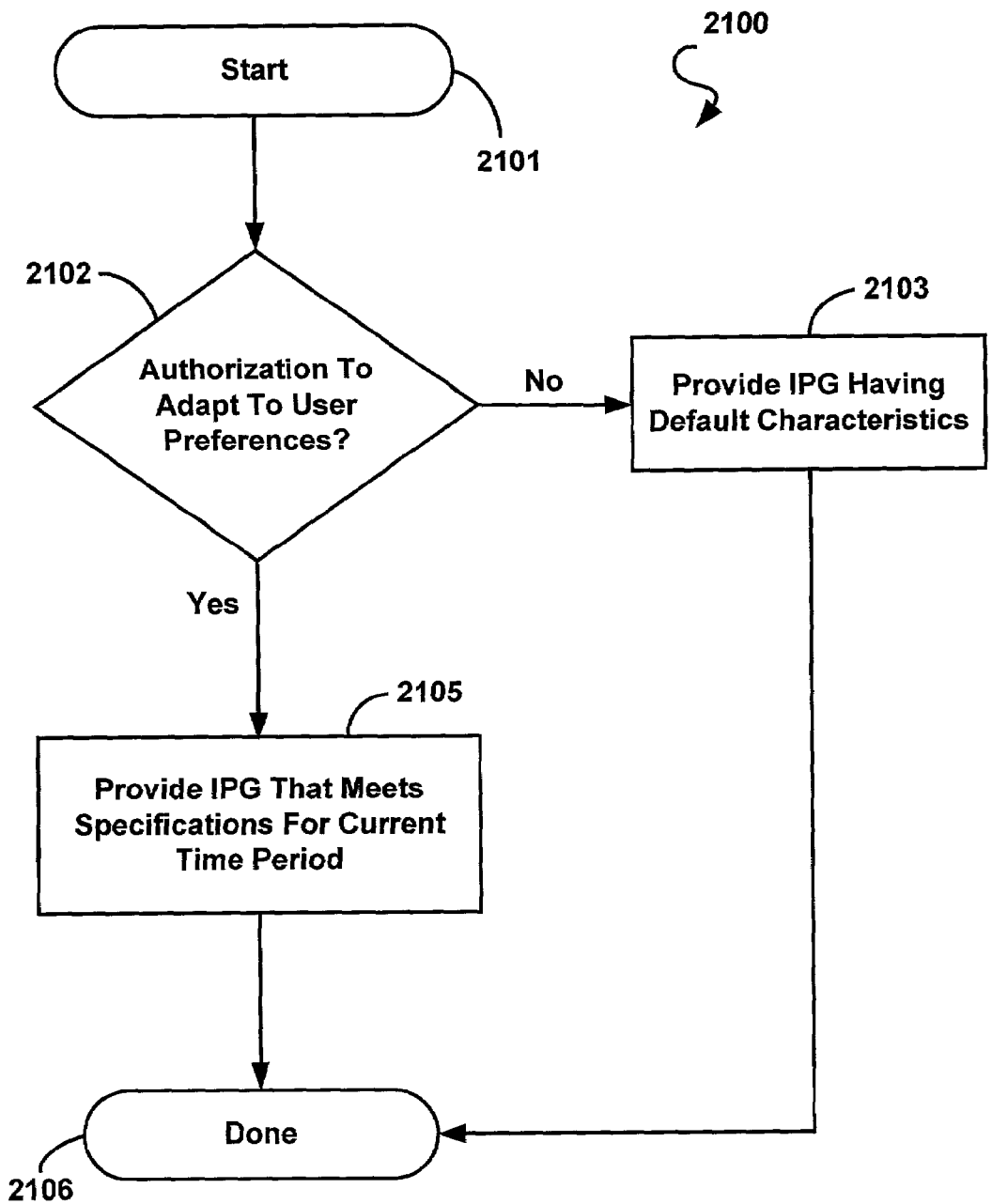
FIG. 21 is a flow chart depicting a non-limiting example of an IPG routine for providing an IPG that meets viewer specifications.

FIG. 21 is a flow chart depicting a non-limiting example of an IPG routine 2100 for providing an IPG that meets user specifications. The routine 2100 may be part of IPG application 370 (FIG. 3) and may be initiated in response to the DHCT 200 (FIG. 2) receiving user input requesting an IPG. The user input may be provided via the activation of a designated remote control key such as, for example, the guide key 480. After the routine 2100 is initiated in step 2101, the routine 2100 determines in step 2102 whether the IPG application 370 is authorized to adapt to user preferences. If the IPG application 370 is not authorized to adapt to user preferences, then the IPG application 370 provides the user with an IPG having default characteristics as indicated in step 2103, and the routine 2100 terminates as indicated in step 2106. However, if the IPG application 370 is authorized to adapt to user preferences, then the IPG application 370 provides the user with an IPG that is adapted to user preferences, as indicated in step 2105, and the routine 2100 terminates as indicated in step 2106. The IPG application 370 may use a preference look-up table 392 to obtain a specification for the subset of service instance information in IPG database 375 that is enabled for access and display for the current time period in accordance with user preferences. When user input causes IPG application 370 to display IPG data corresponding to time periods other than the current time period, IPG application 370 displays information for those other time periods according to the limits in their respective specification in a preference lookup table 392.

Figure 22:
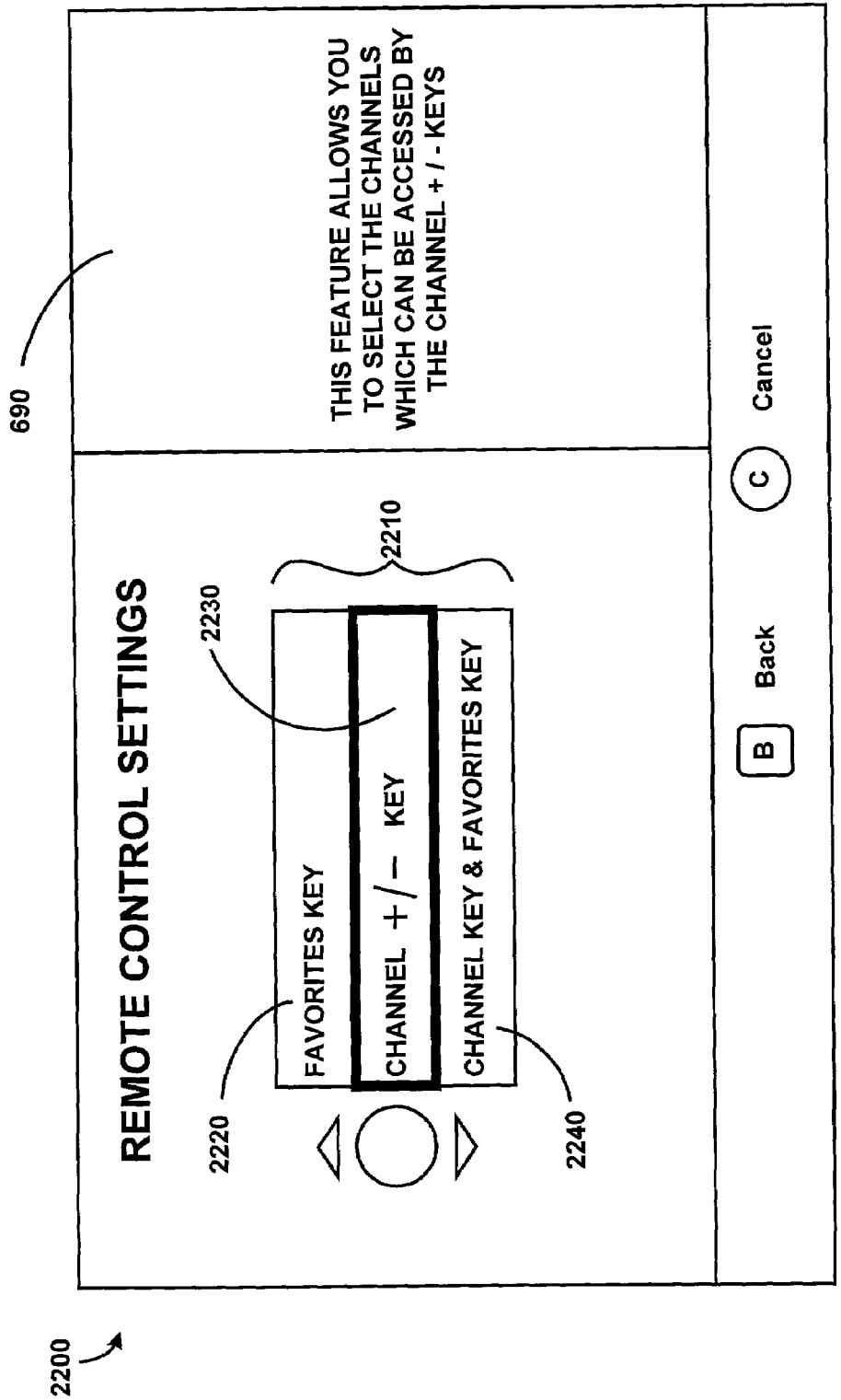
FIG. 22 depicts a non-limiting example of a remote control configuration screen that may be presented to a viewer in response to the selection of the remote control option depicted in FIG. 6.

FIG. 22 depicts a non-limiting example of a remote control configuration screen 2200 that may be presented to a user in response to the selection of the remote control option 620 (FIG. 6). Remote control configuration menu 2210 includes a first option 2220 for configuring the functionality of the favorites key 430, a second option 2230 for configuring the functionality of the channel +/– key 440, and a third option 2240 for configuring the functionality of the favorites key 430 and the channel +/– key 440. In an alternative embodiment, a user may be provided with additional and/or different options for configuring aspects of the remote control device 400. Such additional and/or different options may include, for example, an option for enabling or disabling the record key 435 (FIG. 4).

Figure 23:
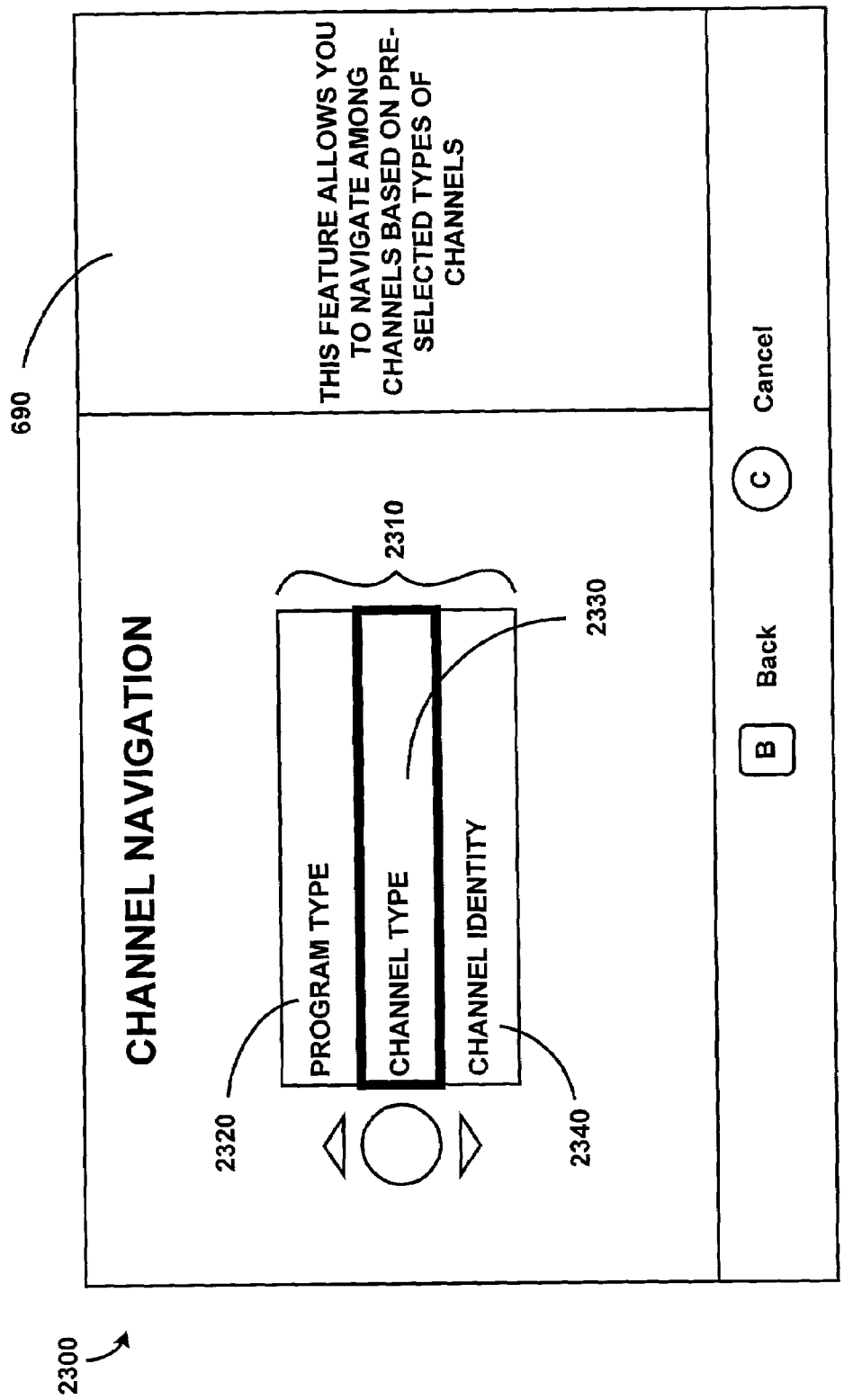
FIG. 23 depicts a non-limiting example of a service navigation configuration screen that may be presented to a viewer in response to the selection of one of the remote control configuration options, and depicted in FIG. 22.

FIG. 23 depicts a non-limiting example of a channel navigation configuration screen 2300 that may be presented to a user in response to the selection of the channel +/– key option 2230 (FIG. 22). Channel navigation configuration menu 2310 includes a program type option 2320, a channel type option 2330, and a channel identity option 2340. The service navigation configuration options 2320, 2330, and 2340 may be selected to configure the operation of the channel +/– key 440 (FIG. 4) based on user selected service instance types, television service types, and television service identities, respectively. In one embodiment, the selection screens that are presented in response to the selection of option 2320, 2330, or 2340 are similar to selection screens 1800 (FIG. 18), 800 (FIG. 8), and 2000 (FIG. 20), respectively. In this manner a user may configure the operation of the channel +/– key 440 such that only certain television services, types of television services, or types of service instances are presented to the user in response to the activation of the channel +/– key 440. In another embodiment, a service navigation configuration screen 2300 may contain different and/or additional options such as, for example, an option to configure the operation of the channel +/– key 440 based on a user's television viewing habits. Settings for determining the operation of the channel +/– key 440 may be implemented continuously or only during certain time periods as determined by user input such as, for example, as provided via the screens depicted in FIGS. 9–17.

Figure 24:
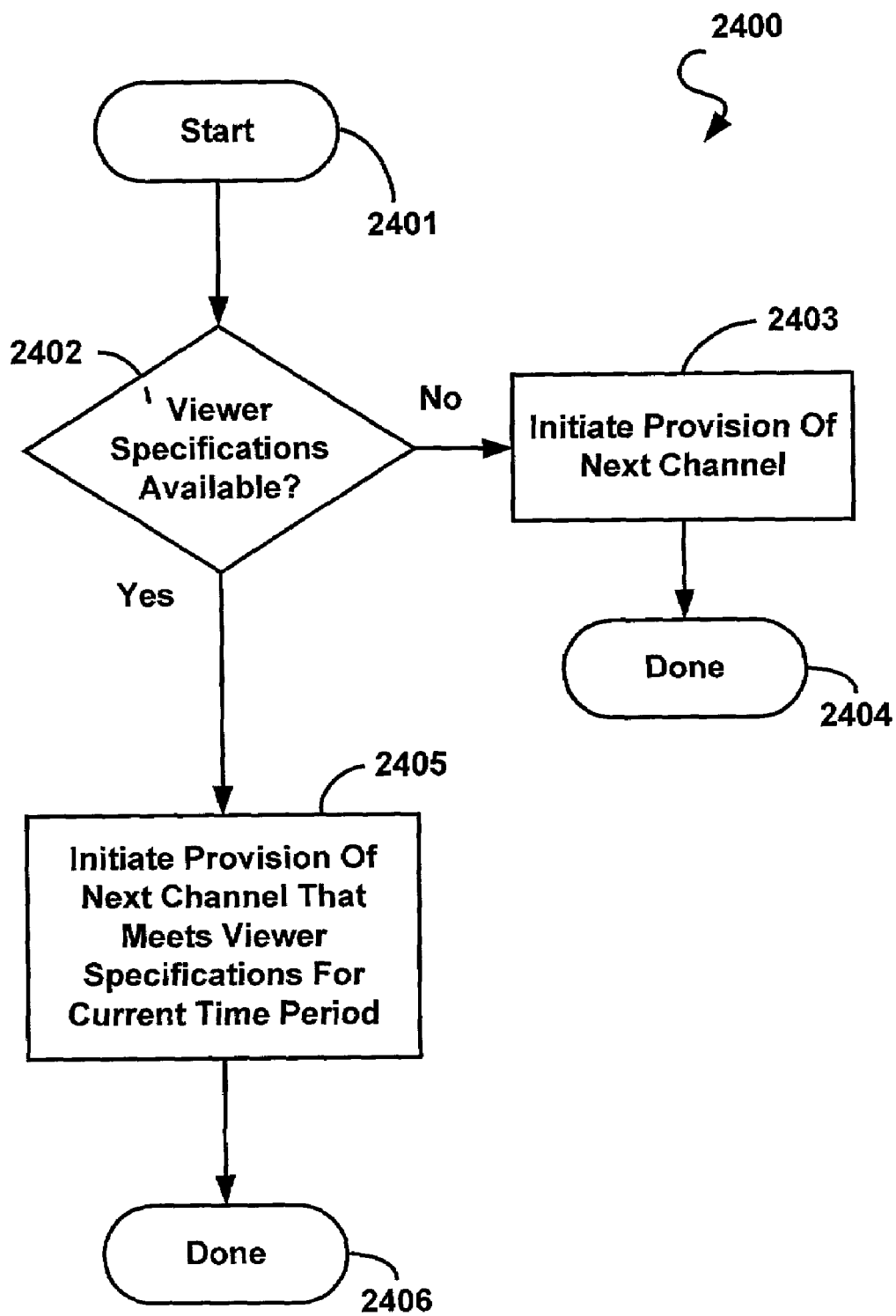
FIG. 24 is a flow chart depicting a non-limiting example of a service navigation routine for providing a service that meets viewer specifications.

FIG. 24 is a flow chart depicting a non-limiting example of a service navigation routine 2400 for providing a television service that meets user specifications. The routine 2400 may be part of the navigator application 360 (FIG. 3) and may be initiated in response to the DHCT 200 (FIG. 2) receiving user input requesting another television service. The user input may be provided via the activation of a service navigation key such as, for example, the channel +/– key 440 (FIG. 4). After the routine 2400 is initiated in step 2401, the routine 2400 determines in step 2402 if user specifications for service navigation during the current time period are stored in memory as explained above. If such user specifications are not stored in memory, then the routine 2400 initiates in step 2403 the provision of the next available sequential television service (up or down depending on the user's request), and the routine terminates in step 2404. If, however, user specifications for the current time period are stored in memory, then the routine initiates in step 2405 the provision of a television service in accordance with the user specifications, and then terminates in step 2406. The user specifications for service navigation may have been solicited via, for example, one or more of the screens depicted in FIGS. 9–20, 22, and 23, and may include information that directly or indirectly identifies television services that are to be provided in response to the activation of a service navigation key during user defined time periods.

Figure 25:
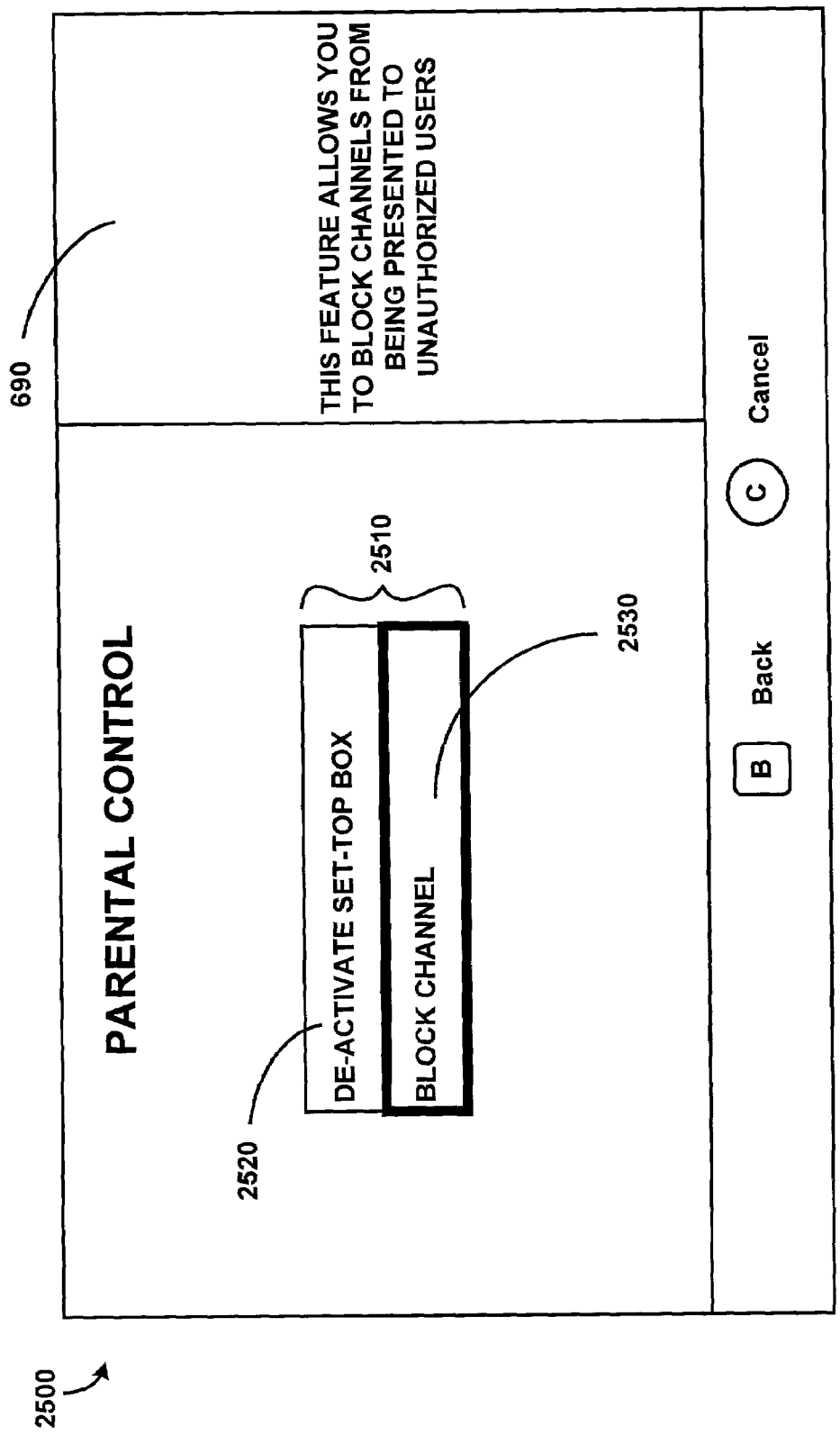
FIG. 25 depicts a non-limiting example of a parental control configuration screen that may be presented to a viewer in response to the selection of the parental control option depicted in FIG. 6.

FIG. 25 depicts a non-limiting example of a parental control configuration screen 2500 that may be presented to a user in response to the selection of the parental control option 640 (FIG. 6). Remote control configuration menu 2510 includes a first option 2520 for preventing unauthorized use of the DHCT 200, and a second option 2530 for blocking certain television services from being presented to unauthorized users. Unauthorized use of the DHCT 200 may be implemented by requiring that a valid personal identification number (PIN) be entered by a user every time that the DHCT 200 is turned on. Similarly, access to blocked television services may only be provided in response to an entry of a valid PIN. In another embodiment, authorized users may be identified in another manner such as, for example, via the entry of a valid password or via speech or fingerprint recognition. Parental control settings may be implemented continuously or only during certain time periods as determined by user input such as, for example, as provided via the screens depicted in FIGS. 9–17.

Figure 26:
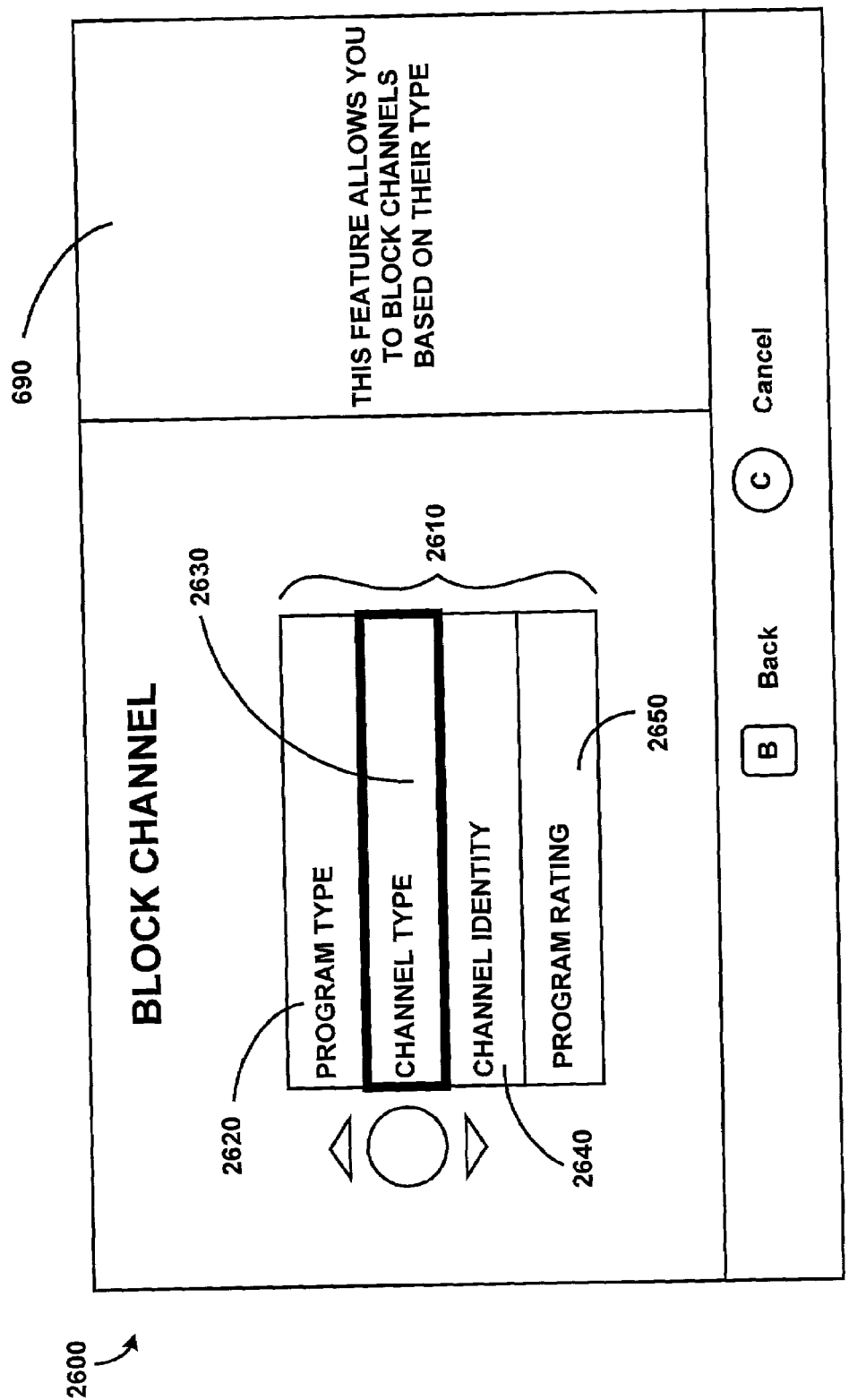
FIG. 26 depicts a non-limiting example of a block screen that may be presented to a viewer in response to the selection of the block option depicted in FIG. 25.

FIG. 26 depicts a non-limiting example of a block service screen 2600 that may be presented to a user in response to the selection of the block service option 2530 (FIG. 25). Block service menu 2610 includes a program type option 2620, a channel type option 2630, and a channel identity option 2640. The block service options 2620, 2630, and 2640 may be used to configure the DHCT 200 to block selected service instance types, television service types, and television service identities, respectively. In one embodiment, the selection screens that are presented in response to the selection of option 2620, 2630, or 2640 are similar to selection screens 1800 (FIG. 18), 800 (FIG. 8), and 2000 (FIG. 20), respectively. In this manner, a user may block certain television services based on their service instance content, their type, or their identity. The block service screen 2600 may, in another embodiment, contain different and/or additional options such as, for example, an option to block all television services or an option to block television services carrying a certain service instant. Service blocking settings may be implemented continuously or only during certain time periods as determined by user input such as, for example, as provided via the screens depicted in FIGS. 9–17.

Figure 27:
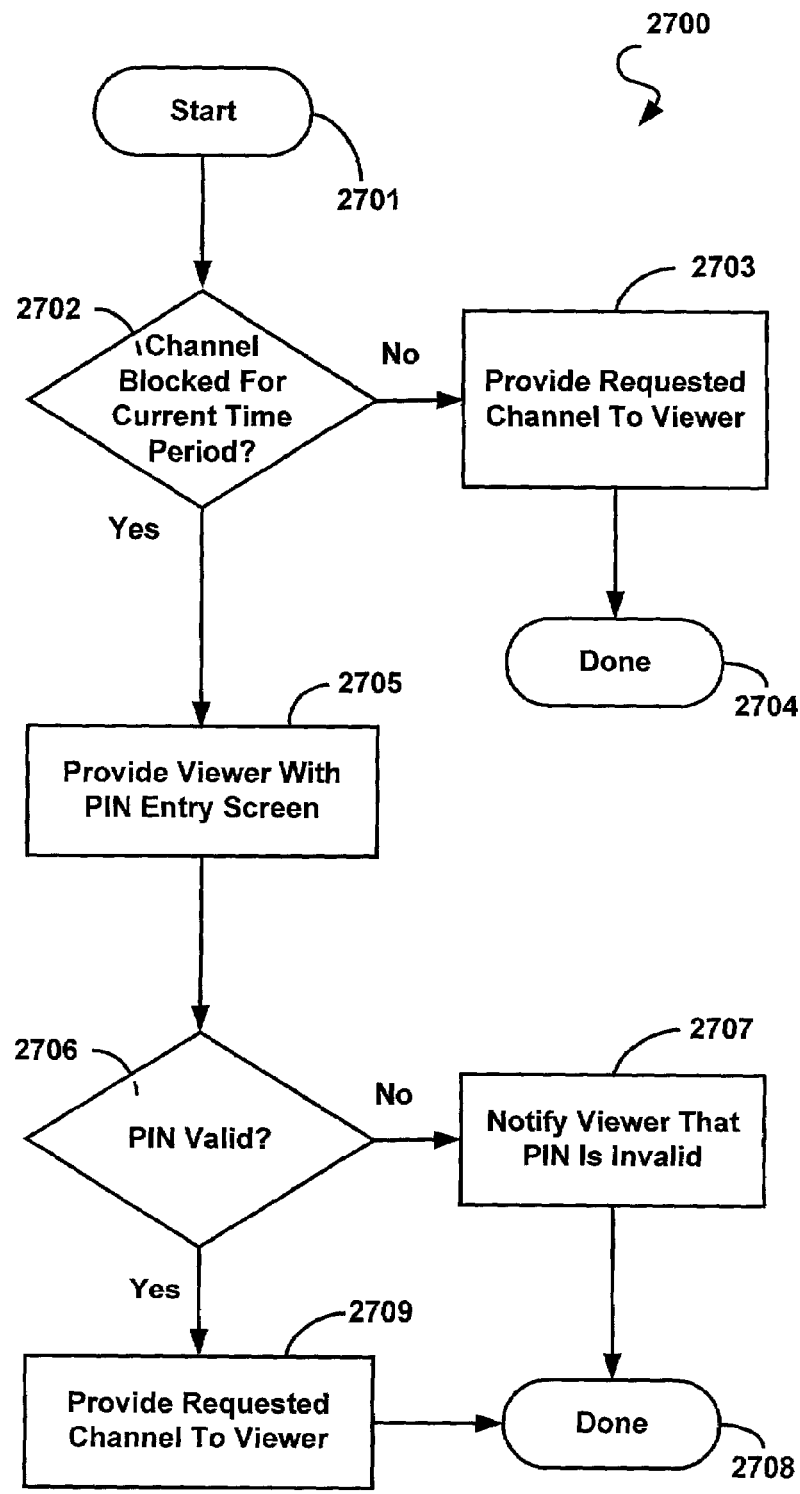
FIG. 27 is a flow chart depicting a non-limiting example of a service navigation routine for blocking a television service.

FIG. 27 is a flow chart depicting a non-limiting example of a service navigation routine 2700 for blocking a television service. The routine 2700 may be part of the navigator application 360 (FIG. 3) and may be initiated in response to the DHCT 200 (FIG. 2) receiving user input requesting a certain television service. The user input requesting a certain television service may be provided via, for example, the number pad 450, or via the selection of a television service that is listed in an IPG. After the routine 2700 is initiated in step 2701, the routine 2700 determines in step 2702 if the requested television service is blocked during the current time period. A television service may be blocked in response to receiving user input requesting that one or more television services be blocked during one or more time periods. Such user input may be provided via, for example, one or more of the screens depicted in FIGS. 8–20, 25, and 26, and may include information that directly or indirectly identifies television services that are to be blocked or excluded. A television service may be indirectly identified based on its type or based on the service instance or type of service instance that it is providing.

If the requested television service is not blocked, then the routine initiates in step 2703 the provision of the requested television service to the user and terminates in step 2704. If, however, the television service is blocked, then the routine initiates the presentation of a personal identification number (PIN) entry screen to the user. The PIN entry screen may prompt the user to enter the required PIN by stating, for example, "Please enter your PIN in order to have access to this television service." The routine 2700 then determines in step 2706 if the PIN entered by the user is valid by comparing the entered PIN with a PIN previously stored in memory. If the PIN entered by the user is invalid, then the routine 2700 initiates in step 2707 the provision of a message notifying the user that the entered PIN is invalid and then terminates in step 2708. If, however, the PIN entered by the user is valid, then the routine 2700 initiates in step 2709 the provision of the requested television service to the user and terminates in step 2708. In one embodiment, a PIN entry screen is only presented during time periods in which a requested service is not blocked. During a time period in which a service is blocked, the service is not presented to a user. In yet another embodiment, service instance information associated with a blocked service is disabled from being accessed from IPG database 375 and consequently from being presented to a user.

Figure 28:
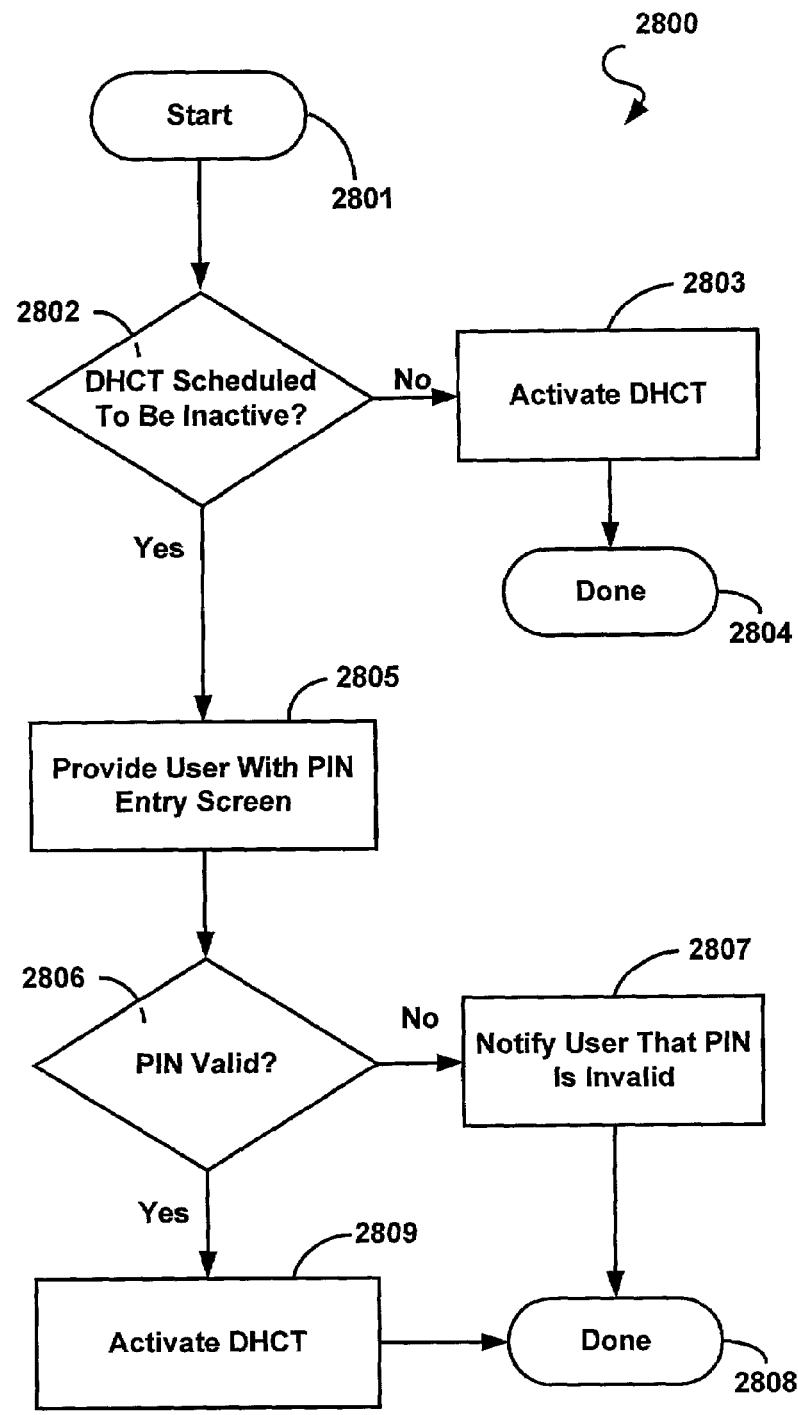
FIG. 28 is a flow chart depicting a non-limiting example of a DHCT activation routine for activating a DHCT depicted in FIG. 2.

FIG. 28 is a flow chart depicting a non-limiting example of a DHCT activation routine 2800 for activating a DHCT 200 (FIG. 2). The routine 2800 may be part of the operating system 340 (FIG. 3) and may be initiated in response to the DHCT 200 (FIG. 2) receiving user input requesting that the DHCT 200 be activated. The user input requesting activation of the DHCT may be provided via, for example, a power button 401. After the routine 2800 is initiated in step 2801, the routine 2800 determines in step 2802 if the DHCT 200 is scheduled to be inactive during the current time period. A DHCT 200 may be scheduled to be inactive in response to user input that may have been provided via, for example, one or more of the screens depicted in FIGS. 9–17 and 25.

If the DHCT 200 is not scheduled to be inactive, then the routine 2800 initiates in step 2803 the activation of the DHCT 200 thereby allowing user access to one or more television services. The routine 2800 then terminates in step 2804. If, however, the DHCT 200 is scheduled to be inactive, then the routine initiates the presentation of a personal identification number (PIN) entry screen to the user. The routine 2800 then determines in step 2806 if a PIN entered by the user is valid by comparing the entered PIN with a PIN previously stored in memory. If the PIN entered by the user is invalid, then the routine 2800 initiates in step 2807 the provision of a message notifying the user that the entered PIN is invalid and then terminates in step 2808. If, however, the PIN entered by the user is valid, then the routine 2800 initiates in step 2809 the activation of the DHCT 200 and terminates in step 2808.

Figure 29A:
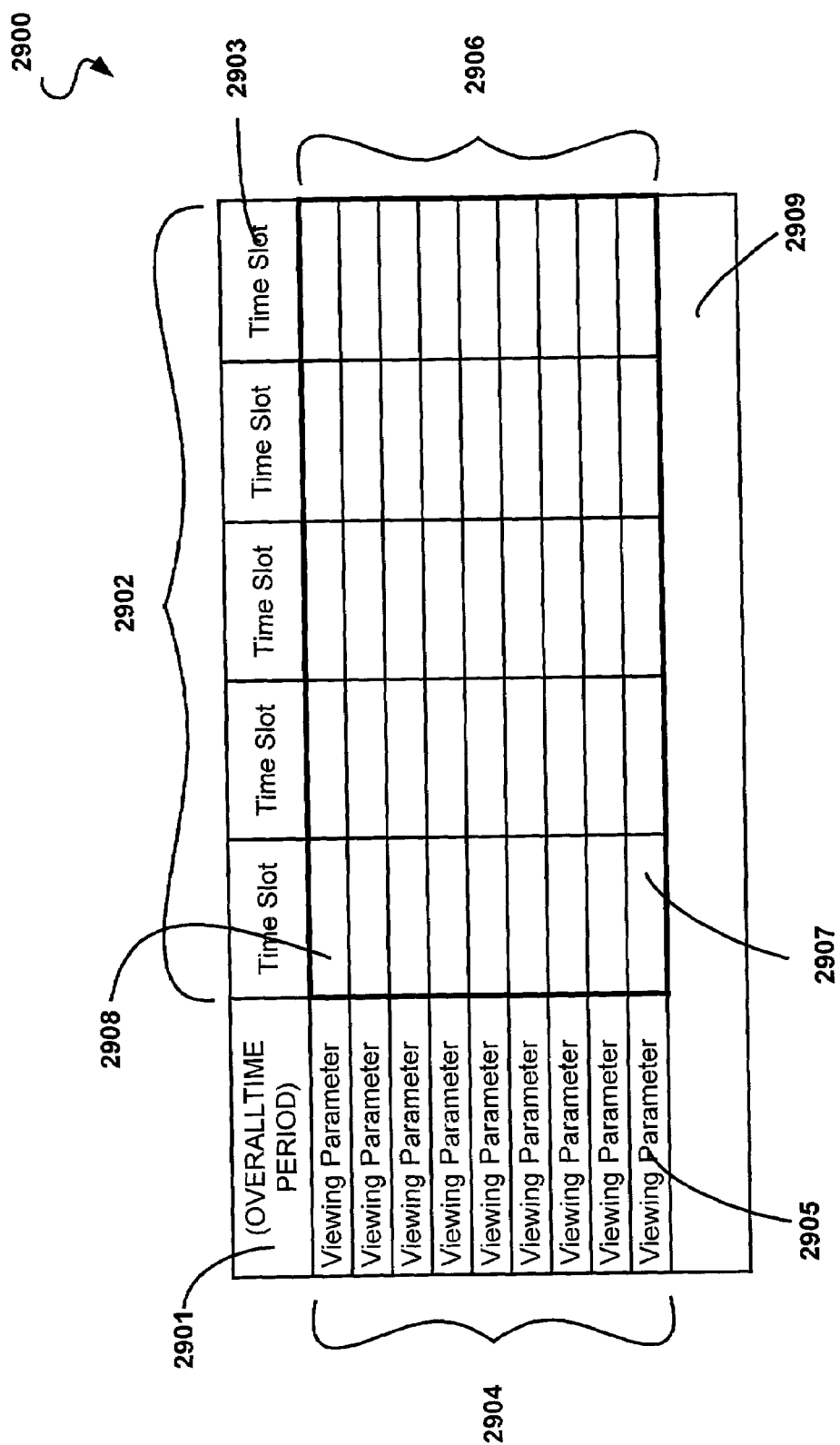
FIG. 29A depicts a non-limiting example of a layout for a preference entry screen.

FIG. 29A depicts a non-limiting example of a layout for a preference entry screen 2900. The preference entry screen 2900 may be used to input user preferences for selected time periods, and includes a day indication area 2901, a time area 2902, a viewing parameter area 2904, and a preference entry area 2906. The day indication area 2901 is for displaying the day or group of days that the preference entry screen 2900 applies to. For example, the day indication area 2901 may be used to display one of the following days or group of days: Monday, Tuesday, Wednesday, Thursday, Friday, Saturday, Sunday, Monday through Friday, Saturday & Sunday. The time area 2902 includes time slots 2903. Each time slot is for displaying a time period that is part of the day(s) indicated in day indication area 2901. Each time slot may cover, for example, a half-hour period, a one hour period, a two hour period, a three hour period, a four hour period, a twelve hour period, etc. The viewing parameter area 2904 contains a list of viewing parameters such as for example, television services, television service types, service instances, or service instance types. Examples of television services include, among others, ABC, NBC, CBS, CNN, and ESPN, etc. Examples of television service types include, among others, broadcast, sports, news, shopping, adult, foreign, pay-per-view (PPV), video-on-demand (VOD), etc. Examples of service instances include, among others, the television programs Friends, Frasier, Will & Grace, and Headline News (HLN), etc. Examples of service instance types include, among others, sit-com, news program, football game, etc. Preference entry area 2906 includes preference entry fields 2907 for entering user preferences. A user may enter a user preference by using, for example, the remote control 400. An optional instruction area 2909 may be used to provide instructions on using the preference entry screen 2900.

Figure 29B:
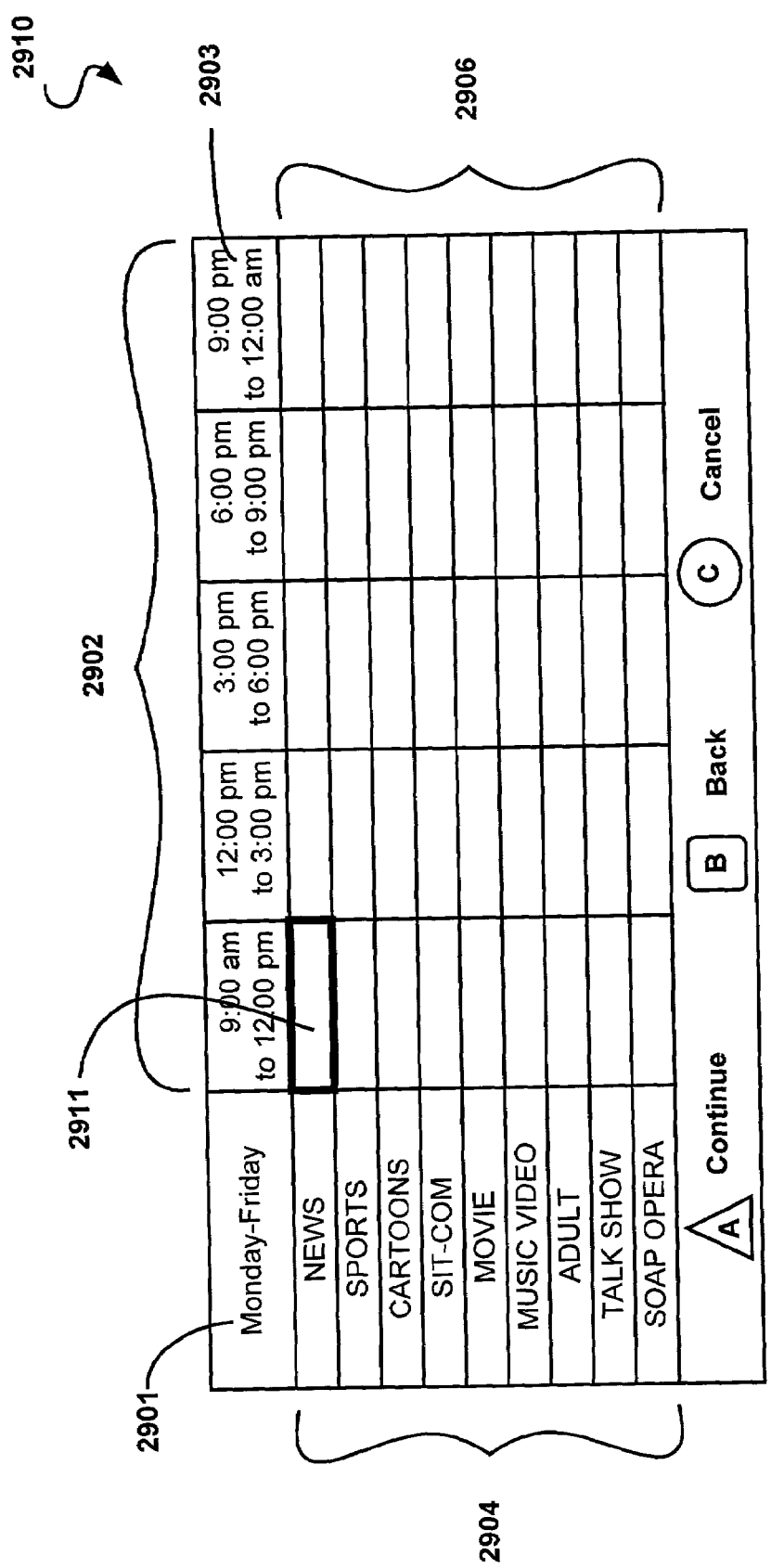
FIG. 29B depicts a non-limiting example of a preference entry screen that may be used by a viewer to provide viewer preferences regarding certain types of programs during various time periods.

FIG. 29B depicts a non-limiting example of a preference entry screen 2910 that may be used to input user preferences regarding certain types of service instances during various time periods. In this example, the viewing parameter area 2904 lists the following types of service instances: News, sports, cartoons, sit-com, movie, music video, adult, talk show, and soap opera. The time area 2902 lists the following time slots 2903: 9:00 a.m. to 12 p.m., 12:00 p.m. to 3:00 p.m., 3:00 p.m. to 6:00 p.m., 6:00 p.m. to 9:00 p.m., and 9:00 p.m. to 12 a.m. In an alternative embodiment, each time slot 2903 may cover a shorter or a longer time period. In yet another embodiment, time slots in a preference entry screen may cover time periods of varying duration. For example, a time slot covering a time period when users are more likely to watch television (e.g., 8:00 p.m. to 8:30 p.m.) might have a shorter duration (half-an hour) than a time slot covering a time period when users are less likely to watch television (e.g., a single time slot covering the time period between 2:00 a.m. and 6:00 a.m.).

The day indication area 2901 indicates that the preference entry screen 2910 applies for Monday through Friday. The preference entry area 2906 includes a highlighted preference entry field 2911 which may be used to enter a user's preference concerning the corresponding viewing parameter and time slot. A user may toggle the state of a highlighted preference entry field or may designate a different entry field as the highlighted entry field by activating designated buttons on the remote control 400. For example the user may activate the select button 420 to toggle the state of a highlighted entry field and may activate one of the arrow buttons 410 to highlight a different field.

Figure 29C:
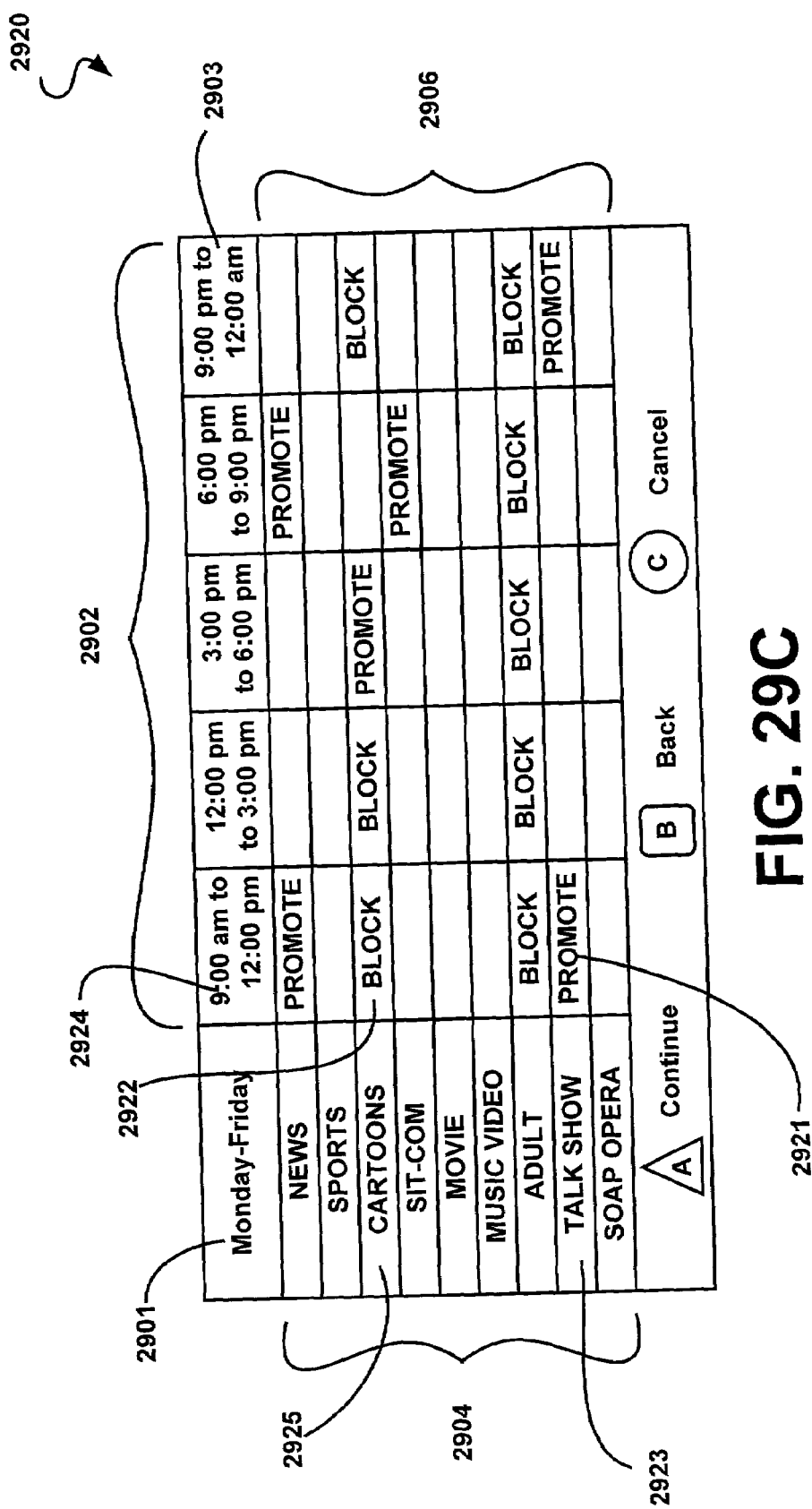
FIG. 29C depicts a non-limiting example of a preference entry screen that illustrates one possible approach for indicating viewer preferences.

FIG. 29C depicts a non-limiting example of a preference entry screen 2920 that illustrates one possible approach for indicating user preferences. In this example, the preference entry area 2906 includes a promote entry 2921 and a block entry 2922 that reflect user input. The promote entry 2921 indicates that the user's preference is to promote talk show programs 2923 during the 9:00 a.m. to 12:00 p.m. time slot 2924. The block entry 2922 indicates that the user's preference is to block cartoon programs 2925 during the 9:00 a.m. to 12:00 p.m. time slot 2924. In this manner, the user can specify what is to be included and excluded for certain time periods. A television service may be promoted in several ways. For example, a television service may be promoted via an IPG by being listed ahead of other television services and/or by being more conspicuously displayed. A television service may also be promoted by being presented to a user either "automatically" or in response to the DHCT 200 receiving user input (e.g., corresponding to CH +/− key 440) requesting a television service.

As indicated above, a user may use the remote control device 400 to highlight any preference entry field in the preference entry area 2906, and to then change the highlighted entry field. Of course, many alternative approaches for receiving user preferences may be used including, for example, receiving text input via a keyboard requesting that the DHCT 200 block or promote a certain viewing parameter during a certain time period. The text input may state, for example, "block cartoons from 9 a.m. to 12 p.m." The DHCT 200 may then interpret and implement the request based on predefined standards.

FIG. 30A is a block diagram depicting a non-limiting example of a preference tracking database 3000. The preference tracking database 3000 is stored in DRAM 304 (FIG. 3) and comprises data entries 3006 corresponding to respective viewing parameters 3004 and to respective time periods 3002. For example, data entry 3007 is a preference score that corresponds to viewing parameter 3008 and to time period 3009. Viewing parameters 3004 may represent, for example, television services, television service types, service instances, service instance types, service instance ratings, or other service instance information attributes. Each of time periods 3002 may represent, for example, a time period during a day (e.g., 1:00 p.m. to 2:00 p.m.), a day or days of the week (e.g., Monday), a day of the year (e.g., January 1), or a month (e.g., January). Therefore, in one possible embodiment, the preference engine 390 may use multiple preference tracking databases, where each table keeps track of one type of viewing parameter in relation to one type of time period. In an alternative embodiment, a tracking table may keep track of two or more types of viewing parameters in relation to two or more types of time periods.

Figure 30B:
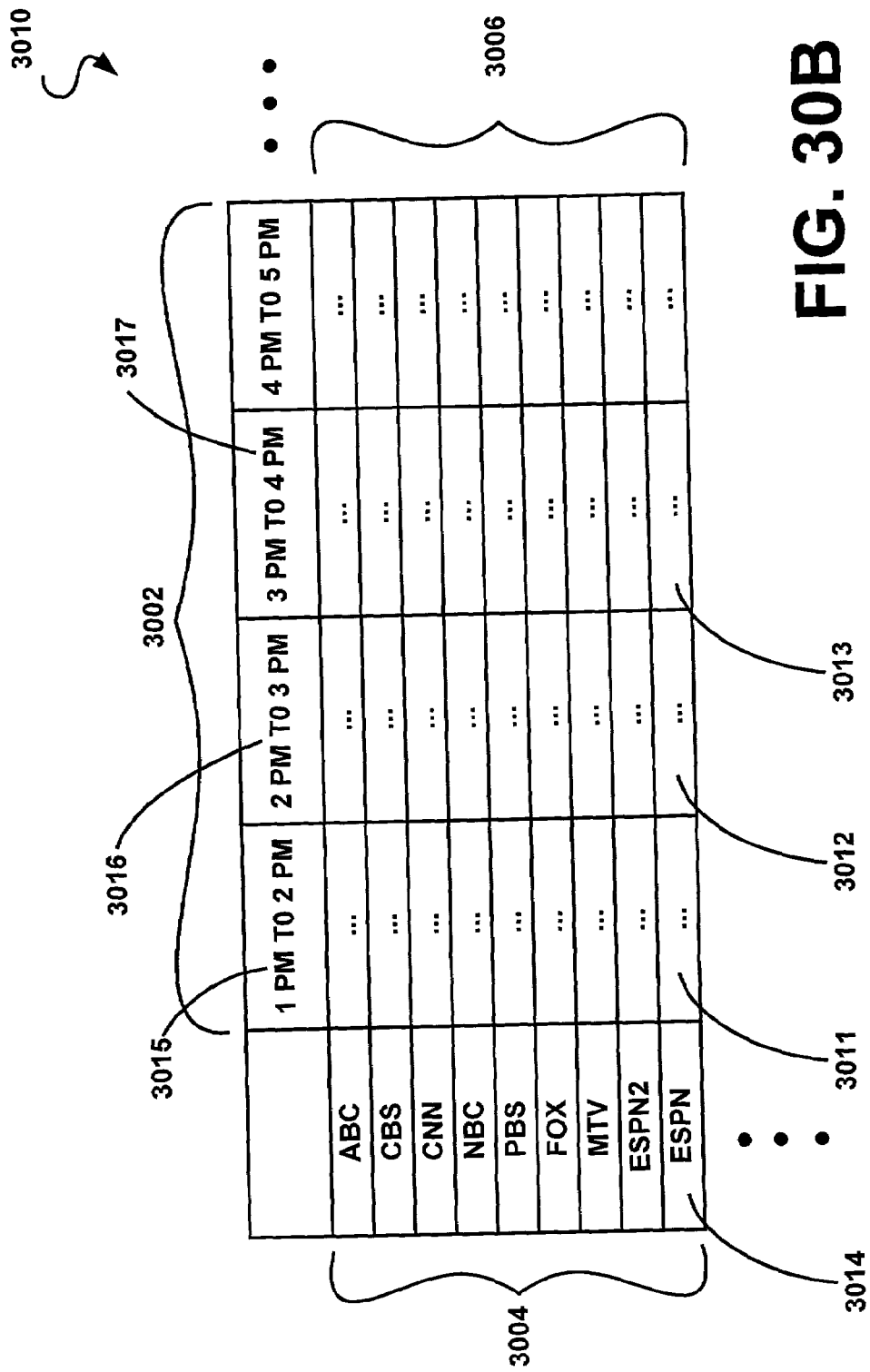
FIG. 30B is a block diagram depicting a non-limiting example of a preference tracking database where the viewing parameters represent television services and the time periods represent time periods during a day.

FIG. 30B is a block diagram depicting a non-limiting example of a preference tracking database 3010 where the viewing parameters 3004 represent television services and the time periods 3002 represent time periods during a day. Television services in this example include the television channels ABC, CBS, CNN, NBC, PBS, FOX, MTV, ESPN2, and ESPN. Although not shown in FIG. 30B, preference tracking database 3010 may include additional and/or different television services. In an alternative embodiment, television services may be tracked based on their television service numbers or based on some other service identification name or number. The time periods 3002 in this example represent hourly time periods such as 1 p.m. to 2 p.m. 3015, 2 p.m. to 3 p.m. 3016, and 3 p.m. to 4 p.m. 3017. In an alternative embodiment, each of the time periods 3002 may represent a fraction of an hour or a time period greater than an hour. The data entries 3006 comprises scores that represent a duration and/or frequency that a television service is provided to during the time periods 3002. The scores 3011, 3012, and 3013, for example, correspond to time periods 3015, 3016, and 3017, respectively, and to the television service ESPN 3014. In a hypothetical situation, a user is provided with a Green Bay Packers NFL football game on the ESPN television service 3014 between 1 p.m. and 4 p.m. on a Sunday afternoon in the month of January. Based on this hypothetical situation, the preference engine 390 would increment each of the scores 3011, 3012, and 3013 by a certain value that depends on the scoring system being used. In one embodiment, the preference engine 390 increments a score by a value that is equal to the time that the DHCT 200 provides a service having a respective viewing parameter.

Therefore, in such an embodiment, the scores 3011, 3012, and 3013 may each be incremented by a value equal to 1 point where each point corresponds to one hour. In an alternative embodiment, scores are incremented by values that are proportional or correlated to the times and/or frequency that the DHCT 200 provides a service having respective viewing parameters. A person with ordinary skill in the art would recognize that there are many equivalent methods of tracking the extent to which a DHCT provides services having certain viewing parameters.

Figure 30C:
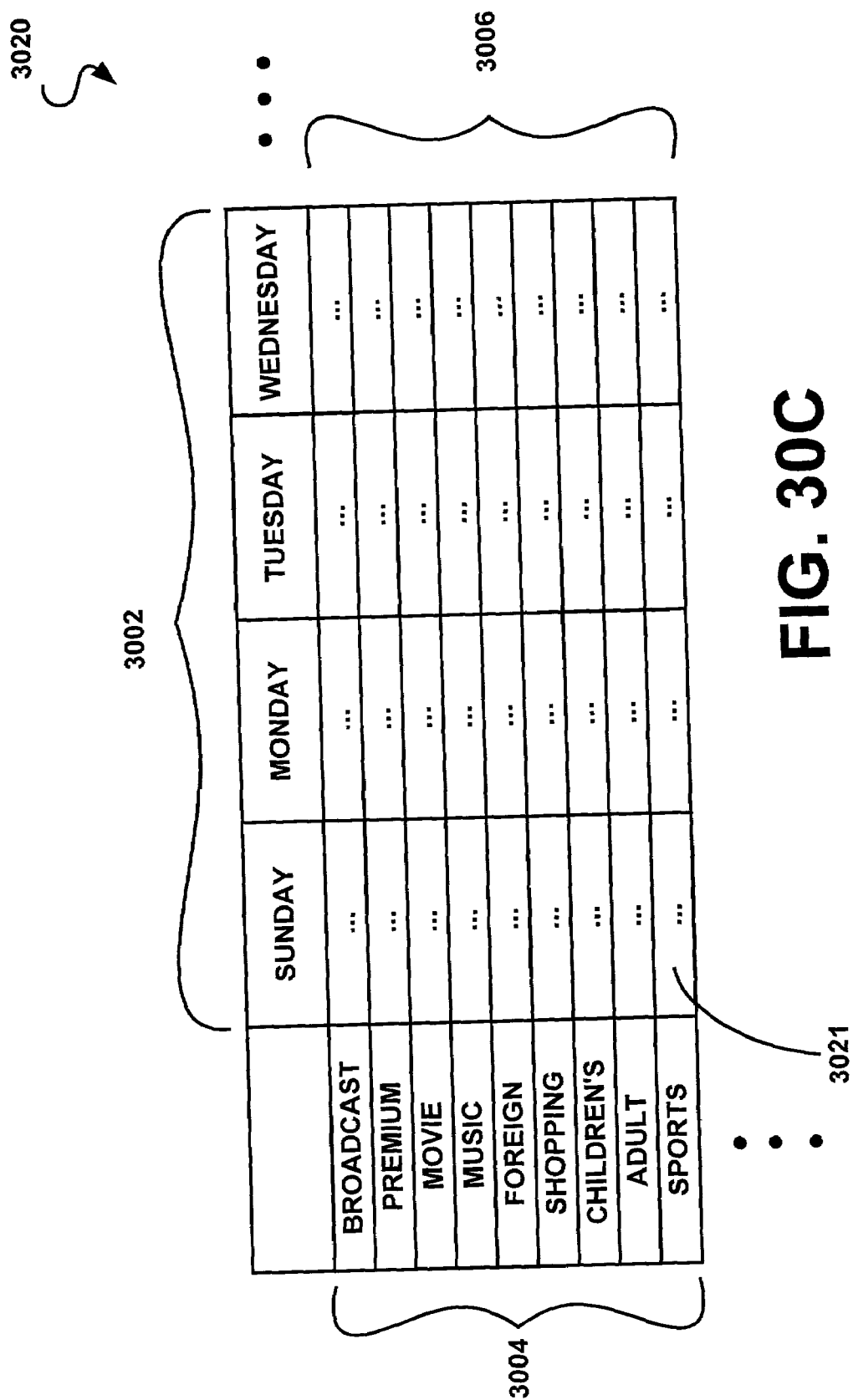
FIG. 30C is a block diagram depicting a non-limiting example of a preference tracking database where the viewing parameters represent types of television services and the time periods represent days of the week.

FIG. 30C is a block diagram depicting a non-limiting example of a preference tracking database 3020 where the viewing parameters 3004 represent types of television services and the time periods 3002 represent days of the week. The types of television services in this example include broadcast, premium, movie, music, foreign, shopping, children's, adult, and sports. Although not shown in FIG. 30B, preference tracking database 3020 may keep track of additional and/or different types of television services such as for example, weather and news services. Each of the time periods 3002 in this example represents a day of the week (e.g., Sunday, Monday, etc.). In an alternative embodiment, each of the time periods 3002 may represent a combination of days such as, for example, Monday through Friday or Saturday and Sunday. Continuing with the hypothetical example discussed in reference to FIG. 30B where the DHCT 200 presents an NFL game, the score 3021 may be incremented by 3 points to account for the DHCT 200 being tuned to a sports television service for 3 hours on a Sunday.

FIG. 30D is a block diagram depicting a non-limiting example of a preference tracking database 3030 where the viewing parameters 3004 represent television instances and the time periods 3002 represent months. The television instances represented in this example include the television programs ABC News, Dateline, Friends, Frasier, Cheers, Headline News, ER, Days of Our Lives, and Green Bay Packers (football games). Although not shown in FIG. 30B, preference tracking database 3030 may keep track of additional and/or different television instances such as for example, The Cosby Show, The Love Boat, MASH, etc. Each of the time periods 3002 in this example represents a month of the year (e.g., January, February, etc.). Continuing with the hypothetical example discussed in reference to FIG. 30B where the DHCT 200 presents a Green Bay Packers NFL game, the score 3031 may be incremented by 3 points to account for the DHCT 200 being tuned to a sports service for 3 hours in January.

Figure 30E:
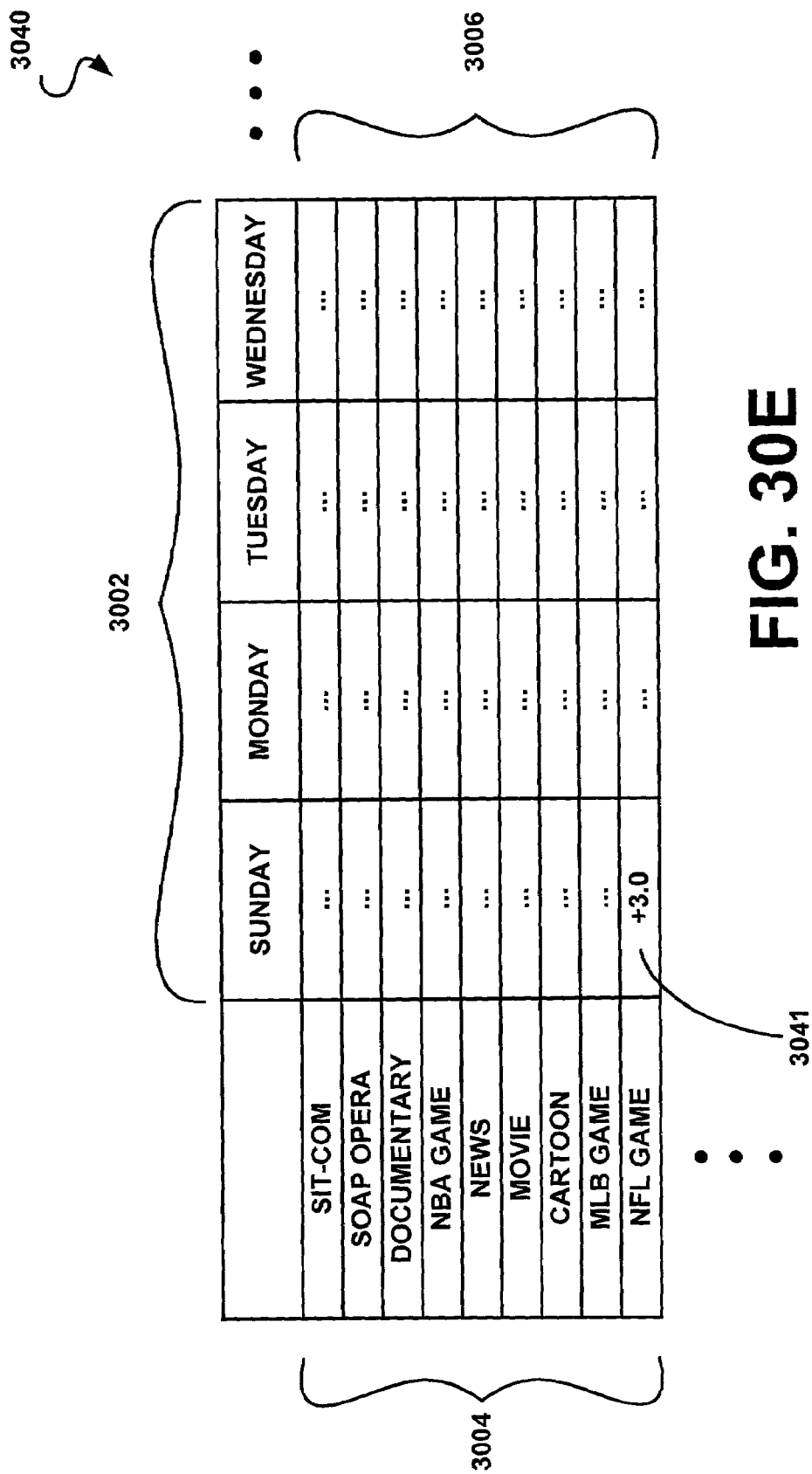
FIG. 30E is a block diagram depicting a non-limiting example of a preference tracking database where the viewing parameters represent types of television instances and the time periods represent days of the week.

FIG. 30E is a block diagram depicting a non-limiting example of a preference tracking database 3040 where the viewing parameters 3004 represent types of television instances and the time periods 3002 represent days of the week. The types of television instances represented in this non-limiting example include sit-coms, soap operas, documentaries, NBA games, news, movies, cartoons, MLB games, and NFL games. Although not shown in FIG. 30B, preference tracking database 3040 may keep track of additional and/or different types of television instances such as, for example, PGA games, NHL games, religious programs, adult programs, etc. Each of the time periods 3002 in this example represents a day of the week (e.g., Sunday, Monday, etc.). Continuing with the hypothetical example discussed in reference to FIG. 30B where the DHCT 200 presents a Green Bay Packers NFL game, the score 3041 may be incremented by 3 points to account for the DHCT 200 being tuned to an NFL game for 3 hours on a Sunday.

Although the preference tracking databases depicted in FIGS. 30B through 30E track certain combinations of viewing parameters 3004 and time periods 3002, additional preference tracking databases that track different combinations of viewing parameters 3004 and time periods 3002 may also be used. Other combinations of tracked parameters include, for example, types of television instances that are tracked in relation to the time of day. In an alternative embodiment a multidimensional preference tracking database may be used to keep track of multiple types of viewing parameters and multiple types of time periods. Each entry in a multidimensional table may identify one or more of the following information related to the video signal tuned to by a DHCT: the television instance, the type of television instance, the television service, the type of television service, service instance rating, service instance content attributes, the time period that the DHCT provides a television service instance, the time period that the DHCT provides a television service, the time of day, the day of the week, the date, and the calendar month. For example, continuing with the hypothetical example discussed in FIGS. 30B–30E where the DHCT 200 presents an NFL game, a corresponding entry in a multidimensional table might contain the following information: Green Bay Packers, NFL, ESPN, sports, Sunday, 1 p.m. to 4 p.m., and January. The information in a multidimensional table may be processed to determine user preferences regarding various viewing parameters and viewing periods.

In one embodiment, an overall score for a plurality of tracked parameters and multi-dimensional tracked associations may be obtained by processing the individual scores as a weighted linear combination of scores for the tracked viewing parameters and/or associations. Likewise, a weighted non-linear combination of the tracked viewing parameters and associations can be implemented. Furthermore, the weights associated with each tracked parameter and/or associations in the combining of scores into an overall score may be found through a training procedure and thereafter refined throughout the course of time by the employment of statistical classification methods or statistical analysis methods. Artificial intelligence technology such as inference engines, syntactical analysis, and/or fuzzy set theory concepts may also be employed in the initial estimate of the weights and their refinements for the purpose of introducing non-linearity and/or for the purpose of discarding or including parameters in the computation of an overall score during certain time periods.

Figure 31:
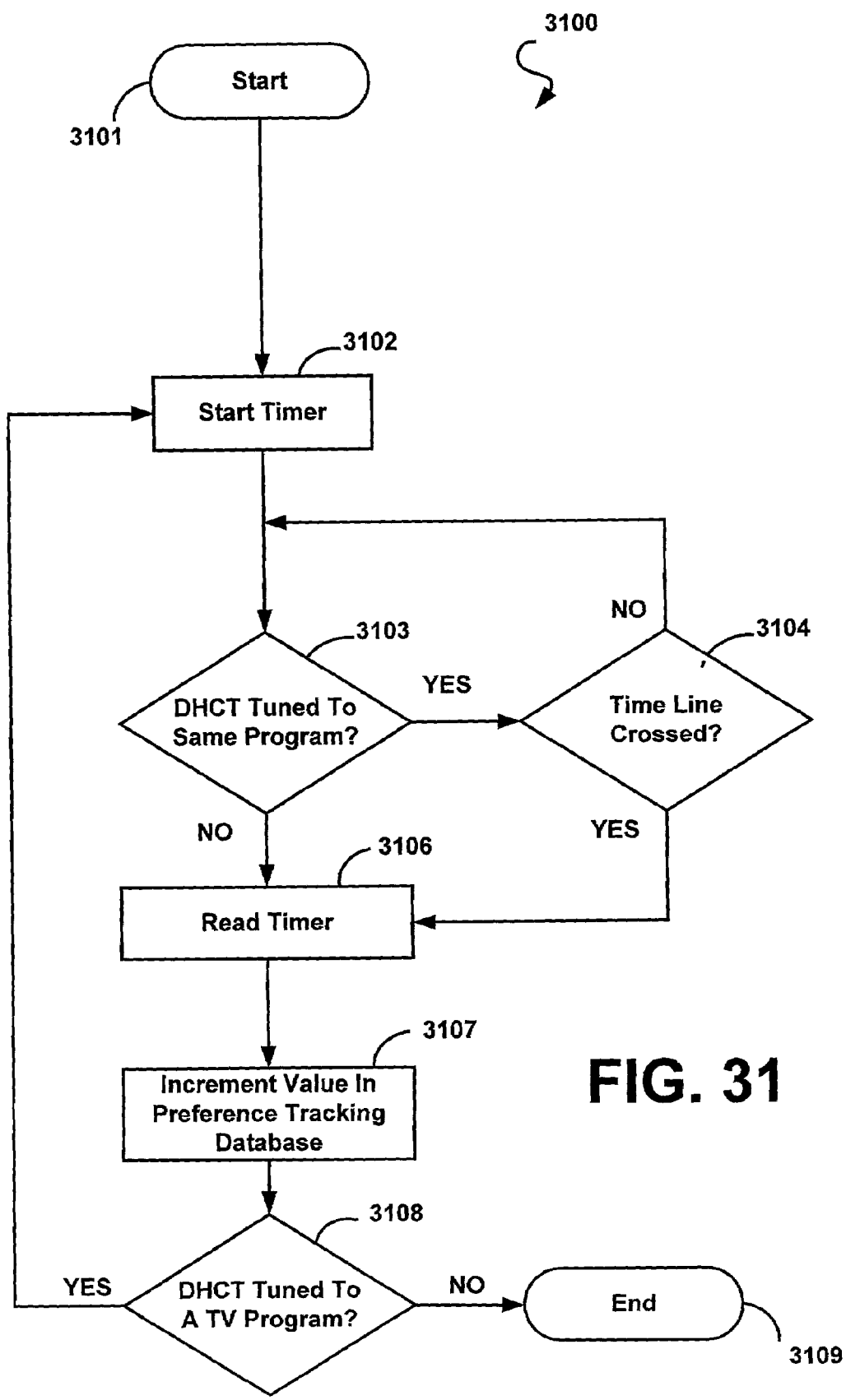
FIG. 31 is a flow chart depicting a non-limiting example of a viewer preference tracking routine that can be used to track a viewer's viewing preferences.

FIG. 31 is a flow chart depicting a non-limiting example of a user preference tracking routine 3100 that can be used to track a user's viewing preferences. The routine 3100 may be part of the preference engine 390 (FIG. 3) and may be initiated in response to the DHCT 200 (FIG. 2) providing a television service. After the routine 3100 is initiated in step 3101, the routine initiates a timer in step 3102, as provisioned by the timer 393 (FIG. 3). The timer is used to keep track of the length of time that a user is provided with a particular television service or instance. The routine 3100 then determines in step 3103 if the DHCT 200 is still providing the same service instance that it was providing at the time that the timer was last initiated. If the DHCT 200 is still providing the same service instance, then the routine 3100 determines in step 3104 if a timeline that separates tracking periods has been crossed. If a timeline has not been crossed, then the routine returns to step 3103.

If the routine 3100 determines in step 3104 that a timeline has been crossed or determines in step 3103 that the DHCT 200 is not still providing the same service instance, then in step 3106 the routine 3100 reads the timer that was initiated in step 3102. The routine then increments a value in one or more preference tracking databases corresponding to a viewing parameter of a service instance that the DHCT 200 was providing at the time that the timer was initiated.

The value in the preference tracking database(s) may be incremented by an amount equal, proportional, or correlated to the time period reflected by the timer at the time that the timer is stopped. In one embodiment, a value in a preference tracking database is only incremented if the time period reflected by the timer exceeds a certain threshold. In another embodiment, a value in a preference tracking database is not incremented unless the DHCT 200 had received user input within a certain time window. Requiring user input within a certain time window ensures that the preference tracking database is not incremented when the DHCT 200 is providing a television instance that no one is watching.

After the routine increments a value in a preference tracking database in step 3107, the routine determines in step 3108 if the DHCT 200 is providing a television instance. If the DHCT 200 is not providing a television instance, then the routine terminates in step 3109. If, however, the DHCT 200 is providing a television instance, then the routine 3100 returns to step 3102.

Figure 32:
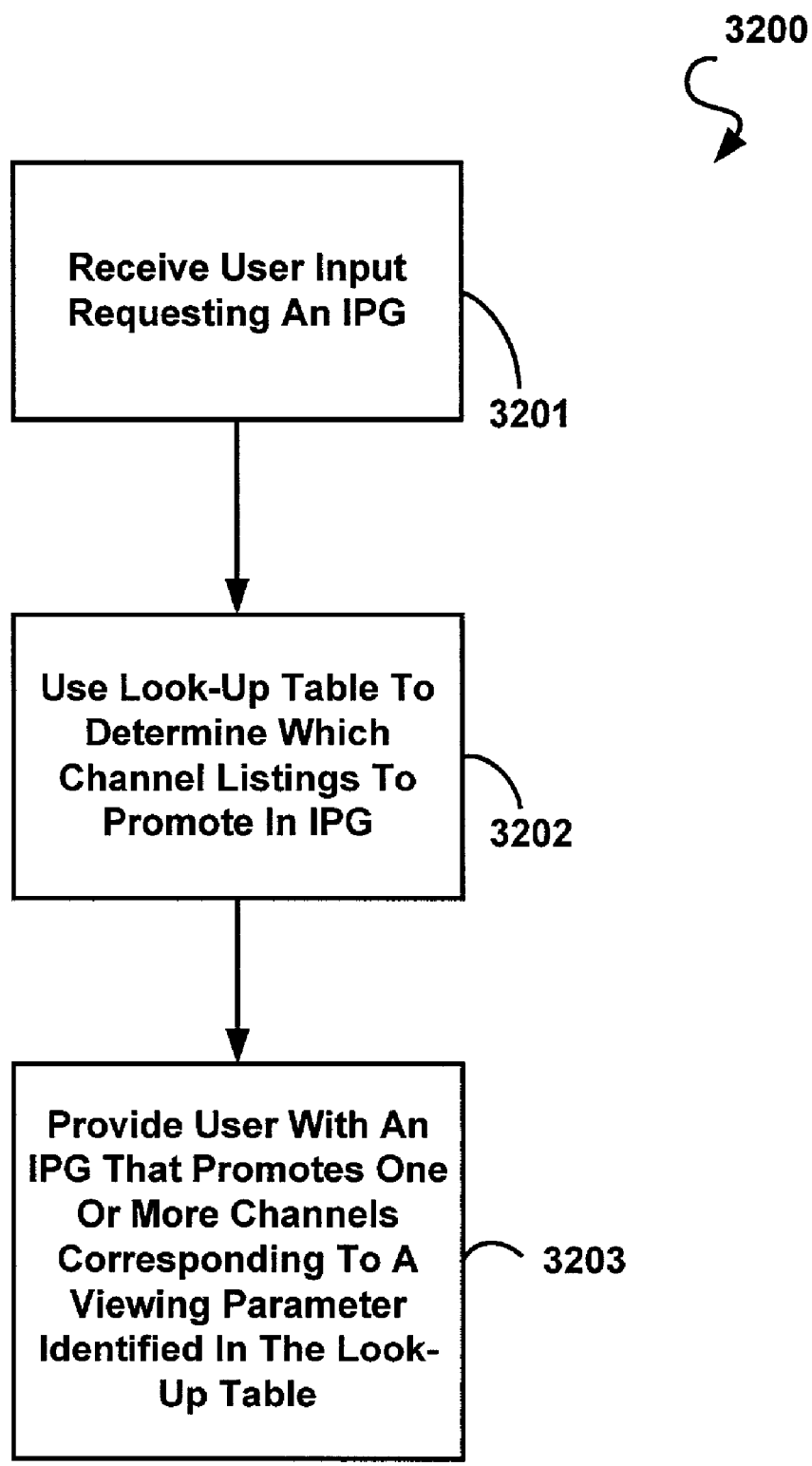
FIG. 32 is a flow chart depicting steps taken in providing a viewer with an IPG in response to user input.

FIG. 32 is a flow chart depicting steps taken in providing a user with an IPG in response to user input. The user input may be provided via the activation of a remote control key such as, for example, the guide key 480. After the DHCT 200 receives user input requesting an IPG, as indicated in block 3201, the IPG application 370 (FIG. 3) in step 3202 uses a preference look-up table 392 (FIG. 3) to determine which television service listings to include in an IPG. Then, in step 3203, the navigator provides the user with an IPG that contains television service listings that are in accordance with a preference look-up table 392.

As a non-limiting example, if the DHCT 200 receives user input at 8:15 p.m. requesting an IPG, then the IPG application 370 may use the preference look-up table shown in Table 1 to determine that during the current time period the user's likely preference is sit-com programs, and as a result provides the user with an IPG that either only lists television services currently carrying a sit-com program or with an IPG where the television service listings are sorted such that television services currently carrying a sit-com program are promoted. A television service may be promoted in an IPG by being listed ahead of other television services and/or by being more conspicuously displayed. After a user is provided with an IPG, the user may then request to see a desired service instance by selecting it via, for example, a remote control device.

In an alternative embodiment, the IPG application 370 may take into account user preferences for the entire time period covered by IPG listings and may thus promote service listings corresponding to services that correspond to a preferred viewing parameter during any portion of such time period. For example, if the time period covered by an IPG requested by a user is 8:00 p.m. to 9:30 p.m., then the IPG may use a look-up table to determine user preferences for 8:00 p.m. to 9:30 p.m. The IPG may then provide the user with service listings that meet preferred viewing parameter(s) corresponding to 8:00 p.m. to 9:30 p.m. based on a preference look-up table 392 or a preference tracking database 391.

In one embodiment, a switch 490 may be used to dictate that user preferences will be used in determining which television service listings to include in an IPG. If a user provides user input requesting an IPG when the switch 490 is in a first position (e.g., up), then the IPG application 370 would provide the user with a default IPG that does not take into account user preferences. If, however, a user provides user input requesting an IPG when the switch 490 is in a second position (e.g., down), then the IPG application 370 would provide the user with an IPG that takes into account user preferences.

Figure 33:
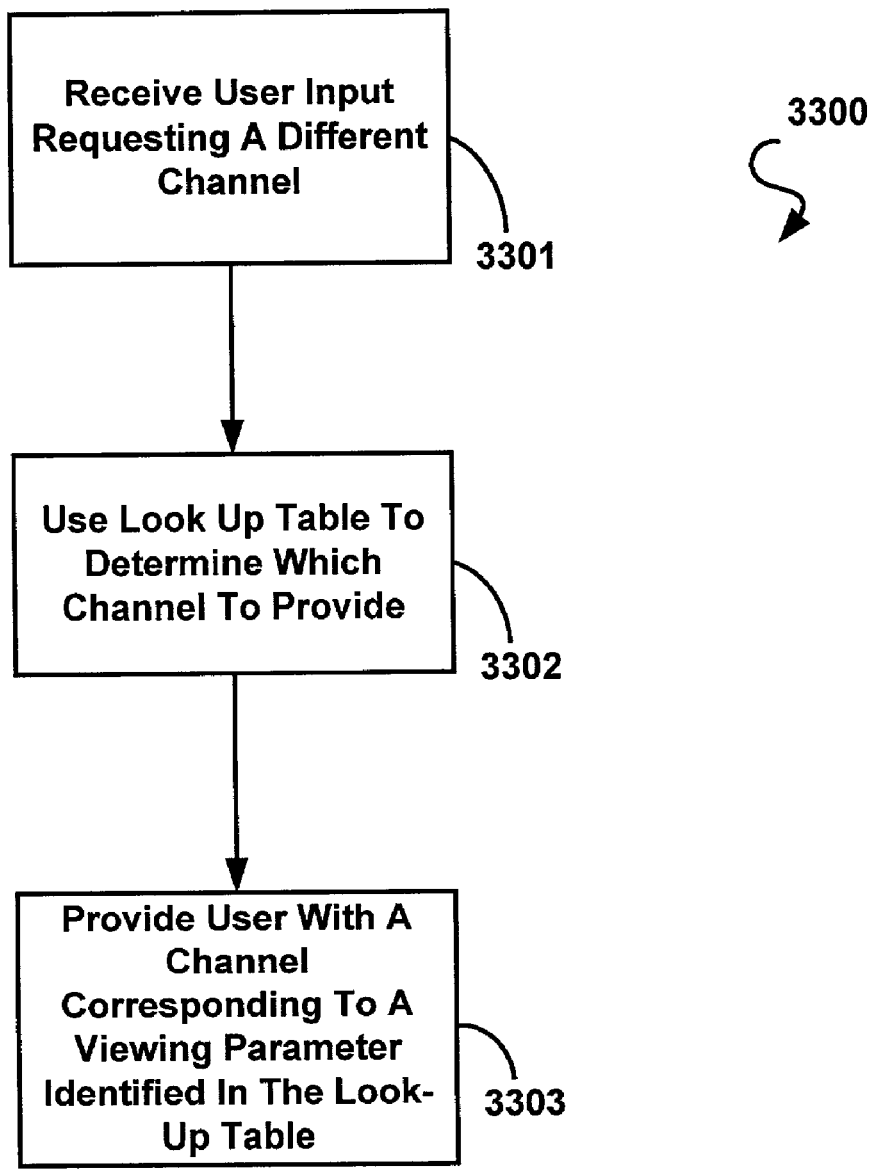
FIG. 33 is a flow chart depicting steps taken in providing a viewer with a different service in response to user input.

FIG. 33 is a flow chart depicting steps taken in providing a user, in response to user input, with a television service that is different from the currently featured television service. The user input may be provided via the activation of a service navigation key such as, for example, the channel +/− key 440 (FIG. 4). After the DHCT 200 receives user input requesting a different television service, as indicated in block 3301, the navigator application 360 in step 3302 uses a preference look-up table 392 to determine which television service to provide to the user. Then, in step 3303, the navigator provides the user with a television service that is in accordance with the preference look-up table.

As a non-limiting example, if the DHCT 200 receives user input corresponding to the channel +/− key 440 at 8:15 p.m., then the navigator application 360 may use the preference look-up table shown in Table 1 to determine that during the current time period the user's likely preference is sit-com programs, and as a result may provide the user with a television service that is currently carrying a sit-com program. If multiple television services meet a criterion in a preference look-up table, then one of these services may be selected based on one or more additional criteria such as, for example, service number.

In one embodiment, a switch 490 may be used to dictate whether the navigator application 360 will use a preference look-up table 392 in determining which television service to provide to the user. If the DHCT 200 receives user input corresponding to the channel +/− key 440 when the switch is in a first position, then the navigator application 360 would provide the user with the next television service "up" or "down" from the currently tuned television service. If, however, the DHCT 200 receives user input corresponding to the channel +/− key 440 when the switch is in a second position, then the navigator application 360 would provide the user with a television service based on information from a preference look-up table.

In another embodiment of the invention, steps 3302 and 3303 are implemented without the occurrence of step 3301. In this embodiment, the DHCT 200 provides a user with a television service "automatically," and not in response to a specific request for the television service. For example, after a first service instance is provided to a user, the DHCT 200 may automatically tune to a second service instance that is in accordance with a predetermined user preference.

Figure 34:
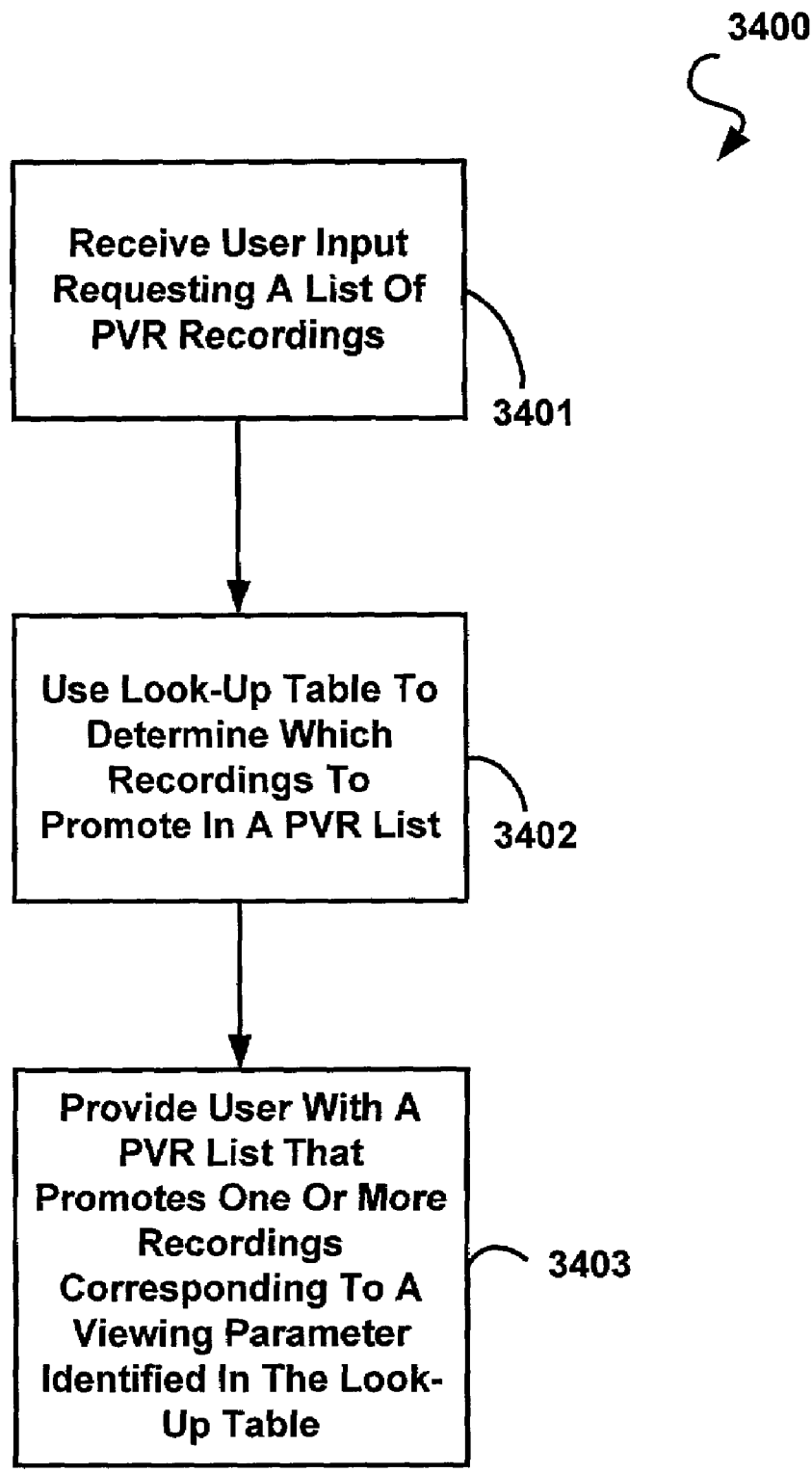
FIG. 34 is a flow chart depicting steps taken in providing a viewer with a PVR list in response to user input.

FIG. 34 is a flow chart depicting steps taken in providing a user with a PVR list in response to user input. The user input may be provided via the activation of a remote control key such as, for example, the PVR key 495. After the DHCT 200 receives user input requesting a PVR list, as indicated in block 3401, the PVR application 355 in step 3402 uses a preference look-up table 392 to determine which recording listings to include in a PVR list. Then, in step 3403, the navigator provides the user with a PVR list that contains recording listings that are in accordance with the preference look-up table.

As a non-limiting example, if the DHCT 200 receives user input at 8:15 p.m. requesting a PVR list, then the PVR application 355 may use the preference look-up table shown in Table 1 to determine that during the current time period the user's likely preference is sit-com programs, and, as a result, provides the user with a PVR list that either only lists recordings comprising a sit-com program or with a PVR list where the recording listings are sorted such that recordings comprising a sit-com program are promoted. A recording may be promoted in a PVR list by being listed ahead of other recordings and/or by being more conspicuously displayed. After a user is provided with a PVR list, the user may then request to see a desired recording by selecting the corresponding listing in the PVR list. The following is an example of a PVR list that only lists recordings comprising a sit-com program:

TABLE 2

Example of a PVR list that only lists sit-com recordings

| Title | Recording Time |
| --- | --- |
| Friends | 60 minutes |
| Will & Grace | 30 Minutes |
| Just Shoot Me | 30 Minutes |
| Cheers | 30 Minutes |
| Three Sisters | 30 Minutes |
| Frasier | 30 Minutes |
| Wings | 30 Minutes |
| Mork and Mindy | 30 Minutes |
| Benson | 30 Minutes |

In one embodiment, a switch 490 may be used to dictate whether the PVR application 355 will use a preference look-up table 392 in determining which recordings to include in a PVR list. If a user provides user input requesting a PVR list when the switch 490 is in a first position, then the PVR application 355 would provide the user with a PVR list that does not take into account user preferences. If, however, a user provides user input requesting a PVR list when the switch 490 is in a second position, then the PVR application 355 would provide the user with a PVR list that takes into account user preferences based on, for example, a preference look-up table 392.

Figure 35:
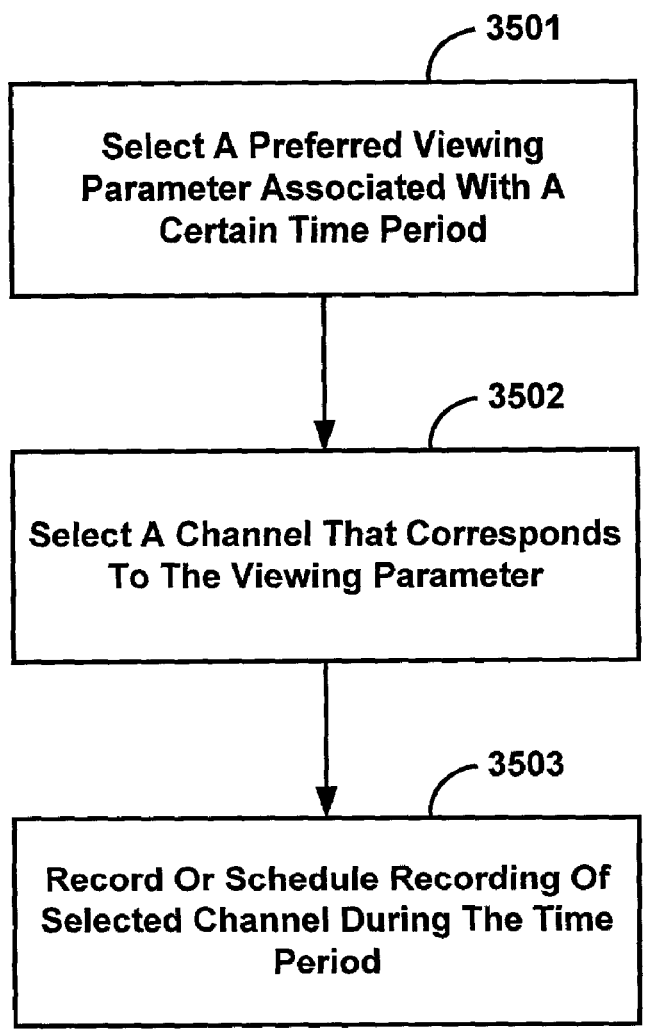
FIG. 35 is a flow chart depicting a non-limiting example of steps taken by the DHCT in recording a television service based on user preferences.

FIG. 35 is a flow chart depicting a non-limiting example of steps taken by the DHCT 200 in recording a television service based on user preferences. Each of these steps 3501–3503 may be implemented by the PVR application 355, by the preference engine 390, or by some other designated application. In a preferred embodiment, steps 3501–3503 are implemented by the PVR application 355. In step 3501, the PVR application selects one or more preferred viewing parameters that are associated with a certain time period. The preferred viewing parameters may be selected based on data from a preference tracking database 391 or from a preference look-up table 392 (FIG. 3). In step 3502, the PVR application 355 selects a television service that corresponds to one or more preferred viewing parameter(s). In one embodiment, the PVR application selects a television service that corresponds to the greatest number of preferred viewing parameters that are associated with the certain time period. For example, if the preferred viewing parameters corresponding to an 8:00 p.m. to 8:30 p.m. time period are sit-com (service instance type), Friends (service instance), and NBC (service), and if NBC is scheduled to be broadcasting Friends during that time period, then NBC, which is consistent with all three viewing parameters during the time period, would be selected over other television services that may be carrying Friends or some other sit-com program during such time period. In step 3503, the PVR application records or schedules the recording of the selected television service during the certain time period.

In one embodiment, preference-related data that are used in determining user preferences are stored in DRAM 304 of the DHCT 200. Such data may include parameters associated with the customization of viewing information specified by a subscriber during a customization procedure, look-up tables that may be generated pursuant to such parameters, parameters associated with and/or supporting the execution of the preference engine 390, preference look-up tables 392, and preference tracking databases 391. In addition, some or all of this data may also be stored in either read-write non-volatile memory of DHCT 200 (e.g., flash memory 302) and/or in an application server at the headend 110 to facilitate recovery of the data during a power outage or a reboot operation. If DHCT 200 has a local storage device, either internally or externally connected via a communication port or local storage interface, it can be used to store this data rather than employing an application server at headend 110.

Regardless of where preference-related data is stored, a subset of the preference-related data may be stored in read-write non-volatile memory of DHCT 200 by configuration manager 397. The subset of preference related data may be used to determine whether configuration or preference information exists for each respective TV control functionality and/or application in the event that DHCT 200 experiences a power outage period. The subset of preference-related data may also include an indication as to whether any configured preferences exist (which may be indicated by a single bit of non-volatile memory), and information such as a directory path or user identification for where preference-related data can be retrieved.

It should be emphasized that the above-described embodiments of the present invention, particularly any "preferred embodiments", are merely possible examples, among others, of the implementations, setting forth a clear understanding of the principles of the invention. Many modifications may be made to the above-described embodiments of the invention without departing substantially from the principles of the invention. All such modifications are intended to be included herein within the scope of the disclosure and present invention and protected by the following claims.

The invention claimed is:

1. A method for providing television services by a television set-top terminal ("STT"), comprising:

responsive to a first user input,
receiving by the STT information corresponding to a first user-defined time interval, the start and end times of the first user-defined time interval corresponding respectively to a user-selected start time and a user-selected end-time,
receiving by the STT at least one parameter corresponding to a user preference,
storing data in memory of the STT associating the at least one parameter with the first user-defined time interval, and
enabling access to purchasable television services during the first user-defined time interval according to the at least one parameter;

responsive to a second user input,
receiving by the STT a request for a purchasable television service corresponding to the at least one parameter,
accessing the data in memory of the STT associating the at least one parameter with the first user-defined time interval,
determining whether the request is for viewing the purchasable television service during the first user-defined time interval,
enabling by the STT a purchase of the purchasable television service responsive to determining that the request is for viewing the purchasable television service during the first user-defined time interval, and
preventing by the STT the purchase of the purchasable television service responsive to determining that the request is for viewing the purchasable television service outside the first user-defined time interval.

2. The method of claim 1, wherein the first user input is received outside the first user-defined time interval.

3. The method of claim 1, wherein the second user input is received outside the first user-defined time interval.

4. The method of claim 1, wherein the at least one parameter corresponds to a type of purchasable television service.

5. The method of claim 1, wherein the at least one parameter identifies a television service.

6. The method of claim 1, wherein the data in memory of the STT associating the at least one parameter with the first user-defined time interval is stored in the memory for a plurality of days.

7. The method of claim 1, wherein the start time of the first user-defined time interval corresponds to a first clock time, and the end time of the first user-defined time interval corresponds to a second clock time that is subsequent to the first clock time.

8. The method of claim 7, wherein access to the purchasable television services is enabled during a plurality of time intervals having a start time corresponding to the first clock time and an end time corresponding to the second clock time.

9. The method of claim 8, wherein the plurality of time intervals occur during a plurality of respective days.

10. The method of claim 1, wherein the at least one parameter is one of a program type, a channel type, a channel identity, a television service type, a service instance, a service instance type, and a service instance rating.

11. The method of claim 1, wherein the user preference is selected by a user from a list of user preferences.

12. The method of claim 1, wherein the user-selected start time and the user-selected end time of the first user-defined time interval are two separate selections.

13. A method for providing recorded television services by a television set-top terminal ("STT"), comprising:
responsive to a first user input,
receiving by the STT information corresponding to a user-defined time interval, the start and end times of the first user-defined time interval corresponding respectively to a user-selected start time and a user-selected end time,
receiving by the STT at least one parameter corresponding to a user preference,
storing data in memory of the STT associating the at least one parameter with the first user-defined time interval,
enabling recording of television services during the first user-defined time interval according to the at least one parameter;
responsive to a second user input,
receiving by the STT a request for recording a television service corresponding to the at least one parameter,
accessing the data in memory of the STT associating the at least one parameter with the first user-defined time interval,
determining whether the request is for recording the television service during the first user-defined time interval,
enabling a recording of the television service responsive to determining that the request is for recording the television service during the first user-defined time interval, and
preventing the recording of the television service responsive to determining that the request is for recording the television service outside the first user-defined time interval.

14. The method of claim 13, wherein the request for recording the television service is received outside the first user-defined time interval.

15. The method of claim 13, wherein the at least one parameter corresponds to a type of television service.

16. The method of claim 13, wherein the at least one parameter identifies a television service.

17. The method of claim 13, wherein the data in memory of the STT associating the at least one parameter with the first user-defined time interval is stored in the memory for a plurality of days.

18. The method of claim 13, wherein the start time of the first user-defined time interval corresponds to a first clock time and the end time of the first user-defined time interval corresponds to a second clock time that is subsequent to the first clock time.

19. The method of claim 18, wherein recording of television services is enabled during a plurality of time intervals having a start time corresponding to the first clock time and an end time corresponding to the second clock time.

20. The method of claim 19, wherein the plurality of time intervals occur during a plurality of respective days.

21. The method of claim 13, wherein the at least one parameter is one of a program type, a channel type, a channel identity, a television service type, a service instance, a service instance type, and a service instance rating.

22. The method of claim 13, wherein the user preference is selected by a user from a list of user preferences.

23. The method of claim 13, wherein the first user input is received outside the first user-defined time interval.

24. The method of claim 13, wherein the user-selected start time and the user-selected end time of the first user-defined time interval are two separate selections.

25. The method of claim 13, wherein a first parameter of the at least one parameter corresponds to a television service and a second parameter of the at least one parameter corresponds to enabling a recording operation.

26. A method implemented by a television set-top terminal ("STT") comprising:
responsive to receiving by the STT a first user input,
defining a plurality of contiguous user-defined time intervals including a first user-defined time interval, a second user-defined time interval, and a third user-defined time interval, the second user-defined time interval being between the first user-defined time interval and third user-defined time interval,
storing a first data in memory of the STT identifying whether a television function corresponding to a first parameter is to be enabled during the first user-defined time interval, wherein the first parameter corresponds to at least one of a television channel characteristic, a television program characteristic, and a television service characteristic, and
storing a second data in the memory of the STT identifying whether a television function corresponding to a second parameter is to be enabled during the second user-defined time interval, wherein the second parameter corresponds to at least one of a television channel characteristic, a television program characteristic, and a television service characteristic;
responsive to receiving by the STT a second user input,
receiving by the STT a request for providing during the first user-defined time interval a first television function corresponding to the first parameter,
accessing the first data from the memory of the STT,
determining from the first data whether the first television function is enabled or disabled during the first user-defined time interval,
enabling the first television function to be provided during the first user-defined time interval responsive to determining from the first data that the first television function is enabled, and
preventing the first television function from being provided responsive to determining from the first data that the first television function is disabled.

27. The method of claim 26, further comprising:
receiving a request for providing a second television function corresponding to the second parameter; and responsive to receiving the request for the second television function,
accessing the second data from the memory of the STT,
determining from the second data whether the second television function is enabled or disabled during the second user-defined time interval,
enabling the second television function to be provided during the second user-defined time interval responsive to determining from the second data that the second television function is enabled, and
preventing the second television function from being provided responsive to determining from the second data that the second television function is disabled.

28. The method of claim 26, wherein the first television function comprises providing television program information.

29. The method of claim 26, wherein the first television function comprises recording a television service.

30. The method of claim 26, wherein the first television function comprises tuning to a television channel.

31. The method of claim 26, wherein the first and second television functions are different.

32. The method of claim 26, wherein the first television function is disabled during the second user-defined time interval and enabled during the first user-defined time interval.

33. The method of claim 26, wherein the first television function is enabled during the first user-defined time interval and the third user-defined time interval and disabled during the second user-defined time interval.

34. The method of claim 26, wherein storing the first data in the memory of the STT is responsive to receiving a third user input corresponding to the first parameter.

35. The method of claim 26, wherein the first data in the memory of the STT is stored in the memory for a plurality of days.

36. The method of claim 26, wherein the first television function is enabled during a plurality of user-defined time intervals that occur during a plurality of respective days, and wherein a duration of each of the plurality of user-defined time intervals is equal to the duration of the first user-defined time interval.

37. A method implemented by a television set-top terminal ("STT") comprising:
receiving by the STT a first user input defining a plurality of contiguous user-defined time intervals including a first user-defined time interval, a second user-defined time interval, and a third user-defined time interval, the second user-defined time interval being between the first user-defined time interval and the third user-defined time interval;
receiving by the STT a second user input;
storing data in memory identifying whether a first television function is to be enabled during the first user-defined time interval responsive to receiving the first user input, wherein the first television function includes at least one of enabling recording a television service, enabling a purchase transaction, providing television program information, and tuning to a television channel;
receiving by the STT a third user input;
storing data in the memory identifying whether a second television function is to be enabled during the second user-defined time interval responsive to receiving the second user input, wherein the second television function includes at least one of enabling recording a television service, enabling a purchase transaction, providing television program information, and tuning to a television channel;
receiving user input requesting that the first television function be provided during the first user-defined time interval; and
responsive to receiving the request for the first television function,
accessing data in the memory identifying whether the first television function is to be enabled during the first user-defined time interval,
determining whether the first television function is to be enabled responsive to the data in the memory identifying whether the first television function is to be enabled during the first user-defined time interval,
enabling the first television function during the first user-defined time interval responsive to determining that the first television function is to be enabled during the first user-defined time interval, and
preventing the first television function from being implemented during the first user-defined time interval responsive to determining that the first television function is not to be enabled during the first user-defined time interval.

38. The method of claim 37, further comprising:
receiving user input requesting that the second television function be provided during the second user-defined time interval; and
responsive to receiving the user input requesting the second television function be provided during the second user-defined time interval,
accessing data in the memory identifying whether the second television function is to be enabled during the second time interval,
determining whether the second television function is to be enabled responsive to the data in the memory identifying whether the second television function is to be enabled during the second user-defined time interval,
enabling the second television function during the second user-defined time interval responsive to determining that the second television function is to be enabled during the second user-defined time interval, and
preventing the second television function from being implemented during the second user-defined time interval responsive to determining that the second television function is not to be enabled during the second user-defined time interval.

39. The method of claim 37, where the first television function comprises enabling a sales transaction.

40. The method of claim 37, wherein the first television function comprises enabling recording a television service.

41. The method of claim 37, wherein the first television function corresponds to a user input key.

* * * * *